Figure 1:
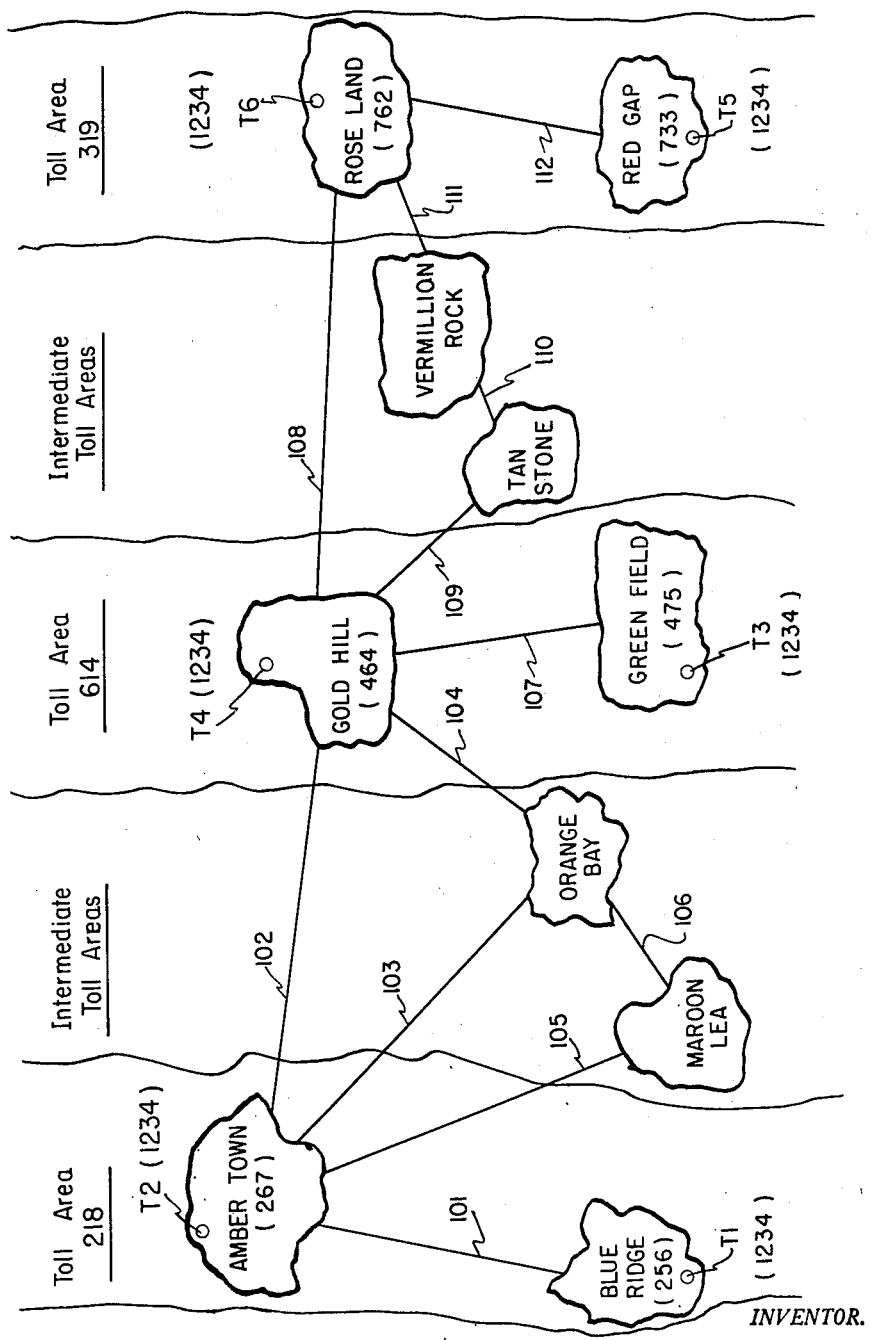

March 10, 1953

J. E. OSTLINE 2,631,195

TOLL SWITCHING SYSTEM

Filed Jan. 29, 1949

14 Sheets-Sheet 1

INVENTOR.
John E. Ostline
BY
Smith, Olsen & Baird
Attys

March 10, 1953

J. E. OSTLINE 2,631,195

TOLL SWITCHING SYSTEM

Filed Jan. 29, 1949

14 Sheets-Sheet 2

*INVENTOR.*
John E. Ostline

BY
Smith, Olsen & Baird

Attys

March 10, 1953   J. E. OSTLINE   2,631,195
TOLL SWITCHING SYSTEM
Filed Jan. 29, 1949   14 Sheets-Sheet 3
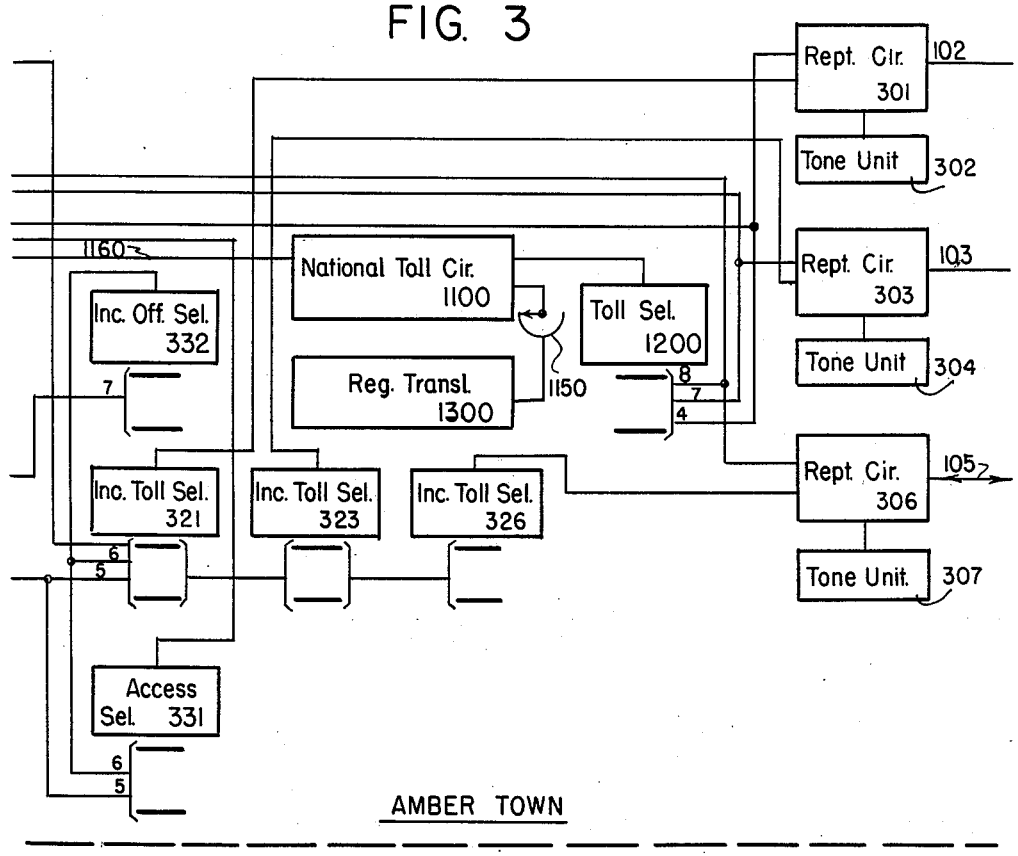
FIG. 3
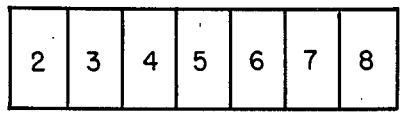
AMBER TOWN
FIG. 9
| 2 | 3 | 4 | 5 | 6 | 7 | 8 |
FIG. 16
| 10 | 11 | 12 |
| 13 | 14 | 15 |
*INVENTOR.*
John E. Ostline
BY
Smith, Olsen & Baird
Attys.

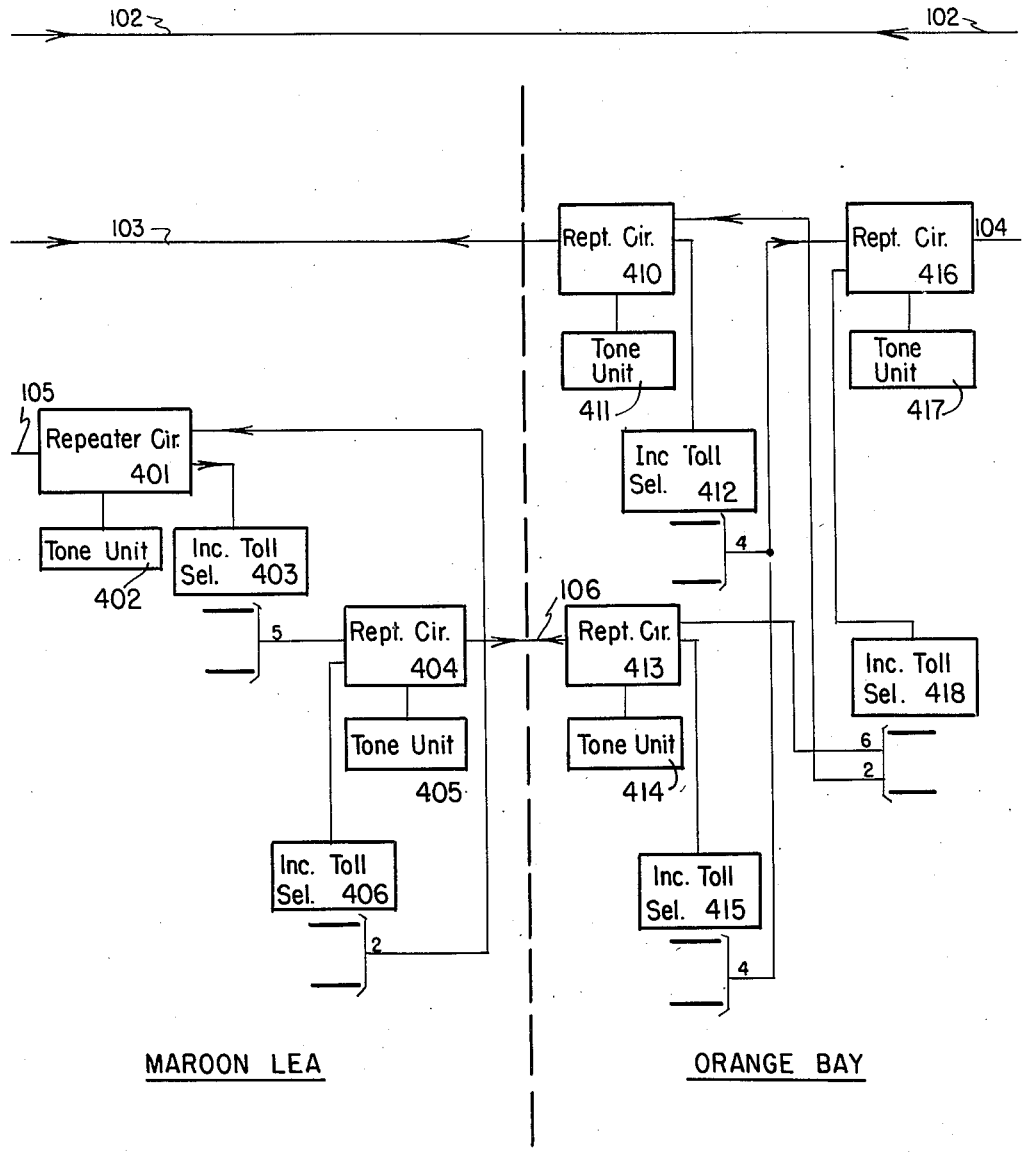

March 10, 1953  J. E. OSTLINE  2,631,195
TOLL SWITCHING SYSTEM
Filed Jan. 29, 1949  14 Sheets-Sheet 5

*INVENTOR.*
John E. Ostline
BY
Smith, Olsen & Baird
Attys.

March 10, 1953 — J. E. OSTLINE — 2,631,195
TOLL SWITCHING SYSTEM
Filed Jan. 29, 1949 — 14 Sheets-Sheet 6

INVENTOR.
John E. Ostline
BY Smith, Olsen & Baird
Attys.

March 10, 1953  J. E. OSTLINE  2,631,195
TOLL SWITCHING SYSTEM
Filed Jan. 29, 1949  14 Sheets-Sheet 7

INVENTOR.
John E. Ostline
BY
Smith, Olsen & Baird
Attys.

March 10, 1953 J. E. OSTLINE 2,631,195
TOLL SWITCHING SYSTEM
Filed Jan. 29, 1949 14 Sheets-Sheet 8

ROSE LAND

INVENTOR.
John E. Ostline
BY
Smith, Olsen & Baird
Attys.

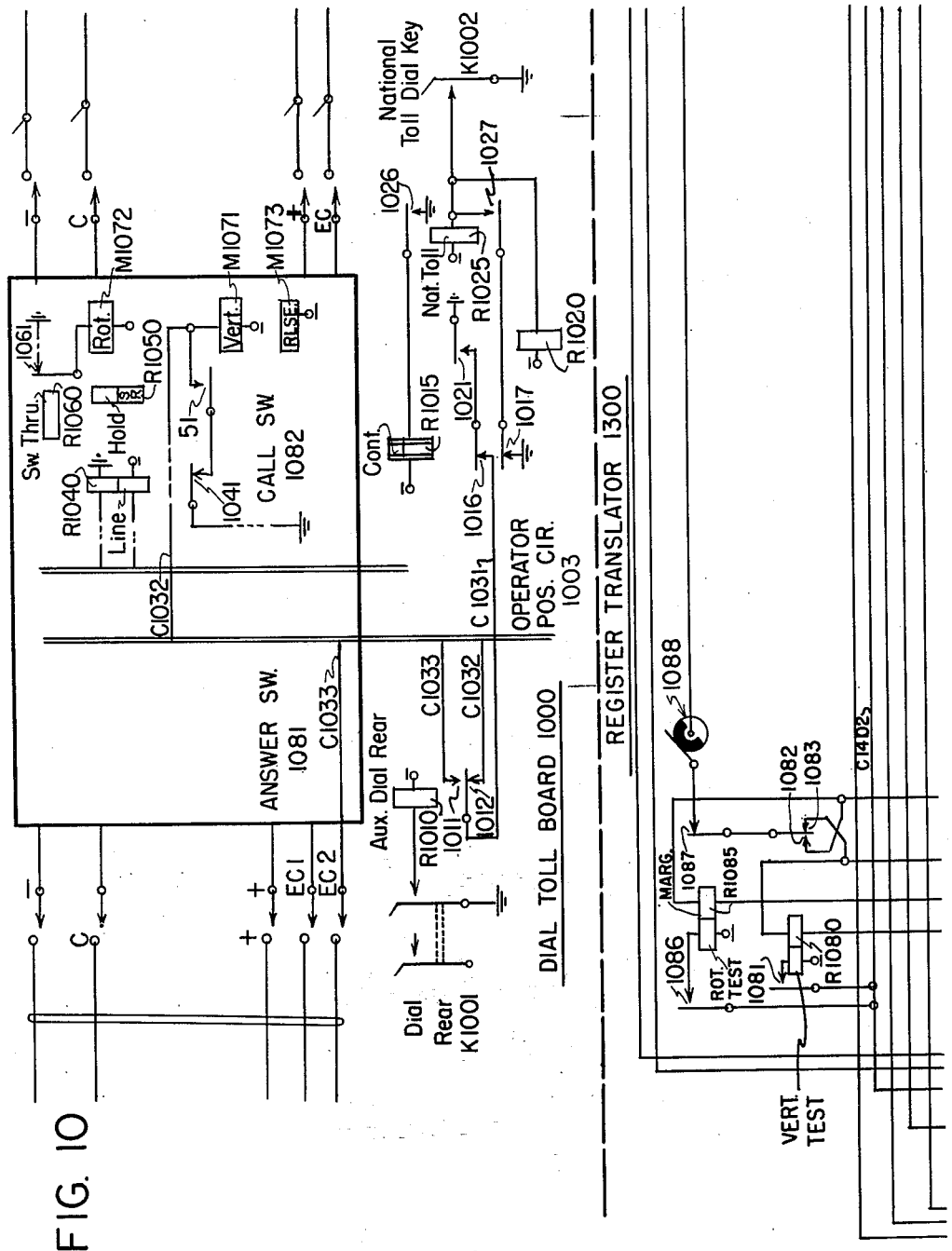

March 10, 1953

J. E. OSTLINE 2,631,195

TOLL SWITCHING SYSTEM

Filed Jan. 29, 1949

14 Sheets-Sheet 10

FIG. 11

*INVENTOR.*
John E. Ostline

BY
Smith, Olsen & Baird

Attys.

March 10, 1953  J. E. OSTLINE  2,631,195
TOLL SWITCHING SYSTEM
Filed Jan. 29, 1949  14 Sheets-Sheet 11

INVENTOR.
John E. Ostline
BY
Smith, Olsen & Baird
Attys.

March 10, 1953 J. E. OSTLINE 2,631,195
TOLL SWITCHING SYSTEM
Filed Jan. 29, 1949 14 Sheets-Sheet 14

INVENTOR.
John E. Ostline
BY
Smith, Olsen & Baird
Attys.

Patented Mar. 10, 1953

2,631,195

UNITED STATES PATENT OFFICE 2,631,195

TOLL SWITCHING SYSTEM

John E. Ostline, Chicago, Ill., assignor to Automatic Electric Laboratories, Inc., Chicago, Ill., a corporation of Delaware Application January 29, 1949, Serial No. 73,481

13 Claims. (Cl. 179—18)

The present invention relates to toll switching systems, and more particularly to such switching systems serving a vast territory commensurate with that of a nation or several adjacent nations.

Heretofore a long trans-nation toll call has been passed from a toll board in an originating office to a toll board in a tandem office and then passed to a toll board in another tandem office, if necessary, and then passed to a toll board in a terminating office and ultimately completed from the toll board in the terminating office to a called subscriber substation. This passing of toll calls not only consumes considerable time and requires repeated handling by the operators at the toll boards in the various offices, but it offers several opportunities for errors to be made and is otherwise costly and inefficient.

Accordingly, it is a general object of the present invention to provide an improved toll switching telephone system serving a vast territory, wherein the operator at the toll board in any originating office has access to switching and control equipment so that she may extend a toll call directly to any called subscriber substation in any terminating office without the assistance of an operator at a toll board in any other office and regardless of the relative positions of the originating and terminating offices in the telephone system.

Another object of the invention is to provide in a toll switching telephone system of the character noted, equipment accessible to an operator at a toll board in any originating office that is controllable in accordance with fixed predetermined digits to effect the completion of a toll call to a called subscriber substation in a terminating office regardless of the relative positions of the originating and terminating offices in the telephone system.

A further object of the invention is to provide a telephone system of the character noted that has a fixed and predetermined toll directory numbering plan which is uniformly applicable throughout and without reference to the relative positions of the originating exchanges and the terminating exchanges involved in the various toll calls in the telephone system.

A further object of the invention is to provide in a toll switching telephone system, an improved arrangement of the toll board and the register equipment in each toll office in the telephone system.

A further object of the invention is to provide in a toll switching telephone system, improved register-translator equipment that is located in one toll office and capable of distinguishing between the toll calls that are to be completed respectively in near and in remote offices.

A still further object of the invention is to provide in a toll switching telephone system, improved register-translator equipment that is located in one toll office and selectively controllable to effect the completion of a toll call in a near office and to pass a toll call that is to be completed in a remote office to another register-translator equipment located in a tandem toll office disposed between the one toll office and the remote office.

Further features of the invention pertain to the particular arrangement of the circuit elements of the telephone system, whereby the above outlined and additional operating features thereof are attained.

*Sect. 1.—The general arrangement of the telephone system*

The invention, both as to its organization and method of operation, together with further objects and advantages thereof, will be best understood by reference to the following specification taken in connection with the accompanying drawings, in which Figure 1 is a schematic diagram of a portion of the territory served by a telephone system embodying the present invention and illustrating a number of toll areas into which the territory is divided and the trunking plan therebetween; Figs. 2 to 8, inclusive, taken together, illustrate the general arrangement of the apparatus incorporated in several of the offices in several of the toll areas; Fig. 9 illustrates the mode of combining Figs. 2 to 8, inclusive, to form a unified diagram; Figs. 10 to 15, inclusive, taken together, illustrate the details of certain of the apparatus incorporated in one of the toll offices in one of the toll areas of the telephone system, which apparatus has embodied therein the features of the invention as briefly outlined above; and Fig. 16 illustrates the mode of combining Figs. 10 to 15, inclusive, to form a unified diagram.

Figure 2:
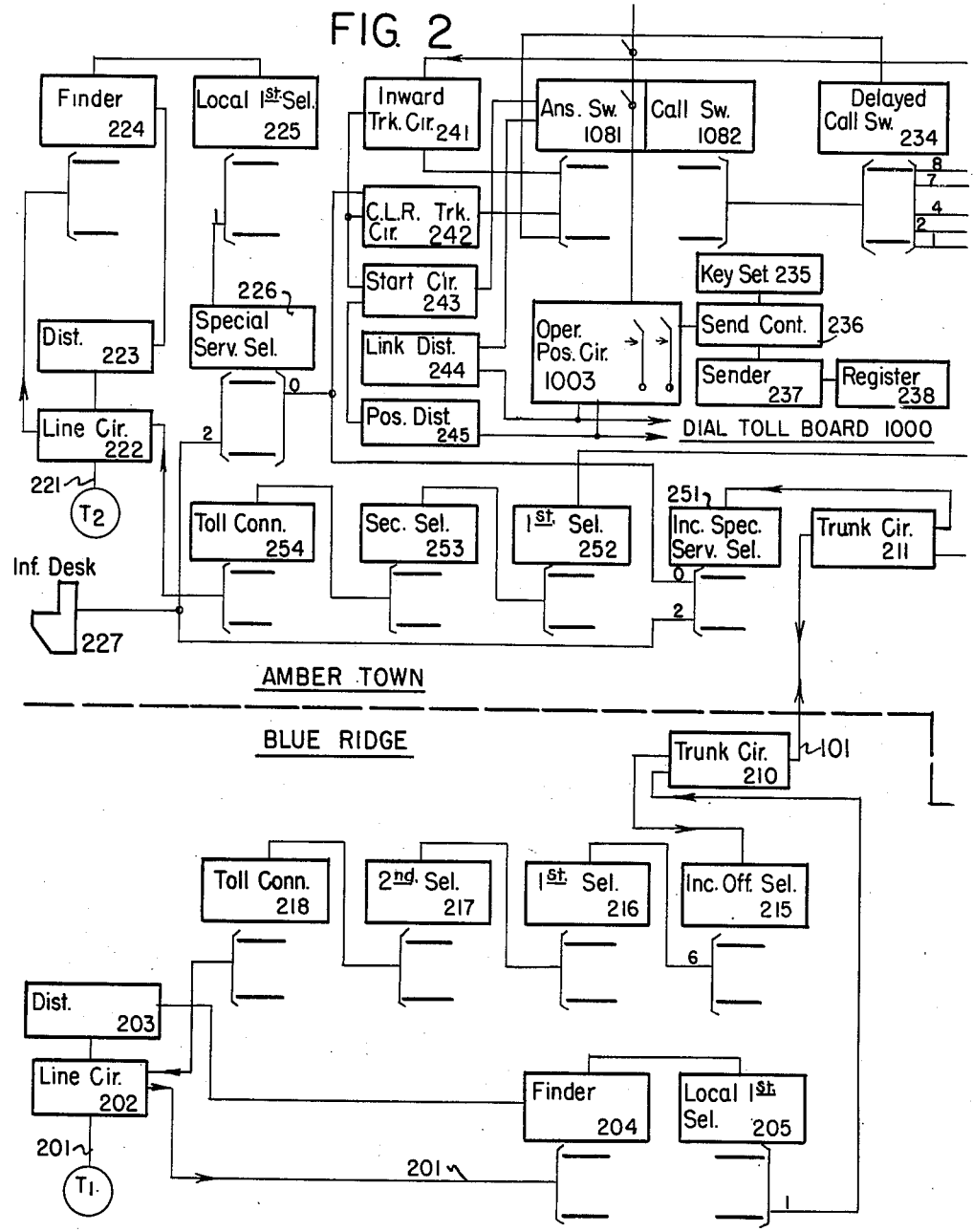
Figure 5:
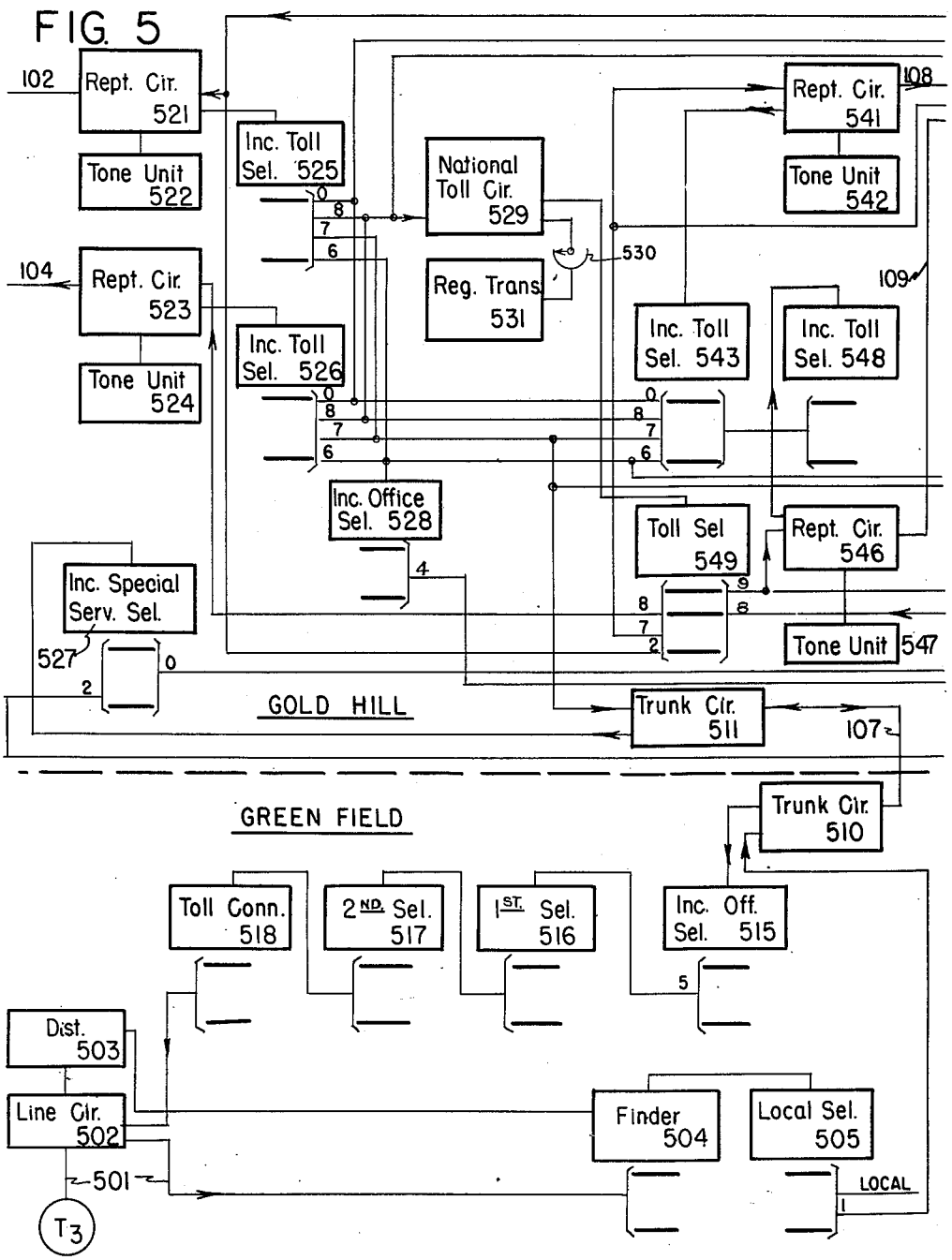
Figure 6:
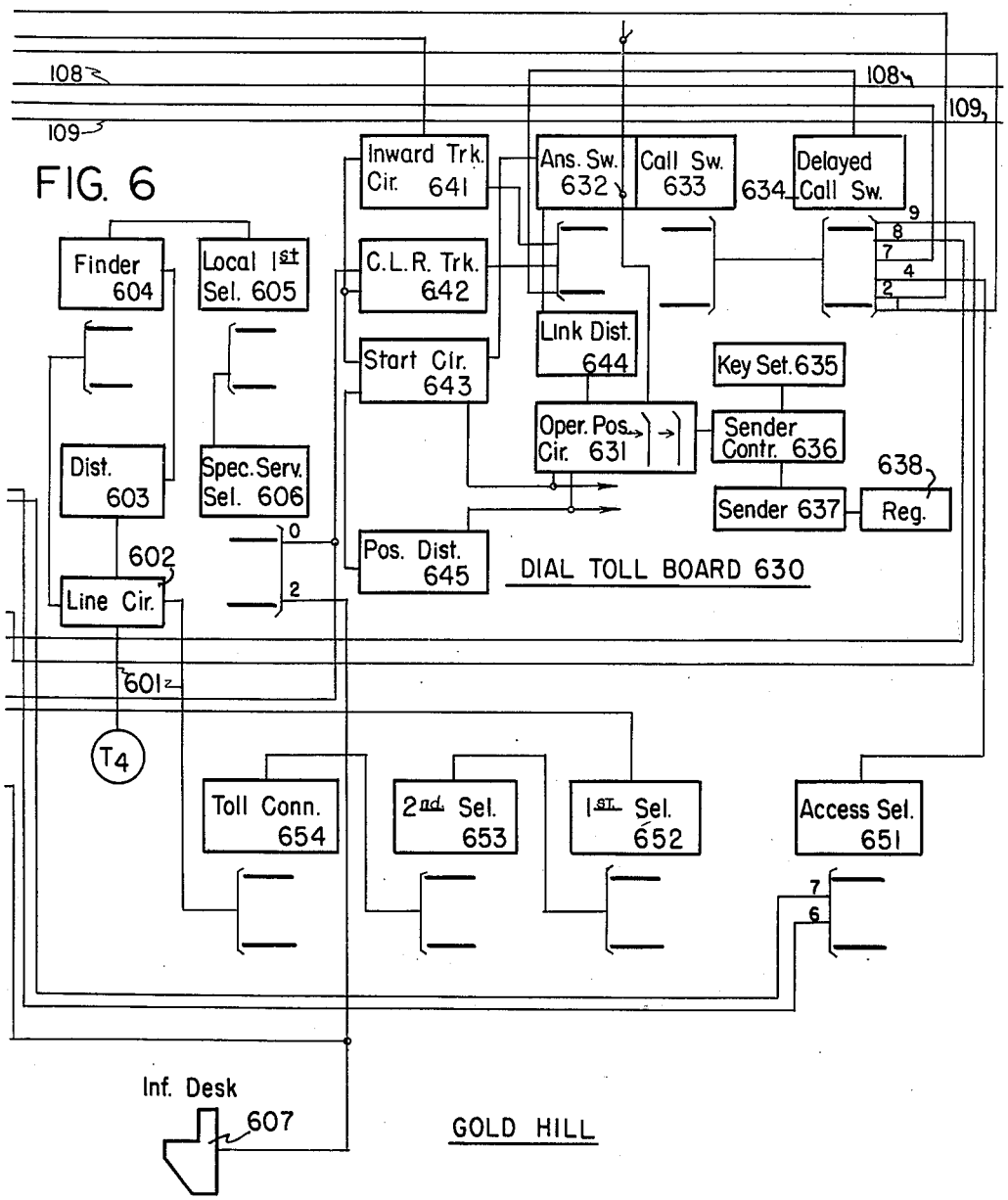
Figure 7:
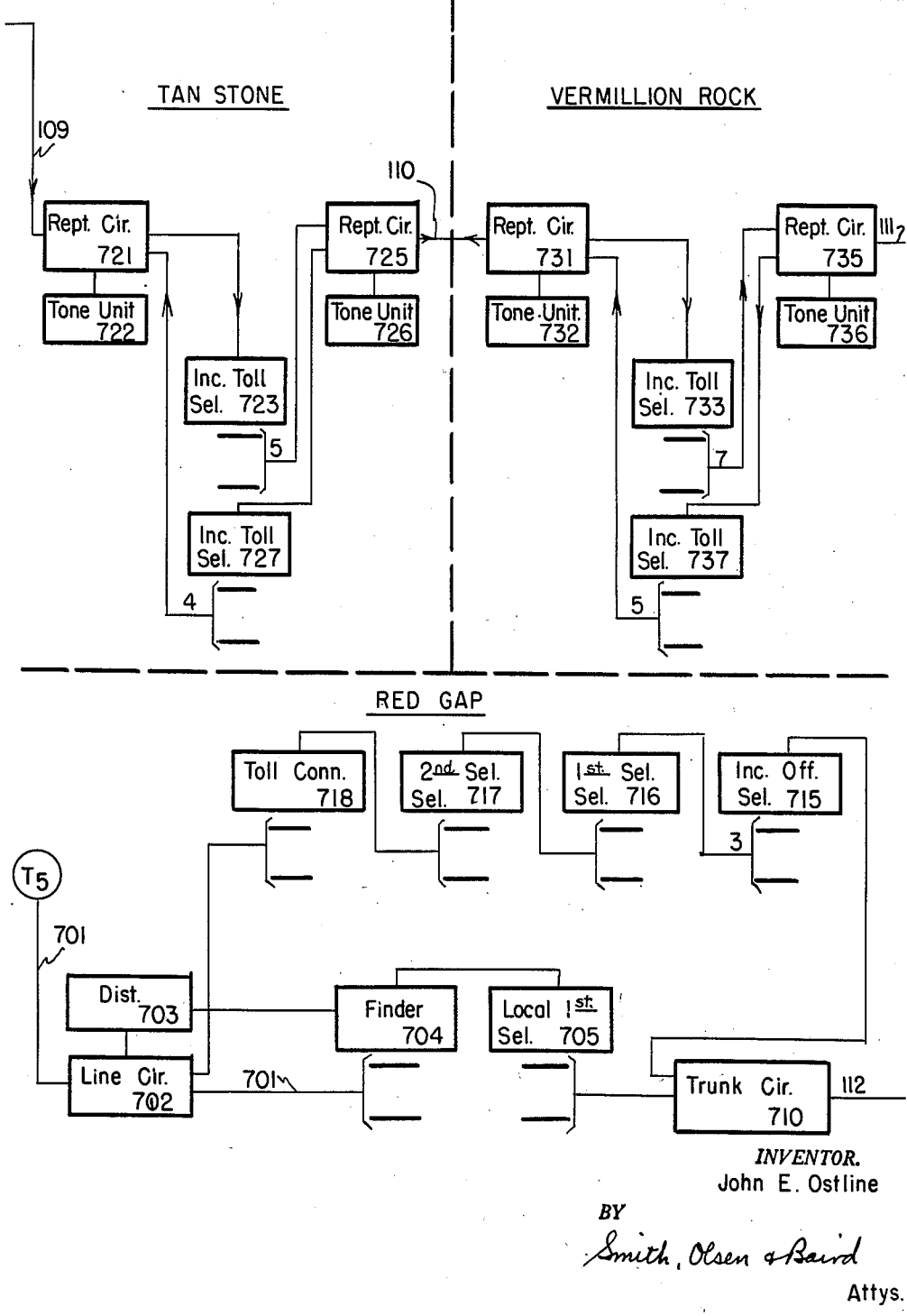
Figure 8:
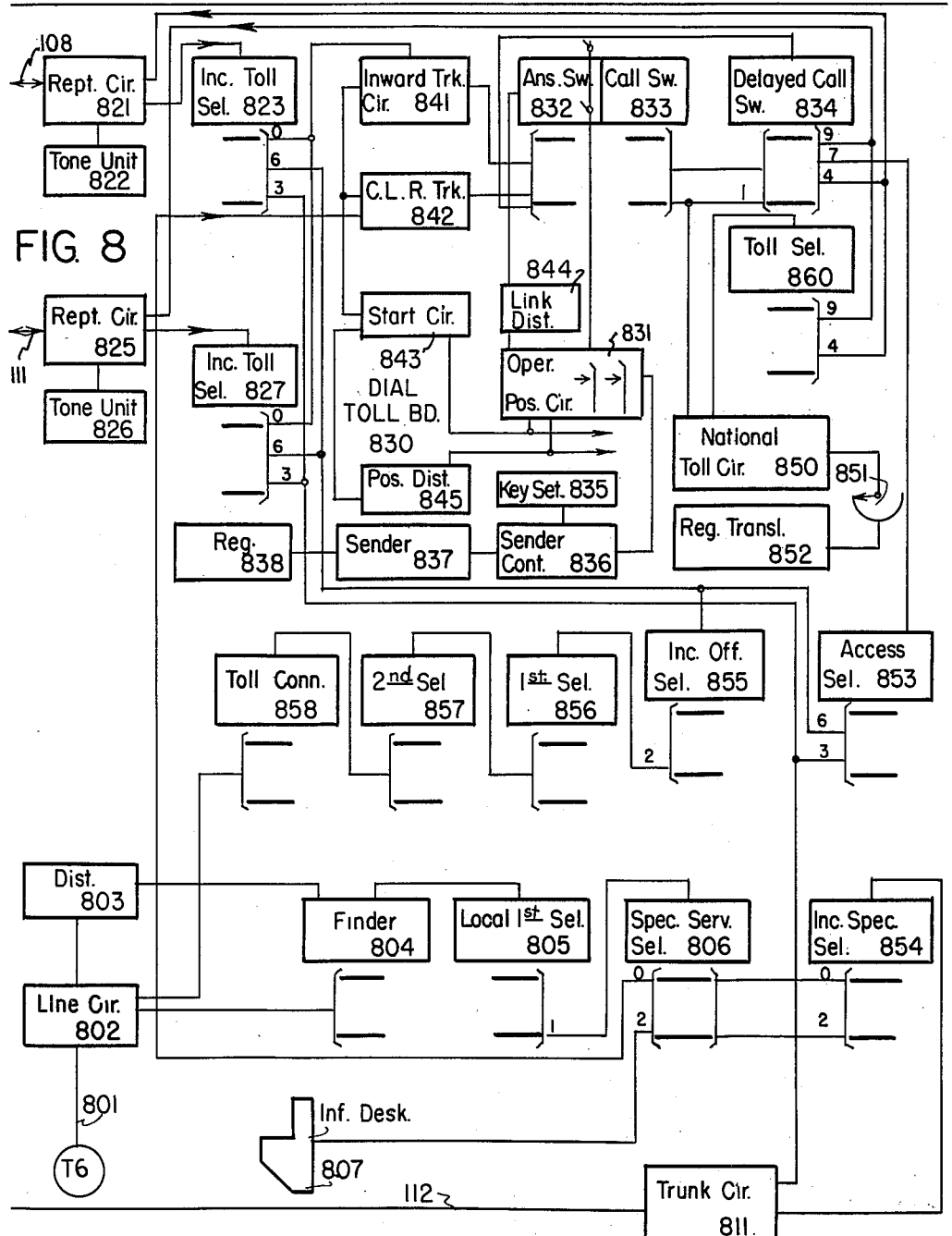

More particularly, the lower portion of Fig. 2 illustrates diagrammatically some of the apparatus incorporated in the Blue Ridge office; the upper portion of Fig. 2 and Fig. 3 illustrates diagrammatically some of the apparatus incorporated in the Amber Town toll office; the left-hand portion of Fig. 4 illustrates diagrammatically some of the apparatus incorporated in the Maroon Lea office; the right-hand portion of Fig. 4 illustrates diagrammatically some of the apparatus incorporated in the Orange Bay office; the lower portion of Fig. 5 illustrates diagrammatically some of the apparatus incorporated in the Green Field office; the upper portion of Fig. 5 and Fig. 6 illustrate diagrammatically some of the apparatus incorporated in the Gold Hill toll office; the upper left portion of Fig. 7 illustrates diagrammatically some of the apparatus incorporated in the Tan Stone office; the upper right portion of Fig. 7 illustrates diagrammatically some of the apparatus incorporated in the Vermillion Rock office; the lower portion of Fig. 7 illustrates diagrammatically some of the apparatus incorporated in the Red Gap Office; and Fig. 8 illustrates diagrammatically some of the apparatus incorporated in the Rose Land toll office.

Figure 12:
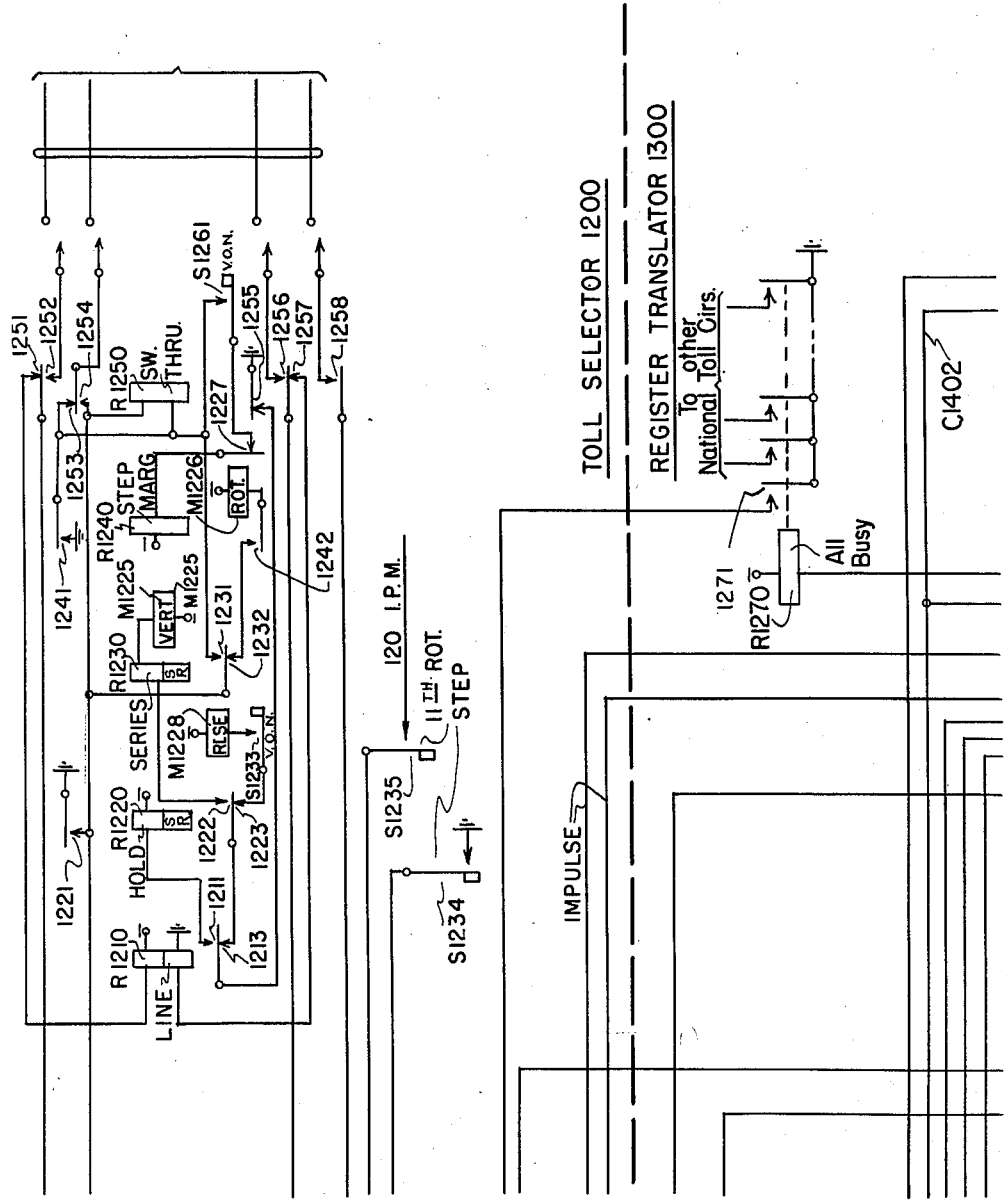
Figure 13:
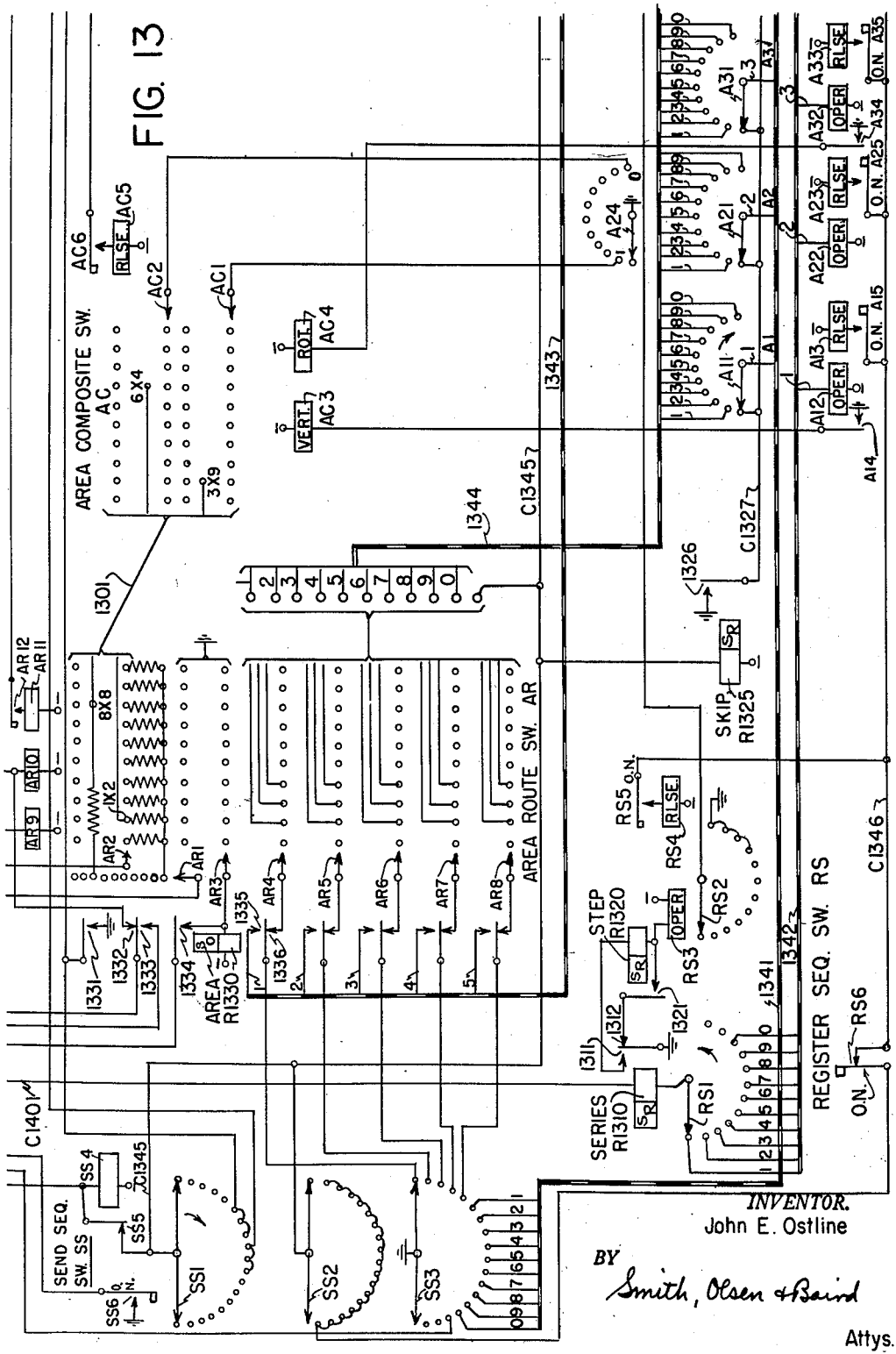
Figure 14:
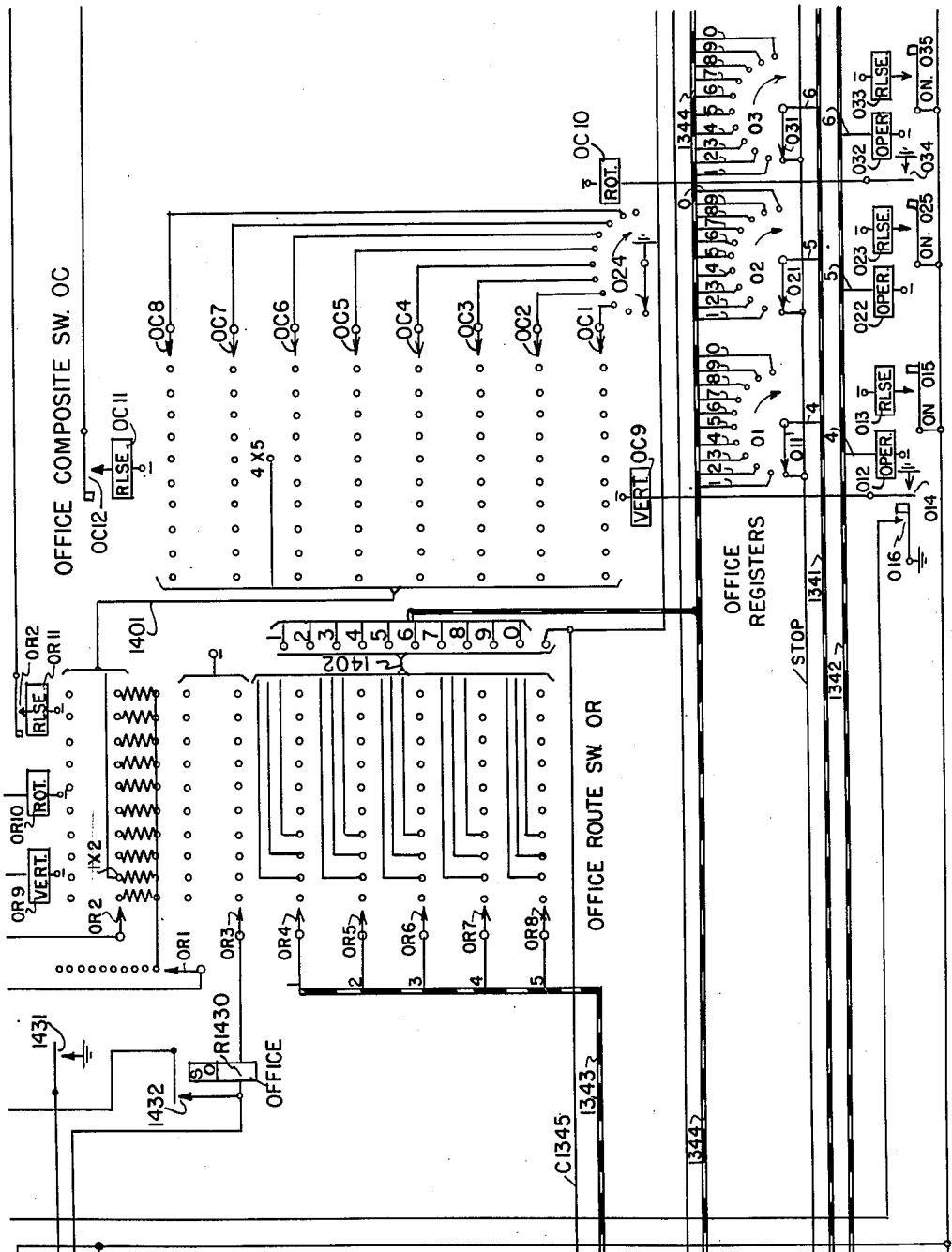
Figure 15:
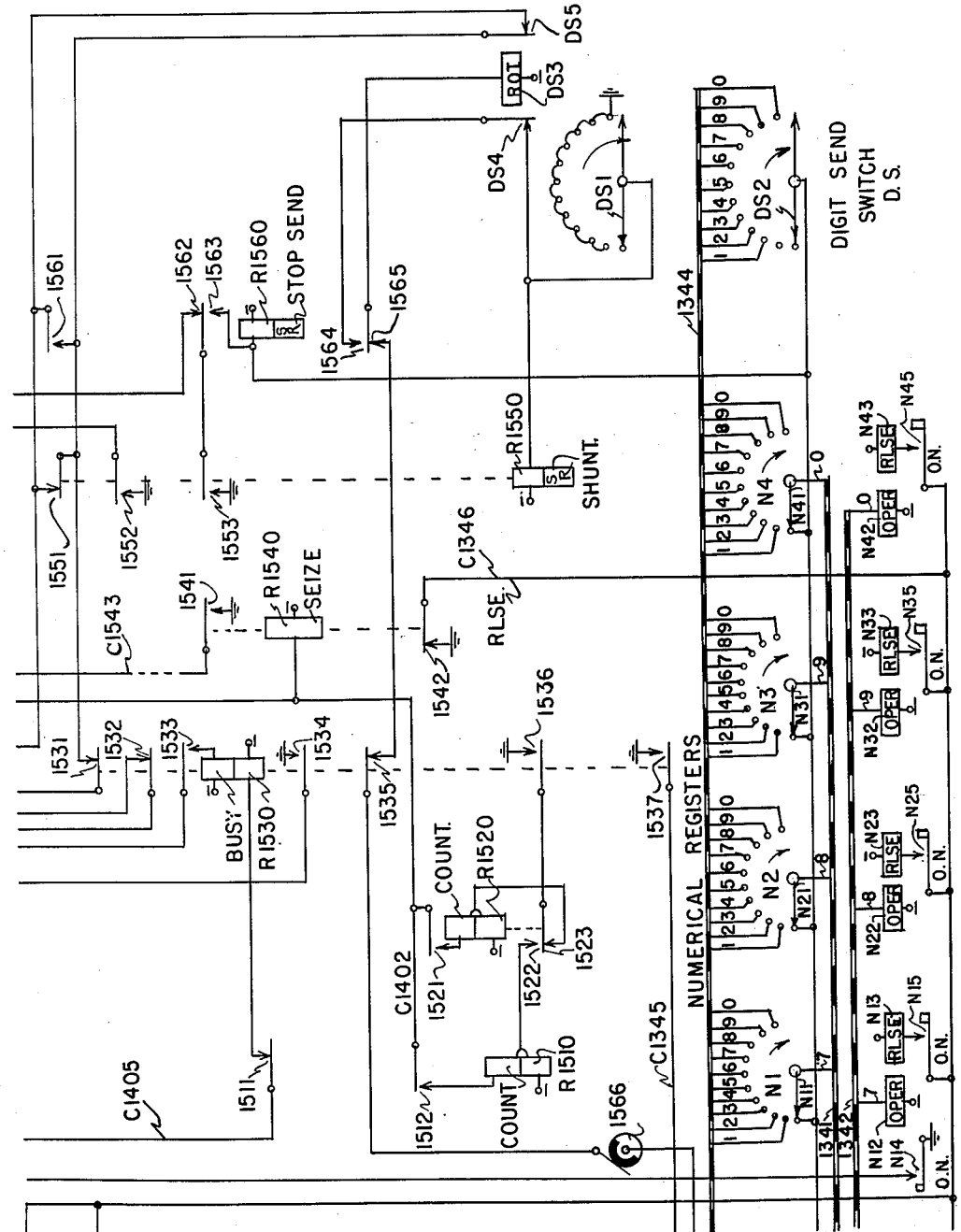

More particularly, the upper portion of Fig. 10 illustrates a portion of the details of the operator position circuit 1003 disposed at the dial toll board 1000 in the Amber Town toll office, as well as one of the associated links provided with an answer switch 1081 and a call switch 1082; the upper portion of Fig. 11 illustrates the details of one of the national toll circuits 1100 disposed in the Amber Town toll office, together with the associated finder 1150; and the upper portion of Fig. 12 illustrates the details of one of the toll selectors 1200 disposed in the Amber Town toll office and individually associated with the national toll circuit 1100. Finally, the lower portions of Figs. 10, 11 and 12 and Figs. 13, 14 and 15 illustrate the details of one of the register translators 1300 disposed in the Amber Town toll office and accessible to the finder 1150.

Referring now more particularly to Fig. 1 of the drawings, the telephone system there illustrated serves a vast territory that may be commensurate with that of a nation, such, for example, as the United States. The territory is divided into a large number of toll areas that are assigned individual area codes. As illustrated, the toll areas respectively disposed on the left, center and right of the territory are respectively assigned the area codes 218, 614 and 319; other immediate toll areas being positioned between the toll areas 218 and 614, and between the toll areas 614 and 319. In the arrangement the territory is so vast that in fact virtually every toll area comprises a tandem position with respect to every other toll area, although one may gain the impression from the simplified diagram of Fig. 1 that the toll areas 218 and 319 are terminal toll areas, which arrangement is not contemplated. Each toll area in the territory may be commensurate with a single city therein or with an entire state, depending upon the number of subscribers served by the particular toll area.

Each of the toll areas comprises one toll office and one or more other offices. Thus the toll areas 218, 614 and 319 respectively comprise the toll offices Amber Town, Gold Hill and Rose Land, and respectively comprise the other offices Blue Ridge, Green Field and Red Gap. Also the intermediate toll areas positioned between the toll areas 218 and 614 comprise the offices Maroon Lea and Orange Bay; while the intermediate toll areas positioned between the toll areas 614 and 319 comprises the offices Tan Stone and Vermillion Rock. Each office in each area is assigned an individual office code. Thus the office code of the Amber Town toll office may be AM7 or merely 267; the office code of the Blue Ridge office may be BL6 or merely 256; the office code of the Gold Hill toll office may be GO4 or merely 464; the office code of the Green Field office may be GR5 or merely 475; the office code of the Rose Land toll office may be RO2 or merely 762; and the office code of the Red Gap office may be RE3 or merely 733. Each office serves a number of subscriber lines and a maximum of 10,000 subscriber lines; and in each office each subscriber line is assigned a line number individual thereto. Thus the Blue Ridge office serves the subscriber substation T1 connected to the subscriber line assigned the line number 1234; the Amber Town toll office serves the subscriber substation T2 connected to the subscriber line assigned the line number 1234; the Green Field office serves the subscriber substation T3 connected to the subscriber line assigned the line number 1234; the Gold Hill toll office serves the subscriber substation T4 connected to the subscriber line assigned the line number 1234; the Red Gap office serves the subscriber substation T5 connected to the subscriber line assigned the line number 1234; and the Rose Land toll office serves the subscriber substation T6 connected to the subscriber line assigned the line number 1234.

The various offices in the different toll areas are interconnected by groups of toll and trunk lines. Thus the Blue Ridge and Amber Town offices are connected by a group of trunk lines, including the trunk line 101; the Green Field and Gold Hill offices are connected by a group of trunk lines, including the trunk line 107; and the Red Gap and Rose Land offices are connected by a group of trunk lines, including the trunk line 112. The Amber Town and Gold Hill offices are connected by a group of toll lines, including the toll line 102. The Amber Town and Orange Bay offices are connected by a group of toll lines, including the toll line 103; the Amber Town and Maroon Lea offices are connected by a group of toll lines, including the toll line 105; the Gold Hill and Orange Bay offices are connected by a group of toll lines, including the toll line 104; and the Orange Bay and Maroon Lea offices are connected by a group of toll lines including the toll line 106. Likewise, the Gold Hill and Rose Land offices are connected by a group of toll lines, including the toll line 108; the Gold Hill and Tan Stone offices are connected by a group of toll lines, including the toll line 109; the Tan Stone and Vermillion Rock offices are connected by a group of toll lines, including the toll line 110; and the Vermillion Rock and Rose Land offices are connected by a group of toll lines, including the toll line 111.

In accordance with the trunking plan each toll area in the territory is assigned an individual three-digit code, the first digit of which may be 2 to 9, the second digit of which may be 1 or 0, and the third digit of which may be 1 to 0. Each office in each toll area is assigned an individual three-digit code, the first digit of which may be 2 to 9, the second digit of which may be 2 to 9 and the third digit of which may be 1 to 0. Each subscriber line in each office is assigned an individual line number, the number of digits included therein being commensurate with the size of the office, line numbers in 10,000-line offices comprising four digits, line numbers in 1000-line offices comprising three digits, etc. Also, in accordance with the trunking plan the toll board in each toll office is assigned the number 110 and may be reached by any subscriber substation in any office in the toll area by dialing the number 110. Likewise, the numbers 112, etc., are assigned to the information desk, etc., in each toll office in each toll area. Accordingly, it will be understood that the national directory number of each subscriber line in the territory comprises a three-digit area code, a three-digit office code and a multi-digit line number depending upon the size of the office; whereby each subscriber line in a 10,000-line office comprises a ten-figure national directory number, since it comprises a four-digit line number.

Referring now to Figs. 2 to 8, inclusive, the subscriber line 201 extending to the subscriber substation T1 in the Blue Ridge office terminates in a line circuit 202 provided with a distributor 203 and is accessible to a group of finders, including the finder 204, the finder 204 being paired with a local first selector 205. Also the subscriber line 201 is accessible to a group of toll connectors, including the toll connector 218; that, in turn, is accessible to a group of second selectors, including the second selector 217; that, in turn, is accessible to a group of first selectors, including the first selector 216; that, in turn, is accessible to a group of incoming office selectors, including the incoming office selector 215. One end of the trunk line 101 terminates in a trunk circuit 210 disposed in the Blue Ridge office and individually connected to the incoming office selector 215 and accessible to the various local first selectors 205, etc. Likewise, the subscriber line 501 extending to the subscriber substation station T3 in the Green Field office terminates in a line circuit 502 provided with a distributor 503 and is accessible to a group of finders, including the finder 504, the finder 504 being paired with a local first selector 505. Also the subscriber line 501 is accessible to a group of toll connectors, including the toll connector 518; that, in turn, is accessible to a group of second selectors, including the second selector 517; that, in turn, is accessible to a group of first selectors, including the first selector 516; that, in turn, is accessible to a group of incoming office selectors, including the incoming office selector 515. One end of the trunk line 107 terminates in a trunk circuit 510 disposed in the Green Field office and individually connected to the incoming office selector 515 and accessible to the various local first selectors 505, etc. Likewise, the subscriber line 701 extending to the subscriber substation T5 in the Red Gap office terminates in a line circuit 702 provided with a distributor 703 and is accessible to a group of finders, including the finder 704, the finder 704 being paired with a local first selector 705. Also the subscriber line 701 is accessible to a group of toll connectors, including the toll connector 718; that, in turn, is accessible to a group of second selectors, including the second selector 717; that, in turn, is accessible to a group of first selectors, including the first selector 716; that, in turn, is accessible to a group of incoming office selectors, including the incoming office selector 715. One end of the trunk line 112 terminates in a trunk circuit 710 disposed in the Red Gap office and individually connected to the incoming office selector 715 and accessible to the various local first selectors 705, etc.

The subscriber line 221 extending to the subscriber substation T2 in the Amber Town office terminates in a line circuit 222 provided with a distributor 223 and is accessible to a group of finders, including the finder 224, the finder 224 being paired with a local first selector 225. Also the subscriber line 221 is accessible to a group of toll connectors, including the toll connector 254; that is, in turn, accessible to a group of second selectors, including the second selector 253; that, in turn, is accessible to a group of first selectors, including the first selector 252. The local first selector 225 has access to a group of special service selectors, including the special service selector 226; that, in turn, has access to a group of trunks extending to an information desk 227. Also the Amber Town office comprises a dial toll board 1000 provided with a plurality of operator positions, including the first operator position circuit 1003, and a position distributor 245. The operator position circuit 1003 comprises a plurality of links, one of which is illustrated and includes an answer switch 1081 and a call switch 1082, as well as an associated start circuit 243 and a link distributor 244. Also the operator position circuit 1003 comprises a key set 235, an associated sender control circuit 236 and a connected sender 237 and a connected register 238. Also associated with the toll board 1000 are a group of inward trunk circuits, including the inward trunk circuit 241, and a group of C. L. R. trunk circuits, including the C. L. R. trunk circuit 242. Further a group of delayed call switches, including the delayed call switch 234, is accessible to the various answer switches 1081, etc. The C. L. R. trunk circuits 242, etc., are accessible to the special service selectors 226, etc., and to a group of incoming special service selectors, including the incoming special service selector 251. Also the incoming special service selectors 251, etc., have access to the trunks extending to the information desk 227. One end of the trunk line 101 terminates in a trunk circuit 211 that is individually connected to the incoming special service selector 251.

One end of the toll line 102 terminates in a repeater circuit 301 provided with an individual tone unit 302 and an individually connected incoming toll selector 321. Likewise, one end of the toll line 103 terminates in a repeater circuit 303 provided with an individual tone unit 304 and an individually connected incoming toll selector 323. Finally, one end of the toll line 105 terminates in a repeater circuit 306 provided with an individual tone unit 307 and an individually connected incoming toll selector 326. Further, the Amber Town office comprises a group of national toll circuits, including the national toll circuit 1100, the national toll circuit 1100 having an individual finder 1150 and an individually connected toll selector 1200. Also the Amber Town office includes a group of register translators, including the register translator 1300, accessible to the finders 1150, etc. Finally, the Amber Town office comprises a group of incoming office selectors, including the incoming office selector 332, and a group of access selectors, including the access selector 331. The answer switches 1081, etc., have access to the inward trunk circuits 241, etc., and to the C. L. R. trunk circuits 242, etc. The call switches 1082, etc., and the delayed call switches 234, etc., have access to the national toll circuits 1100, etc., to the access selectors 331, etc., to the repeater circuits 301, etc., to the repeater circuits 303, etc., and to the repeater circuits 306, etc. The incoming toll selectors 321, 323, 326, etc., have access to the trunk circuits 211, etc., to the inward trunk circuits 241, etc., and to the incoming office selectors 332, etc. The incoming office selectors 332, etc., have access to the first selectors, 252, etc.; while the access selectors 331, etc., have access to the trunk circuits 211, etc., and to the incoming office selectors 332, etc. The toll selectors 1200 have access to the repeater circuits 301, etc., to the repeater circuits 303, etc., and to the repeater circuits 306, etc.

The subscriber line 601 extending to the subscriber substation T4 in the Gold Hill office terminates in a line circuit 602 provided with a distributor 603 and is accessible to a group of finders, including the finder 604, the finder 604 being paired with a local first selector 605. Also, the subscriber line 601 is accessible to a group of connectors, including the toll connector 654; that is, in turn, accessible to a group of second selectors, including the second selector 653; that is, in turn, accessible to a group of first selectors, including the first selector 652. The local first selector 605 has access to a group of special service selectors, including the special service selector 606; that, in turn, has access to a group of trunks extending to an information desk 607. Also the Gold Hill office comprises a dial toll board 630 provided with a plurality of operator positions, including the first operator position circuit 631, and a position distributor 645. The operator position circuit 631 comprises a plurality of links, one of which is illustrated and includes an answer switch 632 and a call switch 633, as well as an associated start circuit 643 and a link distributor 644. Also the operator position circuit 631 comprises a key set 635, an associated sender control circuit 636 and a connected sender 637 and a connected register 638. Also associated with the toll board 630 are a group of inward trunk circuits, including the inward trunk circuit 641, and a group of C. L. R. trunk circuits, including the C. L. R. trunk circuit 642. Further a group of delayed call switches, including the delayed call switch 634, is accessible to the various answer switches 632, etc. The C. L. R. trunk circuits 642, etc., are accessible to the special service selector 606, etc., and to a group of incoming special service selectors, including the incoming special service selector 527, also the incoming special service selectors 527, etc., have access to the trunks extending to the information desk 607. One end of the trunk line 107 terminates in a trunk circuit 511 that is individually connected to the incoming special service selector 527.

One end of the toll line 102 terminates in a repeater circuit 521 provided with an individual tone unit 522 and an individually connected incoming toll selector 525. Likewise, one end of the toll line 104 terminates in a repeater circuit 523 provided with an individual tone unit 524 and an individually connected incoming toll selector 526. Similarly, one end of the toll line 103 terminates in a repeater circuit 541 provided with an individual tone unit 542 and an individually connected incoming toll selector 543. Similarly, one end of the toll line 109 terminates in a repeater circuit 546 provided with an individual tone unit 547 and an individually connected incoming toll selector 548. Further the Gold Hill office comprises a group of national toll circuits, including the national toll circuit 529, the national toll circuit 529 having an individual finder 530 and an individually connected toll selector 549. Also the Gold Hill office includes a group of register translators, including the register translator 531, accessible to the finders 530, etc. Finally the Gold Hill office comprises a group of incoming office selectors, including the incoming office selector 528, and a group of access selectors, including the access selector 651. The answer switches 632, etc., have access to the inward trunk circuits 641, etc., and to the C. L. R. trunk circuits 642, etc. The call switches 633, etc., and the delayed call switches 634, etc., have access to the national toll circuits 529, etc., to the access selectors 651, etc., to the repeater circuits 541, etc., to the repeater circuits 523, etc., and to the repeater circuits 546, etc. The incoming toll selectors 525, 526, 543, 548, etc., have access to the trunk circuits 511, etc., to the inward trunk circuits 641, etc., to the incoming office selectors 528, etc., and to the national toll circuits 529, etc. The incoming office selectors 528, etc., have access to the first selectors 652, etc., while the access selectors 651, etc., have access to the trunk circuits 511, etc., and to the incoming office selectors 528, etc. The toll selectors 549, etc., have access to the repeater circuits 521, etc., to the repeater circuits 541, etc., to the repeater circuits 523, etc., and to the repeater circuits 546, etc.

The subscriber line 801 extending to the subscriber substation T5 in the Rose Land office terminates in a line circuit 802 provided with a distributor 803 and is accessible to a group of finders, including the finder 804, the finder 804 being paired with a local first selector 805. Also the subscriber line 801 is accessible to a group of toll connectors, including the toll connector 858; that is, in turn, accessible to a group of second selectors, including the second selector 857; that, in turn, is accessible to a group of first selectors, including the first selector 856. The local first selector 805 has access to a group of special service selectors, including the special service selector 806; that, in turn, has access to a group of trunks extending to an information desk 807. Also the Rose Land office comprises a dial toll board 830 provided with a plurality of operator positions, including the first operator position circuit 831, and a position distributor 845. The operator position circuit 831 comprises a plurality of links, one of which is illustrated and includes an answer switch 832 and a call switch 833, as well as an associated start circuit 843 and a link distributor 844. Also the operator position circuit 831 comprises a key set 835, an associated sender control circuit 836 and a connected sender 837 and a connected register 838. Also associated with the toll board 830 is a group of inward trunk circuits, including the inward trunk circuit 841, and a group of C. L. R. trunk circuits, including the C. L. R. trunk circuit 842. Further a group of delayed call switches, including the delayed call switch 834, is accessible to the various answer switches 832, etc. The C. L. R. trunk circuits 842, etc., are accessible to the special service selectors 806, etc., and to a group of incoming special service selectors, including the incoming special service selector 854. Also the incoming special service selectors 854, etc., have access to the trunks extending to the information desk 807. One end of the trunk line 112 terminates in a trunk circuit 811 that is individually connected to the incoming special service selector 854.

One end of the toll line 108 terminates in a repeater circuit 821 provided with an individual tone unit 822 and an individually connected incoming toll selector 823. Likewise, one end of the toll line 111 terminates in a repeater circuit 825 provided with an individual tone unit 826 and an individually connected incoming toll selector 827. Further the Rose Land office comprises a group of national toll circuits, including the national toll circuit 850 having an individual finder 851 and an individually connected toll selector 860. Also the Rose Land office includes a group of register translators, including the register translator 852, accessible to the finders 851, etc. Finally the Rose Land office comprises a group of incoming office selectors, including the incoming office selector 855, and a group of access selectors, including the access selector 853. The answer switches 832, etc., have access to the inward trunk circuits 841, etc., and to the C. L. R. trunk circuits 842, etc. The call switches 833, etc., and the delayed call switches 834, etc., have access to the national toll circuits 850, etc., to the access selectors 853, etc., to the repeater circuits 821, etc., and to the repeater circuits 825, etc. The incoming toll selectors 823, 827, etc., have access to the trunk circuits 811, etc., to the inward trunk circuits 841, etc., and to the incoming office selectors 855, etc. The incoming office selectors 855, etc., have access to the first selectors 856, etc.; while the access selectors 853, etc., have access to the trunk circuits 811, etc., and to the incoming office selectors 855, etc. The toll selectors 860 have access to the repeater circuits 821, etc., and to the repeater circuits 825, etc.

In the Maroon Lea office, one end of the toll line 105 terminates in a repeater circuit 401 provided with an individual tone unit 402 and an individually connected incoming toll selector 403. Likewise, one end of the toll line 106 terminates in a repeater circuit 404 provided with an individual tone unit 405 and an individually connected incoming toll selector 406. The incoming toll selectors 403, etc., have access to the repeater circuits 404, etc.; while the incoming toll selectors 406, etc., have access to the repeater circuits 401, etc.

In the Orange Bay office, one end of the toll line 103 terminates in a repeater circuit 410 provided with an individual tone unit 411 and an individually connected incoming toll selector 412. Likewise, one end of the toll line 106 terminates in a repeater circuit 413 provided with an individual tone unit 414 and an individually connected incoming toll selector 415. Finally one end of the toll line 104 terminates in a repeater circuit 416 provided with an individual tone unit 417 and an individually connected incoming toll selector 418. The incoming toll selectors 412, etc., and the incoming toll selectors 415, etc., have access to the repeater circuits 416, etc.; while the incoming toll selectors 418, etc., have access to the repeater circuits 410, etc., and to the repeater circuit 413, etc.

In the Tan Stone office one end of the toll line 109 terminates in a repeater circuit 721 provided with an individual tone unit 722 and an individually connected incoming toll selector 723. Likewise, one end of the toll line 110 terminates in a repeater circuit 725 provided with an individual tone unit 726 and an individually connected incoming toll selector 727. The incoming toll selectors 723, etc., have access to the repeater circuits 725, etc.; while the incoming toll selectors 727, etc., have access to the repeater circuits 721, etc.

In the Vermillion Rock office one end of the toll line 110 terminates in a repeater circuit 731 provided with an individual tone unit 732 and an individually connected incoming toll selector 733. Likewise, one end of the toll line 111 terminates in a repeater circuit 735 provided with an individual tone unit 736 and an individually connected incoming toll selector 737. The incoming toll selectors 733, etc., have access to the repeater circuits 735, etc.; while the incoming toll selectors 737, etc., have access to the repeater circuits 731, etc.

*Sect. 2.—The apparatus incorporated in the telephone system*

Preferably the dial toll boards 1000, 630 and 830 respectively disposed in the toll offices at Amber Town, Gold Hill and Rose Land are substantially identical to that disclosed in United States Patent No. 2,353,212, granted on July 11, 1944, to Harvey W. Balzer, with the exception of certain minor changes that have been incorporated in the operator position circuits 1003, etc., in the answer switches 1081, etc., and in the call switches 1082, etc., as disclosed in Fig. 10. More particularly, each operator position circuit 1003, etc., is modified slightly by the addition of a national toll key K1002, a national toll relay R1025, an auxiliary dial rear relay R1010 and two control relays R1015 and R1020; while each answer switch 1081, etc., and each call switch 1082, etc., are modified slightly to include the respective control conductors C1033 and C1032 for a purpose more fully explained hereinafter. Moreover, each delayed call switch 234, etc., has been modified slightly in accordance with the modification in each call switch 1082, etc., for the purpose noted and explained more fully hereinafter. Also as illustrated in Fig. 10 the call switch 1082 comprises a Strowger mechanism provided with a vertical magnet M1071, a rotary magnet M1072 and a release magnet M1073, as well as a relay group including a line relay R1040, a hold relay R1050 and a switch-through relay R1060. Thus, for example, it will be understood that the toll board 1000 in the Amber Town office comprises the operator position circuit 1003, the answer switch 1081, the call switch 1082, the delayed call switch 234, the key set 235, the sender control circuit 236, the sender 237, the register 238, the inward trunk circuit 241, the C. L. R. trunk circuit 242, the start circuit 243, the link distributor 244, the position distributor 245 respectively corresponding to these elements as disclosed in the Balzer patent mentioned.

Preferably the repeater circuits 301, etc., in the Amber Town office, the repeater circuits 521, etc., in the Gold Hill office and the various other corresponding repeater circuits in the various other offices are identical to that disclosed in Figs. 4 to 6, inclusive, of the co-pending application of John Wicks and Otho D. Grandstaff, Serial No. 749,758, filed May 22, 1947. This repeater circuit disclosed in the Wicks and Grandstaff application mentioned constitutes a direct improvement over the repeater circuit disclosed in U. S. Patent No. 2,155,176, granted on April 18, 1939, to John Wicks. Similarly, it is preferred that the tone units 302, etc., 522, etc., respectively associated with the repeater circuits 301, 521, etc., are identical to that disclosed in the co-pending application of Otho D. Grandstaff, Serial No. 738,194, filed March 29, 1947. This tone unit disclosed in the Grandstaff application mentioned constitutes a direct improvement over the tone unit disclosed in U. S. Patent No. 2,159,081, granted on May 23, 1939, to Otho D. Grandstaff. More particularly, each pair of repeater circuits 301—521, etc., and the associated pairs of tone units 302—522, etc., are of the voice frequency dialing and controlling type; whereby the toll lines 102, etc., terminated by the respective pairs of repeater circuits may incorporate voice frequency repeaters, not shown, of the vacuum tube, automatic volume control type. In other words, the repeater circuits of a pair are capable of operating in conjunction with a toll line that, in turn, incorporates voice frequency vacuum tube repeater apparatus.

In each office each subscriber substation is provided with conventional automatic subscriber substation apparatus, and the various finders and selectors are of the conventional Strowger types unless otherwise specifically noted. Likewise, in each office the trunk circuits 211, etc., the distributors 223, etc., and the line circuits 222, etc., may be of any suitable type. Further, in each toll office the information desk 227, etc., may be of any suitable manual type; and in passing it is noted that in each office the first selectors 225, etc., are of the conventional first-digit-drop-back type.

Preferably the national toll circuits 1100, etc., in the various toll offices are identical. As illustrated in Fig. 11, the national toll circuit 1100 comprises a relay group including a line relay R1110, a hold relay R1120, a switch-through R1130 and a cut-through relay R1140; while the individually associated finder 1150 comprises five individual wipers 1151 to 1155, inclusive, provided with an associated rotary magnet M1156.

Preferably the toll selectors 1200, etc., individually associated with the national toll circuits 1100, etc., in the various offices are identical. As illustrated in Fig. 12, the toll selector 1200 comprises a relay group including a line relay R1210, a hold relay R1220, a series relay R1230, a step relay R1240 and a switch-through relay R1250. Also the toll selector 1200 comprises a Strowger mechanism provided with a vertical magnet M1225, a rotary magnet M1226 and a release magnet M1228. Associated with the Strowger mechanism are two sets of switch springs S1261 and S1233 that are operated when the wiper carriage is driven one step in the vertical direction away from its normal vertical position. Also associated with the Strowger mechanism are two sets of switch springs S1234 and S1235 that are operated when the wiper carriage is driven eleven steps in the rotary direction away from its normal rotary position.

Preferably each of the register translators 1300, etc., in the various offices are identical. The register translator 1300 comprises, as illustrated in Figs. 10 to 15, inclusive, three area registers A1, A2 and A3 adapted to register the respective first, second and third digits of the three-digit area code, as well as three office registers O1, O2 and O3 adapted to register the respective first, second and third digits of the three-digit office code, and finally four numerical register N1, N2, N3 and N4 adapted to register the respective first, second, third and fourth digits of the four-digit line number. The first area register A1 is of the minor switch type including a single wiper A11, an operating magnet A12, a release magnet A13 and an off-normal set of switch springs A15; the second area register A2 is of the minor switch type including two wipers A21 and A24, an operating magnet A22, a release magnet A23 and an off-normal set of switch springs A25; and the third area register A3 is of the minor switch type including a single wiper A31, an operating magnet A32, a release magnet A33 and an off-normal set of switch springs A35. The first office register O1 is of the minor switch type including a single wiper O11, an operating magnet O12, a release magnet O13 and two off-normal sets of switch springs O15 and O16; the second office register O2 is of the minor switch type including two wipers O21 and O24, an operating magnet O22, a release magnet O23 and an off-normal set of switch springs O25; and the third office register O3 is of the minor switch type including a single wiper O31, an operating magnet O32, a release magnet O33 and an off-normal set of switch springs O35. The first numerical register N1 is of the minor switch type including a single wiper N11, an operating magnet N12, a release magnet N13 and two off-normal sets of switch springs N14 and N15; the second numerical register N2 is of the minor switch type including a single wiper N21, an operating magnet N22, a release magnet N23 and an off-normal set of switch springs N25; the third numerical register N3 is of the minor switch type including a single wiper N31, an operating magnet N32, a release magnet N33 and an off-normal set of switch springs N35; and the fourth numerical register N4 is of the minor switch type including a single wiper N41, an operating magnet N42, a release magnet N43 and an off-normal set of switch springs N45.

Also the register translator 1300 comprises an area composite switch AC of the Strowger type including two wipers AC1 and AC2, a vertical magnet AC3, a rotary magnet AC4 and a release magnet AC5. A set of off-normal switch springs AC6 is associated with the wiper carriage of the Strowger mechanism and operated when it is driven one step in the vertical direction away from its normal vertical position. The area composite switch AC is set in the vertical direction in accordance with the digit registered in the first area register A1 and is set in the rotary direction in accordance with the digit registered in the third area register A3; and one of the two wipers of the area composite switch AC is selected in accordance with the digit registered in the second area register A2. Similarly the register translator 1300 comprises an office composite switch OC of the Strowger type including eight wipers OC1 to 8, inclusive, a vertical magnet OC9, a rotary magnet OC10 and a release magnet OC11. A set of off-normal switch springs OC12 is associated with the wiper carriage of the Strowger mechanism and operated when it is driven one step in the vertical direction away from its normal vertical position. The office composite switch OC is set in the vertical direction in accordance with the digit registered in the first office register O1 and is set in the rotary direction in accordance with the digit registered in the third office register O3; and one of the eight wipers of the office composite switch OC is selected in accordance with the digit registered in the second office register O2.

Also the register translator 1300 comprises an area route switch AR that is controlled by the area composite switch AC. The area route switch AR is of the Strowger type including a vertical control wiper AR1 and seven rotary wipers AR2 to AR8, inclusive, a vertical magnet AR9, a rotary magnet AR10 and a release magnet AR11. A set of off-normal switch springs AR12 is associated with the wiper carriage of the Strowger mechanism and operated when it is driven one step in the vertical direction away from its normal vertical position. Similarly, the register translator 1300 comprises an office route switch OR that is controlled by the office composite switch OC. The office route switch OR is of the Strowger type including a vertical control wiper OR1 and seven rotary wipers OR2 to OR8, inclusive, a vertical magnet OR9, a rotary magnet OR10 and a release magnet OR11. A set of off-normal switch springs OR12 is associated with the wiper carriage of the Strowger mechanism and operated when it is driven one step in the vertical direction away from its normal vertical position.

Also the register translator 1300 comprises a register sequence switch RS of the minor type provided with two wipers RS1 and RS2, an operating magnet RS3, a release magnet RS4 and an off-normal set of switch springs RS5. The register sequence switch RS has access to the operating magnets A12, etc., of the ten individual registers A1, etc. Also the register 1300 comprises a send sequence switch SS of the rotary type including three wipers SS1 to SS3, inclusive, an operating magnet SS4 and a set of off-normal switch springs SS6. The send sequence switch SS has selective access to the five wipers AR4 to AR8, inclusive, of the area route switch AR and to the five wipers OR4 to OR8, inclusive, of the office route switch OR, as well as access to the wipers A11, etc., of the ten individual registers A1, etc. Also the register translator 1300 comprises a digit send switch DS of the rotary type including two wipers DS1 and DS2 and an operating magnet DS3. The digit send switch DS has access to the ten marking conductors in an associated marking cable 1344 and is utilized for the purpose of controlling the value of each digit that is sent, as explained more fully hereinafter.

Finally the register translator 1300 comprises a relay group including a series relay R1310, a step relay R1320, an area relay R1330, a skip relay R1325, a vertical test relay R1080, a rotary test relay R1085, an office relay R1430, a vertical test relay R1180, a rotary test relay R1185, two counting relays R1510 and R1520, a busy relay R1530, a seize relay R1540, a shunt relay R1550 and a stop send relay R1560. Also associated with the register translators 1300, etc., in the group is a chain circuit including an all-busy relay R1270 that is employed for the purpose of marking as busy all of the national toll circuits 1100, etc., in the group when all of the register translators 1300, etc., in the group are busy, as explained more fully hereinafter. Finally, the register translator 1300 comprises a digit sending cam 1566 operated by a motor, not shown, but adapted to send approximately ten impulses per second as well as two impulsing cams 1088 and 1188 operated by a motor, not shown, and adapted to send impulses at a rate of approximately 15 to 20 impulses per second.

A better understanding of the connection and arrangement of the apparatus incorporated in the telephone system will be facilitated from a consideration of the extension of calls involving the various offices.

*Sect. 3.—C. L. R. and information calls in the Blue Ridge and Amber Town offices*

Now assuming that a call is to be extended from the calling subscriber substation T1 in the Blue Ridge office to the dial toll board 1000 in the Amber Town toll office, the subscriber at the calling subscriber substation T1 first initiates the call controlling the line circuit 202 over the subscriber line 201, whereby the distributor 203 is governed to assign an idle finder, such, for example, as the finder 204 in order to cause the finder 204 to find the subscriber line 201. The subscriber at the calling subscriber substation T1 then dials the operator code 110, whereby the local first selector 205 responds to the first digit 1 and then drops back and then responds to the second digit 1 to select the group of trunk circuits, including the trunk circuit 210, and then to select an idle trunk circuit in this group. Assuming that the local first selector 205 selects the trunk circuit 210, the trunk circuit 211 is controlled over the trunk line 101 to effect seizure of the incoming special service selector 251. The incoming special service selector 251 then responds to the third digit 0 to select the group of C. L. R. trunk circuits, including the C. L. R. trunk circuit 242, and then to select an idle C. L. R. trunk circuit in this group. Assuming that the incoming special service selector 251 selects the C. L. R. trunk circuit 242, the start circuit 243 controls the position distributor 245 to assign an available operator position at the dial toll board 1000. Assuming that the first operator position circuit 1003 is assigned, the link distributor 244 is controlled to assign one of the links associated therewith, such, for example, as the link comprising the answer switch 1081 and the call switch 1082. The start circuit 243 and the link distributor 244 then control the answer switch 1081 in order to cause it to select the C. L. R. trunk circuit 242. The operator at the position circuit 1003 then answers the call and converses with the subscriber at the calling subscriber substation T1 and learns of the required extension thereof.

In view of the foregoing it will be understood that a call initiated at the calling subscriber substation T2 in the Amber Town toll office may be extended to the dial toll board 1000 therein in a substantially identical manner. More particularly, the call is extended from the calling subscriber substation T2 in response to the dialing of the operator code 110 and may be answered at the first operator position 1003 at the dial toll board 1000; which connection may involve the subscriber line 221, the line circuit 222, the finder 224, the local first selector 225, the special service selector 226, the C. L. R. trunk circuit 242 and the answer switch 1081. Again the operator at the position circuit 1003 at the dial toll board 1000 is advised by the subscriber at the calling subscriber substation T2 of the required extension of the call.

Also in view of the foregoing it will be understood that an information call may be extended from the calling subscriber substation T1 in the Blue Ridge office to the information desk 227 in the Amber Town toll office in a substantially identical manner in response to dialing of the information code 112. In extending this call the incoming special service selector 251 responds to the third digit 2 to select the group of trunks extending to the information desk 227 and then to select an idle trunk therein. The operator at the information desk 227 then answers the call and converses with the subscriber at the calling subscriber substation T1, offering any possible information and assistance.

Likewise, an information call may be extended from the calling subscriber substation T2 in the Amber Town toll office to the information desk 227 therein in a substantially identical manner in response to dialing of the information code 112. In extending this call the special service selector 226 responds to the third digit 2 to select the group of trunks extending to the information desk 227 and then to select an idle trunk therein. The subsequent answering of the call by the operator at the information desk 227 is the same as that previously described.

*Sect. 4.—C. L. R. and information calls in the Green Field and Gold Hill Offices*

Now assuming that a call is to be extended from the calling subscriber substation T3 in the Green Field office to the dial toll board 630 in the Gold Hill toll office, the subscriber at the calling subscriber substation T3 first initiates the call controlling the line circuit 502 over the subscriber line 501, whereby the distributor 503 is governed to assign an idle finder, such, for example, as the finder 504 in order to cause the finder 504 to find the subscriber line 501. The subscriber at the calling subscriber substation T3 then dials the operator code 110, whereby the local first selector 505 responds to the first digit 1 and drops back and then responds to the second digit 1 to select the group of trunk circuits, including the trunk circuit 510, and then to select an idle trunk circuit in this group. Assuming that the local first selector 505 selects the trunk circuit 510, the trunk circuit 511 is controlled over the trunk line 107 to effect seizure of the incoming special service selector 527. The incoming special service selector 527 then responds to the third digit 0 to select the group of C. L. R. trunk circuits, including the C. L. R. trunk circuit 642, and then to select an idle C. L. R. trunk circuit in this group. Assuming that the incoming special service selector 527 selects the C. L. R. trunk circuit 642, the start circuit 643 controls the position distributor 645 to assign an available operator position at the dial toll board 630. Assuming that the first operator position circuit 631 is assigned, the link distributor 644 is controlled to assign one of the links associated therewith, such, for example, as the link comprising the answer switch 632 and the call switch 633. The start circuit 643 and the link distributor 644 then control the answer switch 632 in order to cause it to select the C. L. R. trunk circuit 642. The operator at the position circuit 631 then answers the call and converses with the subscriber at the calling subscriber substation T3 and learns of the required extension thereof.

In view of the foregoing it will be understood that a call initiated at the calling subscriber substation T4 in the Gold Hill toll office may be extended to the dial toll board 630 therein in a substantially identical manner. More particularly, the call is extended from the calling subscriber substation T4 in response to the dialing of the operator code 110 and may be answered at the first operator position 631 at the dial toll board 630; which connection may involve the subscriber line 601, the line circuit 602, the finder 604, the local first selector 605, the special service selector 606, the C. L. R. trunk circuit 642 and the answer switch 632. Again the operator at the position circuit 631 at the dial toll board 630 is advised by the subscriber at the calling subscriber substation T4 of the required extension of the call.

Also in view of the foregoing it will be understood that an information call may be extended from the calling subscriber substation T3 in the Green Field office to the information desk 607 in the Gold Hill toll office in a substantially identical manner in response to dialing of the information code 112. In extending this call the incoming special service selector 527 responds to the third digit 2 to select the group of trunks extending to the information desk 607 and to select an idle trunk therein. The operator at the information desk 607 then answers the call and converses with the subscriber at the calling subscriber substation T3, offering any possible information and assistance.

Likewise, an information call may be extended from the calling subscriber substation T4 in the Gold Hill toll office to the information desk 607 therein in a substantially identical manner in response to dialing of the information code 112. In extending this call the special service selector 606 responds to the third digit 2 to select the group of trunks extending to the information desk 607 and then to select an idle trunk therein. The subsequent answering of the call by the operator at the information desk 607 is the same as that previously described.

*Sect. 5.—C. L. R. and information calls in the Red Gap and Rose Land offices*

Now assuming that a call is to be extended from the calling subscriber substation T5 in the Red Gap office to the dial toll board 830 in the Rose Land toll office, the subscriber at the calling subscriber substation T5 first initiates the call controlling the line circuit 702 over the subscriber line 701, whereby the distributor 703 is governed to assign an idle finder such, for example, as the finder 704 in order to cause the finder 704 to find the subscriber line 701. The subscriber at the calling subscriber substation T5 then dials the operator code 110, whereby the local first selector 705 responds to the first digit 1 and drops back and then responds to the second digit 1 to select the group of trunk circuits, including the trunk circuit 710, and then to select an idle trunk circuit in this group. Assuming that the local first selector 705 selects the trunk circuit 710, the trunk circuit 811 is controlled over the trunk line 112 to effect seizure of the incoming special service selector 854. The incoming special service selector 854 then responds to the third digit 0 to select the group of C. L. R. trunk circuits, including the C. L. R. trunk circuit 842, and then to select an idle C. L. R. trunk circuit in this group. Assuming that the incoming special service selector 854 selects the C. L. R. trunk circuit 842, the start circuit 843 controls the position distributor 845 to assign an available operator position at the dial toll board 830. Assuming that the first operator position circuit 831 is assigned, the link distributor 844 is controlled to assign one of the links associated therewith, such, for example, as the link comprising the answer switch 832 and the call switch 833. The start circuit 843 and the link distributor 844 then control the answer switch 832 in order to cause it to select the C. L. R. trunk circuit 842. The operator at the position circuit 831 then answers the call and converses with the subscriber at the calling subscriber substation T5 and learns of the required extension thereof.

In view of the foregoing it will be understood that a call initiated at the calling subscriber substation T6 in the Rose Land toll office may be extended to the dial toll board 830 therein in a substantially identical manner. More particularly, the call is extended from the calling subscriber substation T6 in response to the dialing of the operator code 110 and may be answered at the first operator position 831 at the dial toll board 830; which connection may involve the subscriber line 801, the line circuit 802, the finder 804, the local first selector 805, the special service selector 806, the C. L. R. trunk circuit 842 and the answer switch 832. Again the operator at the position circuit 831 at the dial toll board 830 is advised by the subscriber at the calling subscriber substation T6 of the required extension of the call.

Also in view of the foregoing it will be understood that an information call may be extended from the calling subscriber substation T5 in the Red Gap office to the information desk 807 in the Rose Land toll office in a substantially identical manner in response to the dialing of the information code 112. In extending this call the incoming special service selector 854 responds to the third digit 2 to select the group of trunks extending to the information desk 807 and then to select an idle trunk therein. The operator at the information desk 807 then answers the call and converses with the subscriber at the calling subscriber substation T5, offering any possible information and assistance.

Likewise, an information call may be extended from the calling subscriber substation T6 in the Rose Land toll office to the information desk 807 therein in a substantially identical manner in response to the dialing of the information code 112. In extending this call the special service selector 806 responds to the third digit 2 to select the group of trunks extending to the information desk 807 and then to select an idle trunk therein. The subsequent answering of the call by the operator at the information desk 807 is the same as that previously described.

*Sect. 6.—Toll calls from the dial toll board in the Amber Town office to subscriber substations in the Green Field office*

Now assuming that the operator at the position circuit 1003 at the dial toll board 1000 in the Amber Town toll office has answered a C. L. R. call utilizing the answer switch 1031 that is to be extended to the called subscriber substation T3 in the Green Field office, the operator at the calling position circuit 1003 first operates the national toll dial key in her position equipment in order to cause the call switch 1082 connected to the position circuit 1003 at this time to operate automatically and select the group of national toll circuits, including the national toll circuit 1100, and then an idle national toll circuit in this group. Assuming that the call switch 1082 selects the national toll circuit 1100, the finder 1150 associated therewith operates to select an idle one of the register translators in the associated group such, for example, as the register translator 1300. When the call was answered by the operator at the position circuit 1003 the sender control circuit 236 was automatically connected thereto, whereby the sender 237 and the register 238 were rendered responsive and the key set 235 was conditioned to control the register 238.

Accordingly, at this time the operator at the position circuit 1003 operates the key set 235 in accordance with the national number of the called subscriber substation T3 which is 614-475-1234. This number comprises the area code 614, the office code 475 and the line number 1234. As the operator at the position circuit 1003 operates the key set 235 in accordance with the ten individual digits of the national number the register 238 responds and registers the individual digits mentioned. The register 238 is of the reflex type responding to the first digit registered to control the sender 237, whereby the first digit registered is transmitted over the call switch 1082 to the national toll circuit 1100; whereby the national toll circuit 1100 repeats the first digit over the finder 1150 to the register translator 1300, causing the first digit to be registered therein. The remaining nine digits are sequentially registered in the register 238 in order to effect operation of the sender 237 to send them in the manner explained above to the register translator 1300. The register 238 is controlled directly from the key set 235 to register the ten digits mentioned and to control the sender 237 to send the ten digits mentioned without translation. Thus the ten digits of the national number setup by the key set 235 are registered directly in the register 238 and transmitted directly by the sender 237 and finally re-registered in the register translator 1300. After the operator at the position circuit 1003 has registered the ten digits of the national number she operates the red button on the key set 235, thereby to condition the sender control circuit 236 to bring about the subsequent release of the sender control circuit 236, the sender 237 and the register 238 when the last digit registered in the register 238 has been sent by the sender 237.

The register translator 1300 responds to the area code 614 in order to determine whether the called toll area is remote from or near the toll area 218 of the calling Amber Town toll office. In the event the register translator 1300 determines that the called toll area is remote from the toll area 218 of the calling Amber Town toll office, it is controlled to transmit one or more area routing digits in order to extend the connection to a toll office in a tandem toll area and then to re-transmit the national toll number as registered in order that further extension of the connection may be brought about under the control of the apparatus in the toll office in the tandem toll area mentioned. On the other hand, in the event the register translator 1300 determines that the called toll area is near the toll area 218 of the calling Amber Town toll office, it responds to the called office code to transmit one or more office routing digits. In this case the register translator 1300 also determines whether the office code as registered is required in the further extension of the connection and transmits the office code as registered, if it is required, and ultimately the called line number. Accordingly, in the event of the determination that the called toll area is near the toll area 218 of the calling Amber Town toll office the register translator 1300 completes the extension of the connection directly to the called subscriber substation.

In the present example the called toll area 614 is near the toll area 218 of the calling Amber Town toll office. Accordingly, the register translator 1300 extends the connection directly to the called subscriber substation T3 in the called Green Field office in the called toll area 614. More particularly, the register translator 1300 registers the national toll number 614-475-1234 and initiates the transmission of the office code digits as previously noted. In the present example there are three routes between the calling Amber Town toll office and the Gold Hill toll office in the called toll area 614, which three routes respectively comprise first, second and third routing choices. The first routing choice is directly between the Amber Town toll office and the Gold Hill toll office by way of the group of toll lines, including the toll line 102; the second routing choice is by way of the Orange Bay office between the Amber Town toll office and the Gold Hill toll office by way of the groups of toll lines respectively including the toll lines 103 and 104; and the third routing choice is by way of the Maroon Lea and Orange Bay offices between the Amber Town toll office and the Gold Hill toll office by way of the groups of toll lines respectively including the toll lines 105, 106 and 104.

Accordingly, the register translator 1300 attempts the first choice route transmitting no office routing digits followed by the called office code 475 and the called line number 1234. In the event this first choice route is available the toll selector 1200 may respond to the first office code digit 4 to select the group of repeater circuits, including the repeater circuit 301, and then an idle repeater circuit in this group. The toll selector 1200 may select the repeater circuit 301, whereby the repeater circuit 301 controls the repeater circuit 521 over the toll line 102 to effect seizure of the incoming toll selector 525. The incoming toll selector 525 may respond to the second office code digit 7 to select the group of trunk circuits, including the trunk circuit 511, and then to select an idle trunk circuit in this group. The incoming toll selector 525 may select the trunk circuit 511; whereby the trunk circuit 511 controls the trunk circuit 510 over the trunk line 107 to seize the incoming office selector 515. The incoming office selector 515 may respond to the third office code digit 5 to select the group of first selectors, including the first selector 516, and then to select an idle first selector in this group. The incoming office selector 515 may select the first selector 516. The first selector 516 may respond to the first numerical digit 1 to select the group of second selectors, including the second selector 517, and then to select an idle second selector in this group. The first selector 516 may select the second selector 517. The second selector 517 may respond to the second numerical digit 2 to select the group of connectors, including the connector 518, and then to select an idle connector in this group. The second selector 517 may select the connector 518. The connector 518 then responds to the third numerical digit 3 and then to the fourth numerical digit 4 to select the subscriber line 501 extending to the called subscriber substation T3. The connector 518 then operates to test the idle or busy condition of the subscriber line 501, causing ringing current to be projected thereover in the event the called subscriber substation T3 is idle at this time and causing a busy signal to be returned over the switch train in the event the called subscriber substation T3 is busy at this time. Assuming that the called subscriber substation is idle at this time ringing current is projected thereto over the subscriber line 501 from the connector 518; and when the subscriber at the called subscriber substation T3 answers the call, a connection is completed between the calling operator position circuit 1003 at the dial toll board 1000 in the Amber Town toll office and the called subscriber substation T3 in the Green Field office. The operator at the position circuit 1003 advises the subscriber of the called subscriber substation T3 with reference to the toll call for him and then governs her position equipment in order to cut the call through the link comprising the answer switch 1081 and the call switch 1082 to the exclusion of the operator position circuit 1003.

In the operation of the register translator 1300 should an all-trunks-busy condition be encountered by the toll selector 1200 in the first choice route in response to the first office code digit 4, the register translator 1300 is controlled to attempt the second choice route, transmitting the office routing digit 7 followed by the called office code 475 and the called line number 1234. In the event this second choice route is available the connection is extended in a manner substantially identical to that described above and may involve the toll selector 1200, the repeater circuit 303, the toll line 103, the repeater circuit 410, the incoming toll selector 412, the repeater circuit 416, the toll line 104, the repeater circuit 523 the incoming toll selector 526, and the trunk circuit 511, as well as the other elements of the switch train extending to the called subscriber substation T3. In the operation of the register translator 1300 should an all-trunks-busy condition be encountered by the toll selector 1200 in the second choice route in response to the first office routing digit 7, the register translator 1300 is controlled to attempt the third choice route, transmitting the office routing digits 8 and 5 followed by the called office code 475 and the called line number 1234. In the event this third choice route is available the connection is extended in a manner substantially identical to that described above and may involve the toll selector 1200, the repeater circuit 306, the toll line 105, the repeater circuit 401, the incoming toll selector 403, the repeater circuit 404, the toll line 106, the repeater circuit 413, the incoming toll selector 415, the repeater circuit 416, the toll line 104, the repeater circuit 523, the incoming toll selector 526, and the trunk circuit 511, as well as the other elements of the switch train extending to the called subscriber substation T3. In the operation of the register translator 1300 should an all-trunks-busy condition be encountered by the toll selector 1200 in the third choice route in response to the first office routing digit 8, the register translator 1300 is not controlled to attempt a further choice route. More specifically, should the toll selector 1200 encounter an all-trunks-busy condition in the third choice route an all-trunks-busy signal is returned therefrom to the operator position circuit 1003 at the dial toll board 1000 indicating the circumstances noted.

Moreover, in extending the call via any one of the routes should a subsequent toll selector in the route encounter an all-trunks-busy condition a corresponding all-trunks-busy signal is returned to the operator position circuit 1003 at the dial toll board 1000 in order to indicate the circumstance noted. Finally, in the extension of a connection should a toll connector having access to the called subscriber line test the called subscriber line as busy a corresponding line-busy signal is returned over the connection to the operator position circuit 1003 at the dial toll board 1000 in order to indicate the circumstance noted. The all-trunks-busy signal comprises 120 impulses per minute while the line-busy signal comprises 60 impulses per minute. Accordingly, the supervisory lamp at the operator position circuit 1003 at the dial toll board 1000 is flashed either at a rate of 120 per minute or at the rate of 60 per minute indicating the respective busy conditions mentioned.

After the register translator 1300 has transmitted all of the various digits it is released and the national toll circuit 1100 is switched through. The manner in which the various repeaters 301, 521, etc., are controlled by the respectively associated tone units 302, 522, etc., is disclosed in complete detail in the previously mentioned copending application of Wicks and Grandstaff. But in passing it is noted that this control is based upon the transmission of splashes of 1000 cycle current over the associated toll line for dialing purposes and upon the transmission of short and long splashes of 60 cycle modulated 2000 cycle current for supervisory purposes. This arrangement permits the transmission of digits and supervisory signals over the toll line extending between two of the repeater circuits notwithstanding the circumstance that the toll line may incorporate voice frequency vacuum tube repeater apparatus, not shown. Since this type of apparatus is well understood as disclosed in the previously mentioned Wicks patent, further elaboration is omitted in the interests of brevity.

Consider now in greater detail with reference to Figs. 10 to 15, inclusive, the operations of the operator position circuit 1003 at the dial toll board 1000, the call switch 1082, the national toll circuit 1100, the toll selector 1200, and the register translator 1300 in the extension of the present call from the operator position circuit 1003 at the dial toll board 1000 in the Amber Town toll office to the called subscriber substation T3 in the Green Field office. The operator at the position circuit first operates and then restores the national toll dial key K1002 in order to effect operation of the national toll relay R1025 and the control relay R1020. Upon operating the national toll relay R1025 completes, at the contacts 1027, a holding circuit, including the contacts 1017, for retaining operated the national toll relay R1025 and the control relay R1020 subsequent to the restoration of the national toll dial key K1002. Also upon operating the control relay R1020 completes, at the contacts 1021, a path, including the contacts 1016 and 1012, for applying ground potential to the control conductor C1032. Also the national toll relay R1025 completes, at the contacts 1026, a circuit for energizing the winding of the control relay R1015 in order to cause the latter relay to operate shortly thereafter, it being of the combination slow-to-operate and slow-to-release type. Upon operating the control relay R1015 interrupts, at the contacts 1017, the holding circuit for retaining operating the national toll relay R1025 and the control relay R1020; and interrupts, at the contacts 1016, the path for applying ground potential to the control conductor C1032. Upon restoring the national toll relay R1025 interrupts, at the contacts 1026, the circuit for energizing the winding of the control relay R1015 in order to cause the latter relay to restore shortly thereafter, it being of the combination slow-to operate and slow-to-release type. Accordingly, ground potential is first applied to and then removed from the control conductor C1032 as a consequence of the operation and restoration of the national toll dial key K1002; whereby the vertical magnet M1071 of the Strowger mechanism incorporated in the call switch 1082 is operated and then restored in order to drive the wiper carriage of the Strowger mechanism one step in the vertical direction away from its normal vertical position. Operation of the rotary magnet M1072 of the Strowger mechanism incorporated in the call switch 1082 is then effected; whereby the call switch 1082 selects an idle trunk in the group, including the trunk 1160, extending to the national toll circuit 1100. Assuming that the Strowger mechanism incorporated in the call switch 1082 seizes the trunk 1160, the switch-through relay R1060 operates; whereby a loop circuit is completed between the sender 237 associated with the operator position circuit 1003 and the line conductors C1162 and C1161 of the trunk 1160, and consequently via the contacts 1131 and 1137 to the upper and lower windings of the line relay R1110 in the national toll circuit 1100, causing the latter relay to operate.

Upon operating the line relay R1110 completes, at the contacts 1111, a circuit for operating the hold relay R1120. Upon operating the hold relay R1120 completes, at the contacts 1121, a path for applying ground potential to the control conductor C1163 of the trunk 1160 in order to mark the national toll circuit 1100 as busy to the other switches having access thereto. Also the hold relay R1120 completes, at the contacts 1123, a test circuit, including the contacts 1157, 1135 and 1143, between the wiper 1152 of the finder 1150 and the rotary magnet M1156; whereby the rotary magnet M1156 is operated in the event the test wiper 1152 of the finder 1150 is standing on a hold conductor extending to a busy register translator. More particularly, ground potential appears upon hold conductors extending to busy register translators; and battery potential appears upon hold conductors extending to idle register translators. Accordingly, the rotary magnet M1156 is operated buzzer fashion, if necessary, to select a hold conductor extending to an idle register translator. Assuming that the register translator 1300 is the first idle register translator in the associated group, the rotary magnet M1156 is operated buzzer fashion to cause the wipers 1151, etc., of the finder 1150 to select the conductors C1401, etc., extending to the register translator 1300. At this time battery potential via the winding of the seize relay R1540 is applied to the hold conductor C1402, completing a path substantially identical to that previously traced for short circuiting the rotary magnet M1156 in order to prevent further operation thereof. Also at this time a circuit, including the contacts 1134 and 1122, is completed for energizing the winding of the cut-through relay R1140 in series with the rotary magnet M1156 and the multiple connected winding of the seize relay R1540; whereby the cut-through relay R1140 operates. Upon operating the cut-through relay R1140 interrupts, at the contacts 1143, the previously traced series circuit for energizing the winding thereof and the winding of the seize relay R1540; however, the cut-through relay R1140 is retained in its operated position by the completed holding circuit for energizing the winding thereof in series with a rotary magnet M1156. Also the cut-through relay R1140 completes, at the contacts 1142, a path for applying direct ground potential to the test wiper 1152 of the finder 1150, and consequently to the hold conductor C1402, in order to effect operation of the seize relay R1540. Further, the cut-through relay R1140 completes, at the contacts 1141, 1144, 1145 and 1146, connections to the wipers 1151, 1153, 1154 and 1155 of the finder 1150, and consequently to the conductors C1401, C1403, C1404 and C1405 extending to the register translator 1300.

Upon operating the seize relay R1540 interrupts, at the contacts 1542, a path for applying ground potential to the release conductor C1346; and prepares, at the contacts 1541, a point in a chain circuit, including the chain conductor C1543, for operating the all-busy-relay R1270. Thus it will be understood that when all of the register translators 1300, etc., in the group are busy the chain circuit is completed effecting operation of the busy relay R1270. Upon operating the busy relay R1270 completes, at the contacts, 1271, etc., direct paths for applying ground potential to the control conductors C1163, etc., of the various trunks 1160, etc., extending to the various national toll circuits 1100, etc. Thus when all of the register translators 1300, etc., are busy, all of the national toll circuits 1100, etc., are artificially marked as busy to the various switches having access thereto. Of course, it will be understood that when any of the register translators 1300, etc., in the group becomes idle the chain circuit is interrupted causing the all-busy-relay R1270 to restore and remove the artificial busy markings from the national toll circuits 1100, etc.

Continuing now with the operation of the national toll circuit 1100 when the impulse conductors C1403 and C1404 are cut-through by operation of the cut-through relay R1140 a loop circuit, including the contacts 1531, 1551, 1251 and 1257, is completed for operating the line relay R1210 in the toll selector 1200. Upon operating the line relay R1210 completes, at the contacts 1211, a circuit, including the contacts 1255, for operating the hold relay R1220. Upon operating the hold relay R1220 completes, at the contacts 1221, a multiple path for applying ground potential to the control conductor C1163 of the trunk 1160. At this time the first digit registered in the register 238 is sent by the sender 237 via the call switch 1082 and the line conductors C1162 and C1161 to the line relay R1110 in the national toll circuit 1100; whereby the latter relay follows the impulse of this first digit. Each time the line relay R1110 restores and then reoperates it interrupts and then recompletes, at the contacts 1111, the circuit for retaining operated the hold relay R1120 causing the latter relay to remain operated during impulsing as it is of the slow-to-release type. Also each time the line relay R1110 restores and then reoperates it completes and this interrupts, at the contacts 1113, a path including the contacts 1141, and the wiper 1151 of the finder 1150, for applying ground potential to the pulse conductor C1401; thereby to complete and then interrupt a circuit, including the wiper RS1 of the register sequence switch RS and the engaged first contacts in the associated contact bank and the first conductor in the cable 1342, for energizing the winding of the series relay R1310 in series with the operating magnet A12 of the area A1. Accordingly, the series relay R1310 operates and remains operated during impulsing as it is of the slow-to-release type, while the operating magnet A12 of the area register A1 operates and restores intermittently. More particularly, the first digit 6 of the area code is repeated by the line relay R1110 to the operating magnet A12 and is accordingly registered in the first area register A1.

More particularly, the wiper A11 of the first area register A1 disengages the home contact and engages the sixth contact in the associated contact bank, disconnecting the first conductor in the cable 1341 from the stop conductor C1341 and connecting the first conductor in the cable 1341 to the sixth conductor in the marking cable 1344; all for a purpose more fully explained hereinafter. Also when the wiper A11 of the first area register A1 is driven to disengage the home contact in the associated contact bank the set of switch springs A15 is operated in order to prepare the release magnet A13 for subsequent operation via the release conductor C1346.

Upon operating the series relay R1310 completes, at the contacts 1311, a circuit for operating the step relay R1320. At the conclusion of the first digit 6 of the area code the line relay R1110 is retained in its operated position causing the series relay R1310 to restore shortly thereafter, it being of the slow-to-release type. Upon restoring the series relay R1310 completes, at the contacts 1312, a circuit, including the contacts 1321, for energizing the operating magnet RS3 of the register sequence switch RS. Also upon restoring the series relay R1310 interrupts, at the contacts, 1311, the circuit, for retaining operated the step relay R1320 in order to cause the latter relay to restore shortly thereafter, it being of the slow-to-release type. Upon restoring the step relay R1320 interrupts, at the contacts 1321, the circuit for energizing the operating magnet RS3; whereby the operating magnet RS3 restores. Thus the operating magnet RS3 operates and then restores driving the wipers RS1 and RS2 of the register sequence switch RS one step in the counterclockwise direction. At this time the wiper RS1 of the register sequence switch RS disengages the first contact and engages the second contact in the associated contact bank; whereby the operating magnet A22 of the area register A2 is selected via the second conductor in the cable 1342.

Thus it will be understood that the first digit 6 of the area code was registered in the first area register A1 while the register sequence switch RS occupied its first position and that at the conclusion of this registration the area sequence switch RS was operated to its second position. In a similar manner the line relay R1110 repeats the second digit 1 and the third digit 4 of the area code to the respective area registers A2 and A3; and, of course, the three digits of the office code and the four digits of the line number are respectively registered in the three office registers O1 to O3, inclusive, and in the respective numerical registers N1 to N4, inclusive. Thus the digits of the national number 614–475–1234 are registered in the respective area registers A1, A2 and A3, the respective office registers O1, O2 and O3 and the respective numerical registers N1, N2, N3 and N4. At this time the sender control circuit 236, the sender 237 and the registers 238 associated with the operator position circuit 1003 at the dial toll board 1000 are released, assuming that the operator has operated the red button on the key set 235.

Incident to the registration of the first area code digit 6 in the first area register A1 the operating magnet A12 controls the contacts A14; whereby the digit 6 is repeated to the vertical magnet AC3 of the area composite switch AC. Likewise, incident to the registration of the third area code digit 4 in the third area register A3 the operating magnet A32 controls the contacts A34; whereby the digit 4 is repeated to the rotary magnet AC4 of the area composite switch AC. Moreover as the second area code digit 1 is registered in the second area register A2 the wiper A24 is operated to select the first contact in the associated contact bank extending to the first wiper AC1 of the area composite switch AC. Thus when the area code digits 6, 1 and 4 are registered the area composite switch AC is set into its 6 up 4 in position and ground potential is applied to the first wiper AC1 thereof; whereby a ground marking is produced via the jumper field 1301 between the contact bank of the area composite switch AC and the contact bank of the area route switch AR for a purpose more fully explained hereinafter.

When the first office code digit 4 is registered in the first office register O1 the set of switch springs O16 is operated applying ground potential to the impulsing cam 1088 that is operated by the associated motor, not shown; whereby ground impulses are transmitted via the contacts 1087 and 1083 to the vertical magnet AR9 of the area route switch AR. Accordingly, the wiper carriage of the Strowger mechanism incorporated in the area route switch AR is driven step by step in the vertical direction under the control of the vertical wiper AR1 and the associated vertical test relay R1080. When the wiper carriage of the Strowger mechanism incorporated in the area route switch AR is driven a number of steps in the vertical direction corresponding to the marked contact in the associated contact bank a circuit is completed for energizing the right-hand winding of the vertical test relay R1080 causing the latter relay to operate and interrupt, at the contacts 1083, the above-traced circuit for operating the vertical magnet AR9 and to complete, at the contacts 1082, a substantially identical circuit for transmitting impulses to the rotary magnet AR10. For example, in the present instance the 6 up 4 in contact in the contact bank of the area composite switch AC may be cross jumpered to the 1 up 2 in contact in the contact bank of the area route switch AR; whereby the vertical control wiper AR1 encounters this ground potential via the associated resistor upon the first vertical step of the wiper carriage of the area route switch AR. The circuit mentioned extends from the ground 1 up 2 in contact in the contact bank of the area route switch AR via the associated resistor, the vertical control wiper AR1 and the engaged first contact in the associated vertical control contact bank, the right-hand winding of the vertical test relay R1080 and the vertical magnet AR9 to battery potential. This circuit is completed when the first pulse from the impulsing cam 1088 subsides. Upon operating the vertical test relay R1080 completes, at the contacts 1081, a holding circuit via the grounded hold conductor C1402 for energizing the left-hand winding thereof.

Accordingly, at this time ground impulses from the impulsing cam 1088 are transmitted to the rotary magnet AR10; whereby the wiper carriage of the Strowger mechanism incorporated in the area route switch AR is driven step by step in the rotary direction under the control of the rotary control wiper AR2 and the rotary test relay R1085. In the present example when the wiper carriage of the Strowger mechanism has been driven two steps in the rotary direction away from its normal position the 1 up 2 in contact in the associated contact bank is engaged; whereby ground potential via the rotary control wiper AR2 is extended to energize the right-hand winding of the rotary test relay R1085 in series with the rotary magnet AR10. This circuit is completed when the second pulse transmitted from the impulsing cam 1088 to the rotary magnet AR10 subsides. When the rotary test relay R1085 is thus energized it operates to complete, at the contacts 1086, a holding circuit for energizing the left-hand winding thereof via the grounded hold conductor C1402. Also the rotary test relay R1085 interrupts, at the contacts 1087, the circuit for transmitting impulses to the rotary magnet AR10. In passing it is noted that the rotary test relay R1085 is of the marginal type in order to prevent false operation thereof between the rotary steps of the Strowger mechanism incorporated in the area route switch AR and until the directly grounded 1 up 2 in contact is engaged by the associated rotary control wiper AR2. This is effected by the two series connected resistors included in the circuit for energizing the right-hand winding of the rotary test relay R1085 prior to engagement of the marked contact noted by the rotary test wiper AR2. Thus at this time the vertical test relay R1080 and the rotary test relay R1085 have controlled operation of the wiper carriage of the Strowger mechanism incorporated in the area route switch AR to cause it to be set into the 1 up 2 in position cross jumpered via the jumper field 1301 to the 6 up 4 in position of the wiper carriage of the Strowger mechanism incorporated in the area composite switch AC. Hence, the area composite switch AC is set in accordance with the 3 digits of the area code 614 and, in turn, causes the area route switch AR to be set to establish an area routing in accordance therewith.

More particularly, at this time the area route switch AR determines whether the identified called area code 614 is near or remote from the calling Amber Town toll office. This determination is dependent upon the strapping in the contact bank of the Strowger mechanism associated with the rotary wiper AR3 extending to the area relay R1330. In the present example the identified called area 614 is near the calling Amber Town office so that ground potential is jumpered to the contact engaged by the rotary wiper AR3, the 1 up 2 in contact in the associated contact bank; whereby a circuit is completed for energizing the winding of the area relay R1330. Shortly thereafter the area relay R1330 operates, it being of the slow-to-operate type in order to prevent false operation thereof between rotary steps of the wiper carriage of the Strowger mechanism incorporated in the area route switch AR.

Thus operation of the area relay R1330 is indicative of the circumstance that the called area 614 is near the calling Amber Town office. Upon operating the area relay R1330 completes, at the contacts 1334, a holding circuit for energizing the winding thereof via the grounded hold conductor C1402. Also the area relay R1300 interrupts, at the contacts 1336, etc., the connections between the five wipers AR4 to AR8, inclusive, of the Strowger mechanism incorporated in the area route switch AR and the respective first five contacts in the contact bank associated with the wiper SS3 of the send sequence switch SS and completes, at the contacts 1335 etc., similar connections between the five wipers OR4 to OR8, inclusive, of the Strowger mechanism incorporated in the office route switch OR and the respective first five contacts in the contact bank associated with the wiper SS3 of the send sequence switch SS. Also the area relay R1330 prepares, at the contacts 1331, a circuit traced hereinafter for operating the office relay R1430; and grounds the 6th, 7th and 8th contacts in the contact bank associated with the wiper SS1 of the send sequence switch SS for a purpose more fully explained hereinafter.

Incident to the registration of the first office code digit 4 in the first office register O1 the operating magnet O12 controls the contacts O14; whereby the digit 4 is repeated to the vertical magnet OC9 of the office composite switch OC. Likewise, incident to the registration of the third office code digit 5 in the third office register O3 the operating magnet O32 controls the contacts O34; whereby the digit 5 is repeated to the rotary magnet OC10 of the office composite switch OC. Moreover as the second office code digit 7 is registered in the second office register O2 the wiper O24 is operated to select the 7th contact in the associated contact bank extending to the sixth wiper OC6 of the office composite switch OC. Thus when the office code digits 4, 7 and 5 are registered, the office composite switch OC is set into its 4 up 5 in position and ground potential is applied to the sixth wiper OC6 thereof; whereby a ground marking is produced via the jumper field 1401 between the contact bank of the office composite switch OC and the contact bank of the office route switch OR for a purpose more fully explained hereinafter.

When the first line number digit 1 is registered in the first numerical register N1 the set of switch springs N14 is operated applying ground potential to the impulsing cam 1188 that is operated by the associated motor, not shown; whereby ground impulses are transmitted via the contacts 1187 and 1183 to the vertical magnet OR9 of the office route switch OR. Accordingly, the wiper carriage of the Strowger mechanism incorporated in the office route switch OR is driven step by step in the vertical direction under the control of the vertical wiper OR1 and the associated vertical test relay R1180. When the wiper carriage of the Strowger mechanism incorporated in the office switch OR is driven a number of steps in the vertical direction corresponding to the marked contact in the associated contact bank a circuit is completed for energizing the right-hand winding of the vertical test relay R1180 causing the latter relay to operate and interrupt, at the contacts 1183, the above-traced circuit for operating the vertical magnet OR9, and to complete, at the contacts 1182, a substantially identical circuit for transmitting impulses to the rotary magnet OR10. For example, in the present instance the 4 up 5 in contact in the contact bank of the office composite switch OC may be cross jumpered to the 1 up 2 in contact in the contact bank of the office route switch OR; whereby the vertical control wiper OR1 encounters this ground potential via the associated resistor upon the first vertical step of the wiper carriage of the office route switch OR. The circuit mentioned extends from the grounded 1 up 2 in contact in the contact bank of the office route switch OR via the associated resistor the vertical control wiper OR1 and the engaged first contact in the associated vertical control contact bank, the right-hand winding of the vertical test relay R1180 and the vertical magnet OR9 to battery potential. This circuit is completed when the first pulse from the impulsing cam 1188 subsides. Upon operating the vertical test relay R1180 completes, at the contacts 1181, holding circuit via the grounded hold conductor C1402 for energizing the left-hand winding thereof.

Accordingly, at this time ground impulses from the impulsing cam 1188 are transmitted to the rotary magnet OR10; whereby the wiper carriage of the Strowger mechanism incorporated in the office route switch OR is driven step by step in the rotary direction under the control of the rotary control wiper OR2 and the rotary test relay R1185. In the present example, when the wiper carriage of the Strowger mechanism has been driven two steps in the rotary direction away from its normal rotary position the 1 up 2 in contact in the associated contact bank is engaged; whereby ground potential via the rotary control wiper OR2 is extended to energize the right-hand winding of the rotary test relay R1185 in series with the rotary magnet OR10. This circuit is completed when the second pulse transmitted from the impulsing cam 1188 to the rotary magnet OR10 subsides. When the rotary test relay R1185 is thus energized it operates to complete, at the contacts 1186, a holding circuit for energizing the left-hand winding thereof via the grounded hold conductor C1402. Also the rotary test relay R1185 interrupts, at the contacts 1187, the circuit for transmitting impulses to the rotary magnet OR10. In passing it is noted that the rotary test relay R1185 is of the marginal type in order to prevent false operation thereof between the rotary steps of the Strowger mechanism incorporated in the office route switch OR and until the directly grounded 1 up 2 in contact is engaged by the associated rotary control wiper OR2. This is effected by the two series connected resistors included in the circuit for energizing the right-hand winding of the rotary test relay R1185 prior to engagement of the marked contact noted by the rotary test wiper OR2. Thus at this time the vertical test relay R1180 and the rotary test relay R1185 have controlled operation of the wiper carriage of the Strowger mechanism incorporated in the office route switch OR to cause it to be set into the 1 up 2 in position cross jumpered via the jumper field 1401 to the 4 up 5 in position of the wiper carriage of the Strowger mechanism incorporated in the office composite switch OC. Hence, the office composite switch OC is set in accordance with the three digits of the office code 475 and, in turn, causes the office route switch OR to be set to establish an office routing in accordance therewith.

More particularly, at this time the office route switch OR determines whether or not the registered office code is to be sent by the register translator 1300; which is brought about by control of the office relay R1430. More particularly, in the present example the registered office code 475 is to be sent by the register translator so that the office relay R1430 is not operated. This determination is based upon whether the rotary wiper OR3 encounters a contact in the associated contact bank that is connected to battery potential; in which event a circuit is completed for energizing the winding of the office relay R1430 causing the latter relay to operate shortly thereafter it being of the slow-to-operate type in order to prevent false operation thereof between the steps of the wiper carriage of the Strowger mechanism incorporated in the office route switch OR. In the event of operation of the office relay R1430 it completes, at the contacts 1432, a holding circuit for energizing the winding thereof via the grounded hold conductor C1402; and completes, at the contacts 1431, a path for applying ground potential to the ninth, tenth and eleventh contacts in the contact bank associated with the wiper SS1 of the send sequence switch SS for a purpose more fully explained hereinafter. However, as previously noted in the present example, the office relay R1430 is not operated as the registered office code 475 is to be sent by the register translator 1300. Also the operated office route switch OR establishes any required office routing digits; no office routing digits being required in the present example. Since no office routing digits are required in the present example, the contacts engaged by the five wipers OR4 to OR8, inclusive, are wired via the associated jumper field 1402 to the skip conductor C1345 for a purpose more fully explained hereinafter.

In the present example ground potential is extended from the send sequence switch SS via the wiper SS3 and the engaged first contact in the associated contact bank and the contacts 1335 to the wiper OR4 of the office route switch OR and thence to the skip conductor C1345 in order to effect operation of the skip relay R1325. Upon operating the skip relay R1325 completes, at the contacts 1326, a path for applying ground potential to the stop conductor C1327 in order to effect operation of the stop send relay R1560. Upon operating the stop send relay R1560 completes, at the contacts 1561, an additional shunt between the impulsing conductors C1403 and C1404 extending to the line relay R1210 in the toll selector 1200; thereby positively to prevent the sending of a digit from the register translator 1300 via the impulse conductor C1403 and C1404 at this time. Also the stop send relay R1560 interrupts, at the contacts 1565, a point in a circuit traced hereinafter for operating the rotary magnet DS3 of the digit send switch DS. Also the application of ground potential to the skip conductor C1345 completes a circuit, including the contacts SS5, for operating the rotary magnet SS4 of the send sequence switch SS. The rotary magnet SS4 operates to interrupt, at the contacts SS5, the operating circuit thereof; whereby the rotary magnet SS4 restores. When the rotary magnet SS4 thus operates and then restores the wipers SS1 to SS3, inclusive, of the send sequence switch SS are driven one step in the clockwise direction to engage the second contacts in the associated contact banks. When the wiper SS3 disengages the first contact in the associated contact bank it interrupts the previously traced path including the wiper OR4 of the office route switch OR3 for applying ground potential to the skip conductor C1345; and when the wiper SS3 engages the second contact in the associated contact bank ground potential is forwarded via the contacts of the operated area relay R1330 to the wiper OR5 of the office route switch OR. However, since the jumper field 1402 connects the wiper OR5 to the skip conductor C1345 in the present example ground potential is reapplied to the skip conductor C1345 in order to retain operated the skip relay R1325 and to effect another operation and restoration of the rotary magnet SS4 of the send sequence switch SS. In the present example since the wipers OR4 to OR8, inclusive, are connected via the jumper field 1402 to the skip conductor C1345 the rotary magnet SS4 operates buzzer fashion in order to drive automatically the wipers noted of the send sequence switch SS five steps in the clockwise direction and into engagement with the sixth contacts in the associated contact banks. At this time the wiper SS1 engages the sixth contact in the associated contact bank included in a ground multiple by virtue of the operated area relay R1330 completing a substantially identical circuit for reoperating the rotary magnet SS4. More particularly, since the area relay R1330 occupies its operated position the rotary magnet SS4 is operated automatically three additional steps so that the wipers noted of the send sequence switch SS engage the ninth contact in the associated contact banks. At this time the wiper SS3 engages the ninth contact in the associated contact bank extending ground potential to the wiper O11 of the first office register O1; and the wiper SS1 engaging the ninth contact in the associated contact bank tests to determine whether the office relay R1430 occupies its operated position or its restored position. In the event the office relay R1430 occupies its operated position the rotary magnet SS4 is operated automatically three additional steps in order to drive the wipers noted of the send sequence switch SS to engage the twelfth contacts in the associated contact bank. However, in the present example, the office relay R1430 does not occupy its operated position so that the wipers noted of the send sequence switch SS come to rest in engagement with the ninth contacts in the associated contact bank. When the wiper SS1 disengages the eighth contact in the associated contact bank the multiple path for applying ground potential to the skip conductor C1345 is interrupted; whereby the skip relay R1325 restores shortly thereafter, it being of the slow-to-release type. Upon restoring the skip relay R1325 interrupts, at the contacts 1326, the direct path for applying ground potential to the stop conductor C1327. At this time since the first digit 4 of the office code 475 has already been registered in the first office register O1 there is no ground connection between the grounded wiper O11 of the first office register O1 and the stop conductor C1327; whereby the previously traced circuit for retaining operated the stop send relay R1560 is interrupted causing the latter relay to restore shortly thereafter, it being of the slow-to-release type. Upon restoring the stop send relay R1560 interrupts, at the contacts 1561, the additional multiple between the impulse conductors C1403 and C1404; and reprepares at the contact 1565 the previously mentioned circuit for operating the rotary magnet DS3 of the digit send switch DS.

Following the registration of the second digit 2 of the line number 1234 in the second numerical register N2 the register sequence switch RS is operated into its ninth position; whereby the wiper RS1 of the register sequence switch RS selects the operating magnet N32 of the third numerical register N3 for the purpose of registering the third digit 3 of the line number 1234 therein. At this time the wiper RS2 of the register sequence switch RS engages the ninth contact in the associated contact bank included in the grounded multiple; whereby ground potential is extended to the impulsing cam 1566, causing it to transmit a first ground impulse via the contacts 1535 and 1565 to the operating magnet DS3 of the digit send switch DS, causing the magnet DS3 to operate and then restore. When the operating magnet DS3 operates and then restores the wipers DS1 and DS2 of the digit send switch DS are driven one step in the clockwise direction away from their normal rotary positions. When the wiper DS1 of the digit send switch DS engages the first contact in the associated contact bank included in the grounded multiple a circuit is completed for operating the shunt relay R1550. Upon operating the shunt relay R1550 completes, at the contacts 1552, a multiple path for applying ground potential to the hold conductor C1492; and completes, at the contacts 1553, a circuit, including the contacts 1562 for operating the rotary magnet SS4 of the send sequence switch SS. Upon operating the rotary magnet SS4 conditions the wipers SS1 to SS3, inclusive, of the send sequence switch SS to be driven an additional step in the clockwise direction away from the ninth positions thereof. Finally the shunt relay R1550 interrupts, at the contacts 1551, a normally completed shunt between the impulse conductors C1404 and C1403 extending to the windings of the line relay R1210 in the toll selector 1200. The impulsing cam 1566 then transmits a series of ground impulses to the rotary magnet DS3 of the digit send switch DS causing the rotary magnet DS3 to operate and restore repeatedly. Each time the rotary magnet DS3 operates and then restores the wipers DS1 and DS2 are driven an additional step in the clockwise direction. Also each time the rotary magnet DS3 operates and then restores it interrupts and then completes, at the contacts DS5, the impulsing path extending between the impulse conductors C1403 and C1404; whereby impulses are transmitted to the line relay R1210 in the toll selector 1200.

In the present example after the rotary magnet DS3 has operated and then restored in order to transmit four impulses, at the contacts DS5, over the impulse conductors C1403 and C1404 the wiper DS2 of the digit send switch DS engages the fifth contact in the associated contact bank terminating the fourth conductor in the marking cable 1344 that is, in turn, terminated by the fifth contact in the contact bank associated with the grounded wiper O11 of the first office register O1; whereby an alternative circuit is completed for operating the stop send relay R1560. Upon operating the stop relay R1560 completes, at the contacts 1561, the alternative shunt between the impulse conductors C1403 and C1404 in order to render further operation of the rotary magnet DS3 ineffective to transmit impulses over the impulse conductors C1403 and C1404. Accordingly, in the present example, the rotary magnet DS3 operates to transmit at the contacts DS5 a series of four impulses comprising the first digit 4 of the office code 475 registered in the first office register O1, at which time the stop send relay R1560 is operated as noted above. Also upon operating the stop send relay R1560 interrupts, at the contacts 1562, the previously traced circuit for operating the rotary magnet SS4 of the send sequence switch SS in order to cause the latter magnet to restore and effect driving of the wipers SS1 to SS3, inclusive, of the send sequence switch SS into their respective tenth positions for a purpose more fully explained hereinafter. Further, the stop send relay R1560 completes, at the contacts 1563, a holding circuit, including the contacts 1553, for energizing the winding thereof; interrupts at the contacts 1565 the original impulsing circuit for the rotary magnet DS3; and completes, at the contacts 1564, an alternative circuit for operating the rotary magnet DS3. The last-mentioned circuit extends from the wiper DS1 and the engaged contact in the associated contact bank included in the ground multiple via the contacts DS4 and 1564 to the rotary magnet DS3 and thence to battery potential. Accordingly, the rotary magnet DS3 operates buzzer fashion by virtue of the inclusion of the contacts DS4 in the operating circuit thereof driving the wipers DS1 and DS2 step by step in the clockwise direction back into their home positions. When the wiper DS1 disengages the last contact in the associated contact bank included in the ground multiple and is driven back home to engage the home contact in the associated contact bank the operating circuit for the rotary magnet DS3 is interrupted and the multiple circuit for retaining operated the shunt relay R1550 is interrupted. At this time the digit send switch DS has been returned to its normal home position following sending of the first digit from the register translator 1300 and shortly thereafter the shunt relay R1550 restores, it being of the slow-to-release type. Upon restoring the shunt relay R1550 recompletes, at the contacts 1551, the multiple between the impulse conductors C1403 and C1404; interrupts, at the contacts C1552, the multiple path for applying ground potential to the hold conductor C1402; and interrupts, at the contacts 1553, the holding circuit for retaining operated the stop send relay R1560. Shortly thereafter the stop send relay R1560 restores as it is of the slow-to-release type, interrupting at the contacts 1561, the additional shunt between the impulse conductors C1403 and C1404. Also the stop send relay R1560 reprepares at the contacts 1565 the impulsing circuit for the rotary magnet DS3.

The line relay R1210 in the toll selector 1200 follows the first digit 4. Each time the line relay R1210 restores and then reoperates it interrupts and then recompletes, at the contacts 1211, the circuit for retaining operated the holding relay R1220; whereby the latter relay is retained in its operated position during impulsing as it is of the slow-to-release type. Also each time the line relay R1210 restores and then reoperates it completes and then interrupts, at the contacts 1213, a circuit, including the contacts 1255 and 1222, for energizing the winding of the series relay R1230 in series with the vertical magnet M1225; whereby the series relay R1230 operates and remains operated during impulsing as it is of the slow-to-release type and the vertical magnet M1225 is operated repeatedly in order to drive the wiper carriage step by step in the vertical direction. At the conclusion of the first digit 4 transmitted from the register translator 1300 the line relay R1210 is retained in its operated position retaining operated the hold relay R1220 and causing restoration of the series relay R1230 shortly thereafter, the series relay R1230 being of the slow-to-release type. When the wiper carriage of the Strowger mechanism incorporated in the toll selector 1200 is driven one step in the vertical direction away from its normal vertical direction the sets of switch springs S1233 and S1261 are operated. Upon operating the set of switch springs S1261 completes a circuit, including the contacts 1227, 1231 and 1221, for operating the step relay R1240. Upon operating the step relay R1240 completes, at the contacts 1241, a holding circuit, including the set of switch springs S1261 and the contacts 1227, for energizing the winding thereof. When the series relay R1230 restores as noted above it interrupts, at the contacts 1231, the original circuit for energizing the winding of the step relay R1240; however, the multiple holding circuit for energizing the winding of the step relay R1240 is completed at this time. Also upon restoring the series relay R1230 completes, at the contacts 1232, a circuit including the contacts 1221 and 1242 for operating the rotary magnet M1226; whereby the wiper carriage is driven one step in the rotary direction away from its normal rotary position. Also upon operating the rotary magnet M1226 interrupts, at the contacts 1227, the holding circuit for retaining operated the step relay R1240. Upon restoring the step relay R1240 interrupts, at the contacts 1242, the circuit for operating the rotary magnet M1226; and upon restoring the rotary magnet M1226 completes, at the contacts 1227, a test circuit, including the set of switch springs S1261 and the contacts 1253, to the test wiper of the wiper carriage.

At this time the first trunk in the previously selected group is tested by the step relay R1240, ground potential appearing upon the testing conductor of the first trunk mentioned in the event it is busy and battery potential appearing upon the test conductor of this trunk in the event it is idle. First assuming that the trunk mentioned is busy at this time, ground potential appearing thereon completes the previously traced circuit for reoperating the step relay R1240; whereby the latter relay effects reoperation of the rotary magnet M1226 in order to cause the wiper carriage to be driven an additional step in the rotary direction selecting the next trunk in the previously selected group. This action continues until an idle trunk in the previously selected group is selected by the wiper carriage; whereupon the presence of battery potential upon the control wiper completes a substantially identical path for short-circuiting the winding of a step relay R1240; also at this time a circuit, including the contacts 1221, the contacts 1253 and the test wiper of the wiper set, is completed for energizing the winding of the switch-through relay R1250 in order to cause the latter relay to operate. Upon operating the switch-through relay R1250 interrupts, at the contacts 1253, the original operating circuit therefor; and completes, at the contacts 1254, a path for applying direct ground potential via the contacts 1221 and the control wiper of the wiper set to the control conductor of the selected trunk. At this time a series holding circuit, including the contacts 1221, the set of switch springs S1261 and the contacts 1227, is completed for energizing the windings of the switch-through relay R1250 and the step relay R1240; whereby the switch-through relay R1250 is retained in its operated position; however the step relay R1240 is not operated as it is of the marginal type. Also the switch-through relay R1250 completes, at the contacts 1252 and 1256, a direct connection, including the contacts 1145 and 1144, between the line wipers of the wiper set and the impulse conductors C1403 and C1404; whereby the next digit transmitted from the register translator 1300 is transmitted directly over the metallic circuit to the trunk that has been seized by the wiper carriage of the Strowger mechanism incorporated in the toll selector 1200. Further the switch-through relay R1250 interrupts, at the contacts 1251 and 1257, the previously traced circuit for retaining operated the line relay R1210; and interrupts, at the contacts 1255, the previously traced circuit for retaining operated the hold relay R1220 causing the latter relay to restore shortly thereafter it being of the slow-to-release type. Finally, the switch-through relay R1250 completes at the contacts 1258 a connection between the EC conductor C1164 of the trunk 1160 and the EC wiper of the wiper set for a purpose more fully explained hereinafter. At this time the toll selector 1200 has operated first to select a group of trunks and then to select an idle trunk therein and has switch-through; whereby the next digit transmitted from the register translator 1300 is transmitted directly over the toll selector 1200 to the selected trunk.

At this time the send sequence switch SS occupies its tenth position; whereby the wiper SS3 selects the conductor in the cable 1341 extending to the wiper O21 of the second office register O2 conditioning the register translator 1300 to transmit the second office digit 7 registered in the second office register O2. At this time the impulsing cam 1566 effects reoperation of the rotary magnet DS3 of the digit send switch DS; whereby the shunt relay R1550 is reoperated and further operation of the rotary magnet DS3 is effective to bring about the transmission, at the contacts DS5, of the impulses of the second office digit 7 over the impulse conductors C1403 and C1404 and consequently over the line conductors of the selected trunk. More particularly, the rotary magnet DS3 operates to transmit seven impulses in a series and constituting the second office digit 7; whereby the wiper DS2 of the digit send switch DS encounters the marked conductor in the marking cable 1344 effecting reoperation of the stop send relay R1560 and the consequent cut off and recycling of the register translator 1300; whereby the send sequence switch SS is operated into its eleventh position extending the ground marking from the wiper SS3 to the wiper O3 of the third office register O3.

In view of the foregoing explanation of the mode of operation of the register translator 1300 to transmit the first office digit 4 registered in the first office register O1 and the second office digit 7 registered in the second office register O2, it will be understood that it is operative in a substantially identical manner to transmit the third office digit 5 registered in the third office register O3 and the line number digits 1, 2, 3, and 4 respectively registered in the numerical registers N1, N2, N3 and N4.

Following the transmission of the last digit of the line number the send sequence switch SS is operated into its sixteenth position completing a path, including the contacts 1532, for applying ground potential to the pulse conductor C1401 and consequently a circuit, including the wiper 1151 of the finder 1150 and the contacts 1141 and 1112, for operating the switch-through relay R1130 in the national toll circuit 1100. Upon operating the switch-through relay R1130 completes, at the contacts 1133, a holding circuit, including the ground control conductor C1163, for energizing the winding thereof; completes, at the contacts 1132 and 1136, a direct metallic connection between the line conductor C1162 and C1161 of the trunk 1160 and the line conductors of the trunk selected by the toll selector 1200; and interrupts, at the contacts 1131 and 1137, the previously traced loop circuit for retaining operated the line R1110. Also the switch-through relay R1130 interrupts, at the contacts 1134, the previously traced holding circuit for retaining operated the cut-through relay R1140; and completes, at the contacts 1138, a connection between the EC conductor C1164 of the trunk 1160 and the set of switch springs S1235 that is utilized for a purpose more fully explained hereinafter. Upon restoring the line relay R1110 interrupts, at the contacts 1111, the circuit for retaining operated the hold relay R1120, whereby the latter relay restores shortly thereafter it being of the slow-to-release type. Upon restoring the hold relay R1120 interrupts, at the contacts 1121, the multiple path for applying ground potential to the control conductor C1163; however, without effect at this time since ground potential is retained upon the control conductor C1163 by the operated link comprising the answer switch 1081 and the call switch 1082 connected to the operator circuit 1003. Accordingly, at this time the connection has been extended from the operator position circuit 1003 at the dial toll board 1000 to the called subscriber substation T3 in the Green Field office.

Upon restoring the cut-through relay R1140 in the national toll circuit 1100 interrupts, at the contacts 1142, the path for applying ground potential to the hold conductor C1402 in order to effect restoration of the seize relay R1540 in the register translator 1300. Upon restoring the seized relay R1540 interrupts, at the contacts 1541, a point in the chain circuit for operating the all-busy relay R1270; and completes, at the contacts 1542, a path for applying ground potential to the release conductor C1346. The application of ground potential to the release conductor C1346 completes a circuit, including the set of switch springs AR12, for operating the release magnet AR11 of the area route switch AR; whereby the wiper carriage thereof is released and returned to its normal rotary and vertical positions. When the area route switch AR is thus released the set of switch springs AR12 is operated to interrupt the circuit for operating the release magnet AR11. In a similar manner the register sequence switch RS, the area composite switch AC, the office route switch OR, the office composite switch OC, the area registers A1, A2 and A3, the office registers O1, O2 and O3 and the numerical registers N1, N2, N3 and N4 are released. Also the application of ground potential to the release conductor C1346 completes a release circuit, including the set of switch springs RS6, the wiper SS2 and the engaged contact in the associated contact bank and the contacts SS5, for operating the rotary magnet SS4 of the send sequence switch SS; whereby the rotary magnet SS4 operates buzzer fashion in order to drive the wipers noted of the send sequence switch SS back into their first or home positions. At this time the wiper SS2 disengages the last contact in the associated contact bank included in the multiple connected to the release conductor C1346; whereby further operation of the rotary magnet SS4 is arrested. Also when ground potential is removed from the hold conductor C1402 the previously traced holding circuits for retaining operated the area relay R1330, the vertical test relay R1080, the rotary test relay R1085, the vertical test relays R1180 and the rotary test relay R1185 are interrupted causing the latter relays to restore. At this time the register translator R1300 is completely released and battery potential is applied via the winding of the seize relay R1540 to the hold conductor C1402 in order again to mark the register translator R1300 as idle to the finders 1150, etc., of the various national toll circuits 1100, etc., having access thereto.

Reconsidering the operation of the register translator 1300 should an all-trunks-busy condition be encountered by the toll selector 1200 in the first choice route in response to the first office code digit 4 the wiper carriage of the toll selector 1200 is driven eleven steps in the rotary direction away from its normal rotary position operating the sets of switch springs S1234 and S1235. Upon operating the set of switch springs S1234 completes a path including the contacts 1146 and the wiper 1155 and the engaged contact in the associated contact bank for applying ground potential to the busy conductor C1405; thereby to complete a circuit, including the contacts 1511, for energizing the lower winding of the busy relay R1530 causing the latter relay to operate. Upon operating the busy relay R1530 completes, at the contacts 1533, a holding circuit, including the set of switch springs SS6 associated with the send sequence switch SS, for energizing the upper winding thereof. Also the busy relay R1530 interrupts, at the contacts 1531, the loop circuit extending to the line relay R1210 in the toll selector 1200 causing the latter relay to restore and effect the restoration of the hold relay R1220 shortly thereafter, the hold relay R1220 being of the slow-to-release type. Upon restoring the hold relay R1220 completes, at the contacts 1223, a circuit, including the contacts 1255 and 1213 and the set of switch springs S1233, for operating the release magnet M1228; whereby the wiper carriage of the Strowger mechanism incorporated in the toll selector 1200 is released and returned to its normal rotary and vertical positions. When the toll selector 1200 is thus released the sets of switch springs S1261, S1233, S1234 and S1235 are operated. More particularly, the set of switch springs S1233 is operated to interrupt the circuit for operating the release magnet M1228; and the set of switch springs S1234 is operated to interrupt the circuit for energizing the lower winding of the busy relay R1530.

Also upon operating the busy relay R1530 interrupts, at the contacts 1532, a point in the path for applying ground potential to the pulse conductor C1401 in order to prevent operation of the switch-through relay R1130 in the national toll circuit 1100 incident to the restoration of the send sequence switch SS in the register translator 1300. Further the busy relay R1530 completes, at the contacts 1534, a circuit, including the contacts 1333, for operating the rotary magnet OR10 of the office route switch OR; whereby the wipers noted thereof are driven an additional step in the rotary direction to engage the 1-up 3-in contacts in the associated contact bank for the purpose of selecting the second choice route between the Amber Town toll office and the Green Field office as explained more fully subsequently.

Also the busy relay R1530 interrupts, at the contacts 1535, the circuit for operating the rotary magnet DS3 of the digit send switch DS in order to prevent further sending of the register translator 1300 at this time; and completes, at the contacts 1536, a circuit, including the contacts 1523, for energizing the low winding of the count relay R1520 causing the latter relay to operate through its first step to complete, at the contacts 1521, a substantially identical path, including the grounded hold conductor C1402, for short-circuiting the upper winding thereof, the count relay R1520 being of the two-step type. Finally, the busy relay R1530 completes, at the contacts 1537, a path for applying ground potential to the skip conductor C1345 in order to cause buzzer operation of the rotary magnet SS4 of the send sequence switch SS.

Accordingly at this time the send sequence switch SS is operated buzzer fashion and returned to its home position; whereby the set of switch springs SS6 is operated to interrupt the holding circuit for energizing the upper winding of the busy relay R1530. The busy relay R1530 then restores to recomplete, at the contacts 1531, the loop circuit extended to the line relay R1210 in the toll selector 1200, whereby the toll selector 1200 is again seized for reoperation. Also upon restoring the busy relay R1530 again prepares, at the contacts 1532, the path for applying ground potential to the pulse conductor C1401; interrupts at the contacts 1534 the circuit for operating the rotary magnet OR10 of the office route switch OR; and reprepares, at the contacts 1535, the circuit for operating the rotary magnet DS3 of the digit send switch DS. Further, the busy relay R1530 interrupts, at the contacts 1536, the previously traced path for short-circuiting of the upper winding of the count relay R1520; whereby the upper and lower windings of the count relay R1520 are energized in series circuit relation causing the latter relay to operate through its second step. When the count relay R1520 is thus completely operated it prepares, at the contacts 1522, a point in a circuit for energizing the lower winding of the count relay R1510. Finally upon restoring the busy relay R1530 interrupts, at the contacts 1537, the path for applying ground potential to the skip conductor C1345; whereby another cycle of operation of the register translator 1300 is initiated when the skip relay R1325 restores as a consequence of the removal of ground potential from the skip conductor C1345.

At this time since the office route switch OR occupies its 1-up 3-in position the office routing digit 7 is established so that the register translator 1300 transmits the office routing digit 7 followed by the called office code 475 and the called line number 1234 in order to attempt the extension of the connection via the second choice route.

In the event the toll selector 1200 encounters an all-trunks busy condition in the second choice route the wiper carriage thereof is again driven eleven steps in the rotary direction away from its normal rotary position, whereby the busy relay R1530 is again operated effecting resetting of the register translator 1300, operation of the second count relay R1510 and reoperation of the rotary magnet OR10 of the office route switch OR; all in a manner substantially identical to that described above. At this time since the office route switch OR occupies its 1-up 4-in position the office routing digits 8 and 5 are established so that the register translator 1300 transmits the office routing digits 8 and 5 followed by the called office code 475 and the called line number 1234 in order to attempt the extension of the connection via the third choice route.

In the event the toll selector 1200 encounters an all-trunks busy condition in the third choice route the wiper carriage thereof is again driven eleven steps in the rotary direction away from its normal rotary position. However in this case the busy relay R1530 is not reoperated by virtue of the prior operation of the second count relay R1510 disconnecting, at the contacts 1511, the busy conductor C1405 from the lower winding of the busy relay R1530. Accordingly, the register translator 1300 operates to transmit all of the digits mentioned and effects operation of the switch-through relay R1130 in the national toll circuit 1100; whereupon the register translator 1300 is released; all in the manner previously explained. At this time 120 ground impulses per minute are connected via the operated set of switch springs S1235 and the contacts 1138 to the EC conductor C1164 of the trunk 1160 in order to bring about the return of the all-trunks-busy signal to the operator position circuit 1003 at the dial toll board 1000.

In passing it is noted that in the event of an all-trunks-busy condition in the switching apparatus beyond the toll selector 1200 or in the event of an ultimate line busy condition of the called subscriber line 501 extending to the called subscriber substation T3 in the Green Field office the appropriate all-trunks-busy signal or the line-busy signal is returned over the connection via the EC wiper of the toll selector 1200 and consequently over the EC conductor C1164 of the trunk 1160; whereby the appropriate signal is returned to the operator position circuit 1003 at the dial toll board 1000, all in the manner previously explained.

Again reconsidering the established connection between the operator position circuit 1003 at the dial toll board 1000 in the Amber Town toll office and the called subscriber substation T3 in the Green Field office it is pointed out that when the subscriber at the called subscriber substation T3 disconnects a disconnect signal is returned over the EC wiper of the toll selector 1200 producing a disconnect signal at the operator position circuit 1003. The operator at the position circuit 1003 then reenters the connection in order to verify the release and then controls her position equipment in order to effect the release of the answer switch 1081 and the called switch 1082 of the link illustrated causing ground potential to be removed from the control conductor C1163 of the trunk 1160. When ground potential is thus removed from the control conductor C1163 the holding circuit for retaining operated the switch-through relay R1130 in the national toll circuit 1100 and the switch-through relay R1250 in the toll selector 1200 are interrupted causing these relays to restore. Upon restoring the switch-through relay R1250 completes, at the contacts 1255, the previously traced circuit for operating the release magnet M1228 in order to bring about the release of the toll selector 1200 and the consequent release of the various switches in the connection extending to the called subscriber substation T3 in the Green Field office. At this time the removal of ground potential from the control conductor C1163 of the trunk 1160 marks the national toll circuit 1100 as idle to the various call switch 1082, etc., having access thereto; and the established connection between the calling operator position circuit 1003 at the dial toll board 1000 in the Amber Town toll office and the call subscriber substation T3 in the Green Field office is completely released and all of the apparatus is available for further use.

*Sect. 7.—Toll calls from the dial toll board in the Amber Town office to subscriber substations in the Gold Hill office*

The extension of a toll call from the dial toll board 1000 in the Amber Town toll office to a subscriber substation, such, for example, as subscriber substation T4 in the Gold Hill toll office, is accomplished in a manner substantially identical to that described in Section 6. In this case the operator at the position circuit 1003 at the dial toll board 1000 may utilize the link including the call switch 1082 and operate the national toll dial key in order to cause the call switch 1082 to seize the national toll circuit 1100, whereby the finder 1150 may seize the register translator 1300. In this case the operator at the position circuit sets up the national toll number 614–464–1234 of the called subscriber substation T4 in the Gold Hill office.

This connection may be extended from the Amber Town office directly via the first choice route to the Gold Hill office; the register translator 1300 transmitting the called office code 464 followed by the called line number 1234. In this case the connection may be routed from the national toll circuit 1100 via the toll selector 1200, the repeater circuit 301, the toll line 102, the repeater circuit 521, the incoming toll selector 525, the incoming office selector 528, the first selector 652, the second selector 653, the toll connector 654 and the subscriber line 601 to the called subscriber substation T4.

On the other hand, this connection may be extended from the Amber Town office by way of the Orange Bay office via the second choice route to the Gold Hill office; the register translator 1300 transmitting the office routing digit 7 followed by the called office code 464 and the called line number 1234. In this case the connection may be routed from the national toll circuit 1100 via the toll selector 1200, the repeater circuit 303, the toll line 103, the repeater circuit 410, the incoming toll selector 412, the repeater circuit 416, the toll line 104, the repeater circuit 523, the incoming toll selector 526, the incoming office selector 528, the first selector 652, the second selector 653, the toll selector 654 and the subscriber line 601 to the called subscriber substation T4.

Finally, this connection may be extended from the Amber Town office by way of the Maroon Lea and Orange Bay offices via the third choice route to the Gold Hill office; the register translator 1300 transmitting the office routing digits 8 and 5 followed by the called office code 464 and the called line number 1234. In this case the connection may be routed from the national toll circuit 1100 via the toll selector 1200, and the repeater circuit 305, the toll line 105, the repeater circuit 401, the incoming toll selector 403, the repeater circuit 404, the toll line 106, the repeater circuit 413, the incoming toll selector 415, the repeater circuit 416, the toll line 104, the repeater circuit 523, the incoming toll selector 526, the incoming office selector 528, the first selector 652, the second selector 653, the toll connector 654 and the subscriber line 601 to the called subscriber substation T4.

*Sect. 8.—Toll calls from the dial toll board in the Rose Land office to subscriber substations in the Green Field office*

The extension of a toll call from the dial toll board 830 in the Rose Land toll office to a subscriber substation such, for example, as subscriber substation T3, in the Green Field office is accomplished in a manner substantially identical to that described in Section 6. In this case the operator at the position circuit 831 at the dial toll board 830 may utilize the link including the call switch 833 and operate the national toll dial key in order to cause the call switch 833 to seize the national toll circuit 850, whereby the finder 851 may seize the register translator 852. In this case the operator at the position circuit sets up the national toll number 614-475-1234 of the called subscriber substation T3 in the Green Field office.

This connection may be extended from the Rose Land office directly via the first choice route to the Green Field office; the register translator 852 transmitting the called office code 475 followed by the called line number 1234. In this case the connection may be routed from the national toll circuit 850 via the toll selector 860, the repeater circuit 821, the toll line 108, the repeater circuit 541, the incoming toll selector 543, the trunk circuit 511, the trunk line 107, the trunk circuit 510, the incoming office selector 515, the first selector 516, the second selector 517, the toll connector 518 and the subscriber line 501 to the called subscriber substation T3.

On the other hand this connection may be extended from the Rose Land office by way of the Vermillion Rock and Tan Stone offices via the second choice route to the Green Field office; the register translator 852 transmitting the office routing digits 9 and 5 followed by the called office code 475 and the called line number 1234. In this case the connection may be routed from the national toll circuit 850 via the toll selector 860, the repeater circuit 825, the toll line 111, the repeater circuit 735, the incoming toll selector 737, the repeater circuit 731, the toll line 110, the repeater circuit 725, the incoming toll selector 727, the repeater circuit 721, the toll line 109, the repeater circuit 546, the incoming toll selector 548, the trunk circuit 511, the trunk line 107, the trunk circuit 510, the incoming office selector 515, the first selector 516, the second selector 517, the toll connector 518 and the subscriber line 501 to the called subscriber substation T3.

*Sect. 9.—Toll calls from the dial toll board in the Rose Land office to subscriber substations in the Gold Hill office*

The extension of a toll call from the dial toll board 830 in the Rose Land toll office to a subscriber substation, such, for example, as subscriber substation T4, in the Gold Hill toll office is accomplished in a manner substantially identical to that described in Section 6. In this case the operator at the position circuit 831 at the dial toll board 830 may utilize the link including the call switch 833 and operate the national toll dial key in order to cause the call switch 833 to seize the national toll circuit 850, whereby the finder 851 may seize the register translator 852. In this case the operator at the position circuit 831 sets up the national toll number 614-464-1234 of the called subscriber substation T4 in the Gold Hill office.

This connection may be extended from the Rose Land office directly via the first choice route to the Gold Hill office; the register translator 852 transmitting the called office code 464 followed by the called line number 1234. In this case the connection may be routed from the national toll circuit 850 via the toll selector 860, the repeater circuit 821, the toll line 108, the repeater circuit 541, the incoming toll selector 543, the incoming office selector 528, the first selector 652, the second selector 653, the toll connector 654 and the subscriber line 601 to the called subscriber substation T4.

On the other hand this connection may be extended from the Rose Land office by way of the Vermillion Rock and Tan Stone offices via the second choice route to the Gold Hill office; the register translator 852 transmitting the office routing digits 9 and 5 followed by the called office code 464 and the called line number 1234. In this case the connection may be routed from the national toll circuit 850 via the toll selector 860, the repeater circuit 825, the toll line 111, the repeater circuit 735, the incoming toll selector 737, the repeater circuit 731, the toll line 110, the repeater circuit 725, the incoming toll selector 727, the repeater circuit 721, the toll line 109, the repeater circuit 546, the incoming toll selector 548, the incoming office selector 528, the first selector 652, the second selector 653, the toll connector 654 and the subscriber line 601 to the called subscriber substation T4.

*Sect. 10.—Toll calls from the dial toll board in the Gold Hill office to subscriber substations in the Blue Ridge office*

The extension of a toll call from the dial toll board 630 in the Gold Hill toll office to a subscriber substation, such, for example, as the subscriber substation T1, in the Blue Ridge office, is accomplished in a manner substantially identical to that described in Section 6. In this case the operator at the position circuit 631 at the dial toll board 630 may utilize the link including the call switch 633 and operate the national toll dial key in order to cause the call switch 633 to seize the national toll circuit 529, whereby the finder 530 may seize the register translator 531. In this case the operator at the position circuit 631 sets up the national toll number 218-256-1234 of the called subscriber substation T1 in the Blue Ridge office.

This connection may be extended from the Gold Hill office directly via the first choice route to the Blue Ridge office; the register translator 531 transmitting the called office code 256 followed by the called line number 1234. In this case the connection may be routed from the national toll circuit 529 via the toll selector 549, the repeater circuit 521, the toll line 102, the repeater circuit 301, the incoming toll selector 321, the trunk circuit 211, the trunk line 101, the trunk circuit 210, the incoming office selector 215, the first selector 216, the second selector 217, the toll connector 218 and the subscriber line 201 to the called subscriber substation T1.

On the other hand this connection may be extended from the Gold Hill office by way of the Orange Bay office via the second choice route to the Blue Ridge office; the register translator 531 transmitting the office routing digit 8 followed by the called office code 256 and the called line number 1234. In this case the connection may be routed from the national toll circuit 529 via the toll selector 549, the repeater circuit 523, the toll line 104, the repeater circuit 416, the incoming toll selector 418, the repeater circuit 410, the toll line 103, the repeater circuit 303, the incoming toll selector 323, the trunk circuit 211, the trunk line 101, the trunk circuit 210, the incoming office selector 215, the first selector 216, the second selector 217, the toll connector 218 and the subscriber line 201 to the called subscriber substation T1.

Finally, this connection may be extended to the Blue Ridge office by way of the Orange Bay and Maroon Lea offices via the third choice route to the Blue Ridge office; the register translator 531 transmitting the office routing digits 8 and 6 followed by the called office code 256 and the called line number 1234. In this case the connection may be routed from the national toll circuit 529 via the toll selector 549, the repeater circuit 523, the toll line 104, the repeater circuit 416, the incoming toll selector 418, the repeater circuit 413, the toll line 106, the repeater circuit 404, the incoming toll selector 406, the repeater circuit 401, the toll line 105, the repeater circuit 306, the incoming toll selector 326, the trunk circuit 211, the trunk line 101, the trunk circuit 210, the incoming office selector 215, the first selector 216, the second selector 217, the toll connector 218, and the subscriber line 201 to the called subscriber substation T1.

*Sect. 11.—Toll calls from the dial toll board in the Gold Hill office to subscriber substations in the Amber Town office*

The extension of a toll call from the dial toll board 630 in the Gold Hill toll office to a subscriber substation, such, for example, as the subscriber substation T2, in the Amber Town toll office is accomplished in a manner substantially identical to that described in Section 6. In this case the operator at the position circuit 631 at the dial toll board 630 may utilize the link including the call switch 633 and operate the national toll dial key in order to cause the call switch 633 to seize the national toll circuit 529, whereby the finder 530 may seize the register translator 531. In this case the operator at the position circuit sets up the national toll number 218-267-1234 of the called subscriber substation T2 in the Amber Town office.

This connection may be extended from the Gold Hill office directly via the first choice route to the Amber Town office; the register translator 531 transmitting the called office code 267 followed by the called line number 1234. In this case the connection may be routed from the national toll circuit 529 via the toll selector 549, the repeater circuit 521, the toll line 102, the repeater circuit 301, the incoming toll selector 321, the incoming office selector 332, the first selector 252, the second selector 253, the toll connector 254 and the subscriber line 221 to the called subscriber substation T2.

On the other hand this connection may be extended from the Gold Hill office by way of the Orange Bay office via the second choice route to the Amber Town office; the register translator 531 transmitting the office routing digit 8 followed by the called office code 267 and the called line number 1234. In this case the connection may be routed from the national toll circuit 529 via the toll selector 549, the repeater circuit 523, the toll line 104, the repeater circuit 416, the incoming toll selector 418, the repeater circuit 410, the toll line 103, the repeater circuit 303, the incoming toll selector 323, the incoming office selector 332, the first selector 252, the second selector 253, the toll connector 254 and the subscriber line 221 to the called subscriber substation T2.

Finally, this connection may be extended to the Amber Town office by way of the Orange Bay and Maroon Lea offices via the third office route to the Amber Town office; the register translator 531 transmitting the office routing digits 8 and 6 followed by called office code 267 and the called line number 1234. In this case the connection may be routed from the national toll circuit 529 via the toll selector 549, the repeater circuit 523, the toll line 104, the repeater circuit 416, the incoming toll selector 418, the repeater circuit 413, the toll line 106, the repeater circuit 404, the incoming toll selector 406, the repeater circuit 401, the toll line 105, the repeater circuit 306, the incoming toll selector 326, the incoming office selector 332, the first selector 252, the second selector 253, the toll connector 254 and the subscriber line 221 to the called subscriber substation T2.

*Sect. 12.—Toll calls from the dial toll board in the Gold Hill office to subscriber substations in the Red Gap office*

The extension of a toll call from the dial toll board 630 in the Gold Hill toll office to a subscriber substation, such, for example, as the subscriber substation T5 in the Red Gap office is accomplished in a manner substantially identical to that described in Section 6. In this case the operator at the position circuit 631 at the dial toll board 630 may utilize the link including the call switch 633 and operate the national toll dial key in order to cause the call switch 633 to seize the national toll circuit 529, whereby the finder 530 may seize the register translator 531. In this case the operator at the position circuit sets up the national toll number 319-733-1234 of the called subscriber substation T5 in the Red Gap office.

This connection may be extended from the Gold Hill office directly via the first choice route to the Red Gap office; the register translator 531 transmitting the called office code 733 followed by the called line number 1234. In this case the connection may be routed from the national toll circuit 529 via the toll selector 549, the repeater circuit 541, the toll line 108, the repeater circuit 821, the incoming toll selector 823, the trunk circuit 811, the trunk line 112, the trunk circuit 710, the incoming office selector 715, the first selector 716, the second selector 717, the toll connector 718 and the subscriber line 701 to the called subscriber substation T5.

On the other hand this connection may be extended from the Gold Hill office by way of the Tan Stone and Vermillion Rock offices via the second choice route to the Red Gap office; the register translator 531 transmitting the office routing digits 9 and 5 followed by the called office code 733 and the called line number 1234. In this case the connection may be routed from the national toll circuit 529 via the toll selector 549, the repeater circuit 546, the toll line 109, the repeater circuit 721, the incoming toll selector 723, the repeater circuit 725, the toll line 110, the repeater circuit 731, the incoming toll selector 733, the repeater circuit 735, the toll line 111, the repeater circuit 825, the incoming toll selector 827, the trunk circuit 811, the trunk line 112, the trunk circuit 710, the incoming office selector 715, the first selector 716, the second selector 717, the toll connector 718 and the subscriber line 701 to the called subscriber substation T5.

*Sect. 13.—Toll calls from the dial toll board in the Gold Hill office to subscriber substations in the Rose Land office*

The extension of a toll call from the dial toll board 630 in the Gold Hill toll office to a subscriber substation, such, for example, as the subscriber substation T6, in the Rose Land toll office is accomplished in a manner substantially identical to that described in Section 6. In this case the operator at the position circuit 631 at the dial toll board 630 may utilize the link including the call switch 633 and operate the national toll dial key in order to cause the call switch 633 to seize the national toll circuit 529, whereby the finder 530 may seize the register translator 531. In this case the operator at the position circuit 631 sets up the national toll number 319-762-1234 of the called subscriber substation T6 in the Rose Land office.

This connection may be extended from the Gold Hill office directly via the first choice route to the Rose Land office; the register translator 531 transmitting the called office code 762 followed by the called line number 1234. In this case the connection may be routed from the national toll circuit 529 via the toll selector 549, the repeater circuit 541, the toll line 108, the repeater circuit 821, the incoming toll selector 823, the incoming office selector 855, the first selector 856, the second selector 857, the toll connector 858 and the subscriber line 801 to the called subscriber substation T6.

On the other hand, this connection may be extended from the Gold Hill office by way of the Tan Stone and Vermillion Rock offices via the second choice route to the Rose Land office; the register translator 531 transmitting the office routing digits 9 and 5 followed by the called office code 762 and the called line number 1234. In this case the connection may be routed from the national toll circuit 529 via the toll selector 549, the repeater circuit 546, the toll line 109, the repeater circuit 721, the incoming toll selector 723, the repeater circuit 725, the toll line 110, the repeater circuit 731, the incoming toll selector 733, the repeater circuit 735, the toll line 111, the repeater circuit 825, the incoming toll selector 827, the incoming office selector 855, the first selector 856, the second selector 857, the toll connector 858 and the subscriber line 801 to the called subscriber substation T6.

*Sect. 14.—Toll calls from the dial toll board in the Amber Town office to subscriber substations in the Red Gap office*

Now assuming that the operator at the position circuit 1003 at the dial toll board 1000 in the Amber Town toll office has answered a C. L. R. call utilizing the answer switch 1081 that is to be extended to the called subscriber substation T5 in the Red Gap office, the operator at the calling position circuit 1003 first operates the national toll dial key in her position equipment in order to cause the call switch 1082 connected to the position circuit 1003 at this time to operate automatically and selected the group of national toll circuits, including the national toll circuit 1109, and then an idle national toll circuit in this group. Assuming that the call switch 1082 selects the national toll circuit 1100, the finder 1150 associated therewith operates to select an idle one of the register translators in the associated group, such, for example, as the register translator 1300. When the call was answered by the operator at the position circuit 1003 the sender control circuit 236 was automatically connected thereto, whereby the sender 237 and the register 238 were rendered responsive and the key set 235 was conditioned to control the register 238.

Accordingly, at this time the operator at the position circuit 1003 operates the key set 235 in accordance with the national number of the called subscriber substation T5, which is 319-733-1234. This number comprises the area code 319, the office code 733 and the line number 1234. The register 238 registers and transmits the digits of the national number, whereby they are reregistered in the register translator 1300; whereupon the sender control circuit 236, the sender 237 and the register 238 are released.

The register translator 1300 responds to the area code 319 in order to determine whether the called toll area is remote from or near the toll area 218 of the calling Amber Town office. In the event the register translator 1300 determines that the called toll area is remote from the toll area 218 of the calling Amber Town toll office, it is controlled to transmit one or more area routing digits in order to extend the connection to a toll office in a tandem toll area and then to retransmit the national toll number as registered in order that further extension of the connection may be brought about under the control of the apparatus in the toll office in the tandem toll area mentioned. On the other hand in the event the register translator 1300 determines that the called toll area is near the toll area 218 of the calling Amber Town toll office, it responds to the called office code to transmit one or more office routing digits. In this case the register translator 1300 also determines whether the office code as registered is required in the further extension of the connection and transmits the office code as registered, if required, and ultimately the called line number. Accordingly, in the event of the determination that the called area is near the toll area 218 of the calling Amber Town office the register translator 1300 completes the extension of the connection directly to the called subscriber substation.

In the present example the called toll area 319 is remote from the toll area 218 of the calling Amber Town office. Accordingly, the register translator 1300 operates to transmit one or more area routing digits in order to extend the connection to a toll office in a tandem toll area and then to retransmit the national toll number as registered in order that further extension of the connection may be brought about under the control of the apparatus in the toll office in the tandem toll area mentioned. More particularly, the register translator 1300 registers the national toll number 319-733-1234 and initiates the transmission of the area code digits as previously noted. In the present example there are three routes between the calling Amber Town toll office and the Gold Hill toll office in the tandem toll area 614, which three routes respectively comprise first, second and third routing choices. The first routing choice is directly between the Amber Town toll office and the Gold Hill toll office by way of the group of toll lines, including the toll line 102; the second routing choice is by way of the Orange Bay office between the Amber Town toll office and the Gold Hill toll office by way of the groups of toll lines, respectively including the toll lines 103 and 104; and the third routing choice is by way of the Maroon Lea and Orange Bay offices between the Amber Town toll office and the Gold Hill toll office by way of the groups of toll lines, respectively including the toll lines 105, 106 and 104.

Accordingly, the register translator 1300 attempts the first choice route transmitting the area routing digits 4 and 8 followed by the national toll number as registered 319-733-1234. In the event this first choice route is available the toll selector 1200 may respond to the first area code digit 4 to select the group of repeater circuits, including the repeater circuit 301, and then an idle repeater circuit in this group. The toll selector 1200 may select the repeater circuit 301, whereby the repeater circuit 301 controls the repeater circuit 521 over the toll line 102 to effect seizure of the incoming toll selector 525. The incoming toll selector 525 may respond to the second area code digit 8 to select the group of national toll circuits, including the national toll circuit 529, and then an idle national toll circuit therein. The incoming toll selector 525 may select the national toll circuit 529; whereupon the finder 530 may select the register translator 531 in the associated group. When the national toll number 319-733-1234 is then transmitted by the register translator 1300 it is received and reregistered in the register translator 531. The subsequent operation of the register translator 531 in response to registration of the national toll number 319-733-1234 in order to control the switching apparatus to extend the connection to the calling subscriber substation T5 in the Red Gap office is the same as that described in Section 12.

In the operation of the register translator 1300 should an all-trunks-busy condition be encountered by the toll selector 1200 in the first choice route in response to the first area code digit 4 the register translator 1300 is controlled to attempt the second choice route, transmitting the area routing digits, 7, 4 and 8 followed by the national toll number as registered 319-733-1234. In the event this second choice route is available the connection is extended in a manner substantially identical to that described above and may involve the toll selector 1200, the repeater circuit 303, the toll line 103, the repeater circuit 410, the incoming toll selector 412, the repeater circuit 416, the toll line 104, the repeater circuit 523, the incoming toll selector 526 and the national toll circuit 529; the extension of the connection from the national toll circuit 529 to the calling subscribed substation T5 being the same as that described in Section 12.

In the operation of the register translator 1300 should an all-trunks-busy condition be encountered by the toll selector 1200 in the second choice route in response to the first area code digit 7 the register translator 1300 is controlled to attempt the third choice route, transmitting the area routing digits 8, 5, 4 and 8 followed by the national toll number as registered 319-733-1234. In the event this third choice route is available the connection is extended in a manner substantially identical to that described above and may involve the toll selector 1200, the repeater circuit 306, the toll line 105, the repeater circuit 401, the incoming toll selector 403, the repeater circuit 404, the toll line 106, the repeater circuit 413, the incoming toll selector 415, the repeater circuit 416, the toll line 104, the repeater circuit 523, the incoming toll selector 526 and the national toll circuit 529; the extension of the connection from the national toll circuit 529 to the calling subscriber substation T5 being the same as that described in Section 12.

In the operation of the register translator 1300 should an all-trunks-busy condition be encountered by the toll selector 1200 in the third choice route in response to the first area routing digit 8, the register translator 1300 is not controlled to attempt a further choice route. More specifically, should the toll selector 1200 encounter an all-trunks-busy condition in the third choice route an all-trunks-busy signal is returned therefrom to the operator position circuit 1003 at the dial toll board 1000 indicating the circumstance noted.

Moreover, in extending the call via any one of the routes should a subsequent toll selector in the route between the toll selector 1200 and the national circuit in the Gold Hill office encounter an all-trunks-busy condition a corresponding all-trunks-busy signal is returned to the operator position circuit 1003 at the dial toll board 1000 in order to indicate the circumstance noted. Further in the extension of the call it is pointed out that alternative trunking between the Gold Hill toll office in the tandem toll area 614 and the called Red Gap office in the called toll area 319 takes place as explained in Section 12; whereby an all-trunks-busy signal may be returned from this switching apparatus to the operator position circuit 1003 at the dial toll board 1000 indicating the circumstance noted. Finally, in the extension of a connection should a toll connector having access to the called subscriber line test the called subscriber line as busy, a corresponding line-busy signal is returned over the connection to the operator position circuit 1003 at the dial toll board 1000 in order to indicate the circumstance noted. The all-trunks-busy signal comprises 120 impulses per minute while the line-busy signal comprises 60 impulses per minute, all as explained in Section 6.

Consider now in greater detail with reference to Figs. 10 to 15, inclusive, the operation of the register translator 1300 in the extension of the present call from the operator position circuit 1003 at the dial toll board 1000 in the Amber Town toll office to the national toll circuit 529 in the Gold Hill toll office in the tandem toll area 614. The seizure of the national toll circuit 1100 and the register translator 1300 and the subsequent registration of the various digits of the national toll number 319-733-1234 in the individual registers in the register translator 1300 are the same as described in Sect. 6. In the present example the registration of the area code digits 3, 1 and 9 in the respective area registers A1, A2 and A3 effect setting of the area composite switch AC to its 3-up 9-in position and selection of the first wiper AC1, whereby the area route switch AR may be set into its 8-up 8-in position. Likewise, the registration of the office code digits, 7, 3 and 3 in the respective office registers O1, O2 and O3 effect a corresponding setting of the office composite switch OC and consequently a corresponding setting of the office route switch OR; which settings of the office composite switch OC and the office route switch OR are of no consequence in the present example as explained more fully below.

More particularly when the area route switch AR is set into its 8-up 8-in position the circuit for operating the area relay R1330 is not completed since the wiper AR3 engages an open contact in the associated contant bank. The failure of the area relay R1330 to operate constitutes a determination by the register translator 1300 that the called toll area 319 is remote from the calling toll area 218 and that a national toll circuit in a toll office in a tandem toll area must be utilized in extending the present connection. More particularly, when the area route switch AR is set into its 8-up 8-in position the wipers AR4 and AR5 respectively establish the area routing digits 4 and 8 in the marking cable 1344.

At the time when sending operation of the register translator 1300 is initiated the first area routing digit 4 is transmitted while the sequence switch SS occupies its first or home position; and the second area routing digit 8 is transmitted while the sequence switch SS occupies its second position. The sequence switch SS is then operated through its third, fourth and fifth positions buzzer fashion by virtue of the connections of the wipers AR6, AR7 and AR8 to the skip conductor C1345. The sequence switch SS is then operated sequentially through its sixth to fifteenth positions wherein the respective digits of the national toll number 319-733-1234 respectively registered in the ten individual registers in the register translator 1300 are transmitted. The send sequence switch SS is then operated into its sixteenth position to effect the release of the register translator 1300. As previously explained the office routing digits 4 and 8 effect an extension of the connection from the national toll circuit 1100 to the national toll circuit 529; whereby the national toll number 319-733-1234 registered in the register translator 1300 is transmitted therefrom and registered in the register translator 531.

Alternative trunking in the register translator 1300 is effected in a manner substantially identical to that explained in Section 6; and specifically, in the event of operation of the busy relay R1530 ground potential is applied at the contacts 1534 to effect operation of the rotary magnet AR10 of the area route switch AR by virtue of the restored condition of the area relay R1330 and the closed position of the contacts 1332. Specifically, in the event of an all-trunks-busy condition in the first choice route the busy relay R1530 is operated to effect operation of the area route switch AR into its 8-up 9-in position establishing the area routing digits 7, 4 and 8. Similarly, in the event of an all-trunks-busy condition to effect operation of the area route switch AR into its 8-up 10-in position establishing the area route digits 8, 5, 4 and 8. The remainder of the operation of the register translator 1300 is the same as that described in Section 6.

*Sect. 15.—Toll calls from the dial toll board in the Amber Town office to subscriber substations in the Rose Land office*

The extension of a toll call from the dial toll board 1000 in the Amber Town toll office to a subscriber substation, such, for example, as the subscriber substation T6 in the Rose Land toll office is accomplished in a manner similar to the operations described in Sections 14 and 6. More specifically, the extension of the connection from the dial toll board 1000 to the national toll circuit 1100 and thence to the national toll circuit 529 is the same as described in Section 14; while the extension of the connection from the national toll circuit 529 to the called subscriber substation T6 is the same as that described in Section 13.

*Sect. 16.—Toll calls from the dial toll board in the Rose Land offie to subscriber substations in the Blue Ridge office*

The extension of a toll call from the dial toll board 830 in the Rose Land toll office to a subscriber substation, such, for example, as the subscriber substation T1 in the Blue Ridge office is accomplished in a manner similar to the operations described in Sections 14 and 6. More specifically the connection may be extended from the operator position circuit 831 at the dial toll board 830 via the call switch 833 to the national toll circuit 850; whereby the finder 851 may seize the register translator 852. The national toll number 218-256-1234 is then registered in the register translator 852; and the register translator 852 determines that the called area 218 is remote from the calling area 319 and that the connection will have to be routed to a national toll circuit in the Gold Hill toll office in the tandem toll area 614. Accordingly, the national toll circuit 850 establishes the area routing digits 4 and 8 corresponding to the first choice route and then transmits the area routing digits 4 and 8 followed by the national toll number as registered 218-256-1234. The connection may be extended from the national toll circuit 850 via the toll selector 860, the repeater circuit 321, the toll line 108, the repeater circuit 541 and the incoming toll selector 543 to the national toll circuit 529; and the finder 530 may select the register translator 531, whereby the national toll number 218-256-1234 registered in the register translator 852 is transmitted therefrom and reregistered in the register translator 531.

In the event of an all-trunks-busy condition in this first choice the register translator 852 is reoperated to establish the area digits 9, 5, 4 and 8 corresponding to the second choice route and then transmits the area routing digits 9, 5, 4 and 8 followed by the national toll number 218–256–1234. The connection may be extended from the national toll circuit 850 via the toll selector 860, the repeater circuit 825, the toll line 111, the repeater circuit 735, the incoming toll selector 737, the repeater circuit 731, the toll line 110, the repeater circuits 725, the incoming toll selector 727, the repeater circuits 721, the toll line 109, the repeater circuit 546 and the incoming toll selector 548 to the national toll circuit 529; and the finder 530 may select the register translator 531, whereby the national toll number 218–256–1234 registered in the register translator 852 is transmitted therefrom and reregistered in the register translator 531.

The subsequent operation of the register translator 531 in response to registration of the national toll number 218–256–1234 to effect the extension of the connection to the called subscriber substation T1 in the Blue Ridge office is the same as that described in Section 10.

*Sect. 17.—Toll calls from the dial toll board in the Rose Land office to subscriber substations in the Amber Town office*

The extension of a toll call from the dial toll board 830 in the Rose Land toll office to a subscriber substation, such, for example, as the subscriber substation T2, in the Amber Town office is accomplished in a manner similar to the operations described in Sects. 14 and 6. More specifically, the extension of the connection from the dial toll board 830 to the national toll circuit 850 and thence to the national toll circuit 529 is the same as described in Section 16; while the extension of the connection from the national toll circuit 529 to the called subscriber substation T2 is the same as that described in Section 11.

*Sect. 18.—Delayed toll calls*

The various toll calls described in Sections 6 to 17, inclusive, may be set up from the appropriate dial toll boards 1000, 630 and 830 on a delayed call basis. For example, assume that a toll call is to be extended from the operator position circuit 1003 at the dial toll board 1000 on a delayed call basis to the called subscriber substation T3 in the Green Field office. Of course, in this case the operator at the position circuit 1003 has not answered a CLR call and must select an idle one of the links such, for example, as the link illustrated, and operate the associated link key in order to cause this link to be connected to the operator position circuit 1003. The operator then operates the dial rear key K1001 in the position circuit 1003 in order to effect operation of the auxiliary dial rear relay R1010. Referring now to Fig. 10, upon operating the auxiliary dial rear relay R1010 connects, at the contacts 1011, the conductor C1031 to the conductor C1033 extending to the EC2 wiper of the answer switch 1081. Also at this time operation of the dial rear key K1001 effects connection of the sender control circuit 236 through the operator position circuit 1003 to the answer switch 1081, whereby the associated sender 237 and the register 238 are operatively connected to the answer switch 1081. Also when the dial rear key K1001 is thus operated automatic operation of the answer switch 1081 is initiated, whereby the answer switch 1081 selects the associated group of delayed call switches and then an idle delayed call switch in this group. For example, the answer switch 1081 may operate automatically to select the delayed call switch 234, whereby the sender control circuit 236 is operatively connected to the delayed call switch 234.

The operator at the position circuit 1003 then momentarily operates the national toll dial key K1002, whereby ground potential is applied to and then removed from the conductor C1033 extending to the answer switch 1081 so that the digit 1 is transmitted through the answer switch 1081 to the vertical magnet of the delayed call switch 234 causing the wiper carriage of the Strowger mechanism in the delayed call switch 234 to be operated one step in the vertical direction away from its normal vertical position. The wiper carriage of the Strowger mechanism incorporated in the delayed call switch 234 is then operated automatically to select an idle trunk in the group, including the trunk 1160. For example, the delayed call switch 234 may select the trunk 1160 extending to the national toll circuit 1100 causing the finder 1150 to select an idle one of the register translators in the associated group, such, for example, as the register translator 1300. Accordingly, at this time the sender control circuit 236 is operatively connected via the operator position circuit 1003, the answer switch 1081, the delayed call switch 234 and the trunk 1160 to the national toll circuit 1100 and thence to the register translator 1300.

At this time when the operator at the position circuit 1003 registers the national number 614–475–1234, this national number is registered in the register 238 and sent by the sender 237 to the register translator 1300 and registered therein. The subsequent operation of the register translator 1300 to extend the connection to the called subscriber substation T3 in the Green Field office is the same as that described in Section 6. The operator then restores the dial rear key K1001 in the position circuit 1003, whereby the sender control circuit 236 is operatively connected to the call switch 1082. Now the operator at the position circuit 1003 may set up over the call switch 1082 any one of the connections previously described in Sections 6 to 17, inclusive. The subsequent control and release of these delayed call connections are the same as those described in Section 6.

*Sect. 19.—Toll calls from the dial toll board in the Amber Town office to the dial toll board in the Gold Hill office*

The operator at the position circuit 1003 at the dial toll board in the Amber Town toll office may make a direct call to the dial toll board 630 in the Gold Hill toll office without reference to the national toll circuit merely by setting up the operator code on the key set 235 without operating the associated national toll dial key. In this example the operator code is 40 and the first digit 4 may be sent by the sender 237 to the call switch 1082, whereby the call switch 1082 may select the repeater circuit 301. The repeater circuit 301 effects seizure of the repeater circuit 521 over the toll line 102 and the consequent seizure of the incoming toll selector 525. The sender 237 then sends the digit 0 effecting operation of the incoming toll selector 525; whereby the incoming toll selector 525 may select the inward trunk circuit 641. The inward trunk circuit 641 controls the position distributor 645 to assign an available operator position at the dial toll board 630. Assuming that the first operator position circuit 631 is assigned the link distributor 644 is controlled to assign one of the links associated therewith, such, for example, as the link illustrated. The start circuit 643 and the link distributor 644 then control the answer switch 632 in order to cause it to select the inward trunk circuit 641. The operator at the position circuit 631 at the dial toll board 630 then answers the call and converses with the operator at the position circuit 1003 at the dial toll board 1000 and learns of the required extension of the connection.

*Sect. 20.—Toll calls from the dial toll board in the Rose Land office to the dial toll board in the Gold Hill office*

The operator at the position circuit 831 at the dial toll board 830 in the Rose Land toll office may make a direct call to the dial toll board 630 in the Gold Hill toll office without reference to the national toll circuit merely by setting up the operator code on the key set 835 without operating the associated national toll dial key. In this example, the operator code is 40 and the first digit 4 may be sent by the sender 837 to the call switch 833, whereby the call switch 833 may select the repeater circuit 821. The repeater circuit 821 effects seizure of the repeater circuit 541 over the toll line 108 and the consequent seizure of the incoming toll selector 543. The sender 837 then sends the digit 0 effecting operation of the incoming toll selector 543; whereby the incoming toll selector 543 may select the inward trunk circuit 641. The inward trunk circuit 641 controls the position distributor 645 to assign an available operator position at the dial toll board 630. Assuming that the first operator position circuit 631 is assigned the link distributor 644 is controlled to assign one of the links associated therewith, such, for example, as the link illustrated.

The start circuit 643 and the link distributor 644 then control the answer switch 632 in order to cause it to select the inward trunk circuit 641. The operator at the position circuit 631 at the dial toll board 630 then answers the call and converses with the operator at the position circuit 831 at the dial toll board 830 and learns of the required extension of the connection.

*Sect. 21.—Toll calls from the dial toll board in the Gold Hill office to the dial toll board in the Amber Town office*

The operator at the position circuit 631 at the dial toll board 630 in the Gold Hill toll office may make a direct call to the dial toll board 1000 in the Amber Town toll office without reference to the national toll circuit merely by setting up the operator code on the keyset 635 without operating the associated national toll dial key. In this example the operator code is 20 and the first digit 2 may be sent by the sender 637 to the call switch 633 whereby the call switch 633 may select the repeater circuit 521. The repeater circuit 521 effects seizure of the repeater circuit 301 over the toll line 102 and the consequent seizure of the incoming toll selector 321. The sender 637 then sends the digit 0 effecting operation of the incoming toll selector 321; whereby the incoming toll selector 321 may select the inward trunk circuit 241. The inward trunk circuit 241 controls the position distributor 245 to assign an available operator position at the dial toll board 1000. Assuming that the first operator position circuit 1003 is assigned the link distributor 244 is controlled to assign one of the links associated therewith, such, for example, as the link illustrated. The start circuit 243 and the link distributor 244 then control the answer switch 1081 in order to cause it to select the inward trunk circuit 241. The operator at the position circuit 1003 at the dial toll board 1000 then answers the call and converses with the operator at the position circuit 631 at the dial toll board 630 and learns of the required extension of the connection.

*Sect. 22.—Toll calls from the dial toll board in the Gold Hill office to the dial toll board in the Rose Land office*

The operator at the position circuit 631 at the dial toll board 630 in the Gold Hill toll office may make a direct call to the dial toll board 830 in the Rose Land toll office without reference to the national toll circuit merely by setting up the operator code on the key set 635 without operating the associated national toll dial key. In this example the operator code is 70 and the first digit 7 may be sent by the sender 637 to the call switch 633, whereby the call switch 633 may select the repeater circuit 541. The repeater circuit 541 effects seizure of the repeater circuit 821 over the toll line 108 and the consequent seizure of the incoming toll selector 823. The sender 637 then sends the digit 0 effecting operation of the incoming toll selector 823; whereby the incoming toll selector 823 may select the inward trunk circuit 841. The inward trunk circuit 841 controls the position distributor 845 to assign an available operator position at the dial toll board 830. Assuming that the first operator position circuit 831 is assigned the link distributor 844 is controlled to assign one of the links associated therewith, such, for example, as the link illustrated. The start circuit 843 and the link distributor 844 then control the answer switch 832 in order to cause it to select the inward trunk circuit 841. The operator at the position circuit 831 at the dial toll board 830 then answers the call and converses with the operator at the position circuit 631 at the dial toll board 630 and learns of the required extension of the connection.

*Sect. 23.—Toll calls from the dial toll board in the Amber Town office to subscriber substations in the Blue Ridge office and in the Amber Town office*

In the event the operator at the position circuit 1003 at the dial toll board 1000 in the Amber Town toll office has answered an inward toll call requiring completion either in the Blue Ridge office or in the Amber Town toll office she merely operates the key set 235 in accordance with the called office code and the called line number. For example, a call may be completed from the operator position circuit 1003 at the dial toll board 1000 to the called subscriber substation T1 in the Blue Ridge office by setting up the number 256-1234 on the key set 235 causing the sender 237 to send the individual digits of this number directly into the switch train. The call switch 1082 may respond to the first office code digit 2 to select the access selector 331; the access selector 331 may respond to the second office code digit 5 to select the trunk circuit 211 effecting seizure of the trunk circuit 210 over the trunk line 101 and the consequent seizure of the incoming office selector 215; and the incoming office selector 215 may respond to the third office code digit 6 to select the first selector 216. In response to the line number 1234 the call may be further extended via the first selector 216, the second selector 217 and the toll connector 218 to the subscriber line 201 extending to the called subscriber substation T1.

Similarly, a call may be completed from the operator position circuit 1003 at the dial toll board 1000 to the called subscriber substation T2 in the Amber Town toll office by setting up the number 267-1234 on the key set 235 causing the sender 237 to send the individual digits of this number directly into the switch train. The call switch 1002 may respond to the first office code digit 2 to select the access selector 331; the access selector 331 may respond to the second office code digit 6 to select the incoming office selector 332; and the incoming office selector 332 may respond to the third office code digit 7 to select the first selector 252. In response to the line number 1234 the call may be further extended via the first selector 252, the second selector 253 and the toll connector 254 to the subscriber line 221 extending to the called subscriber substation T2.

*Sect. 24.—Toll calls from the dial toll board in the Gold Hill office to subscriber substations in the Green Field office and in the Gold Hill office*

In the event the operator at the position circuit 631 at the dial toll board 630 in the Gold Hill toll office has answered an inward toll call requiring completion either in the Green Field office or in the Gold Hill toll office she merely operates the key set 635 in accordance with the called office code and the called line number. For example, a call may be completed from the operator position circuit 631 at the dial toll board 630 to the called subscriber substation T3 in the Green Field office by setting up the number 475-1234 on the key set 635 causing the sender 637 to send the individual digits of this number directly into the switch train. The call switch 633 may respond to the first office code digit 4 to select the access selector 651; the access selector 651 may respond to the second office code digit 7 to select the trunk circuit 511 effecting seizure of the trunk circuit 510 over the trunk line 107 and the consequent seizure of the incoming office selector 515; and the incoming office selector 515 may respond to the third office code digit 5 to select the first selector 516. In response to the line number 1234 the call may be further extended via the first selector 516, the second selector 517 and the toll connector 518 to the subscriber line 501 extending to the called subscriber substation T3.

Similarly, a call may be completed from the operator position circuit 631 at the dial toll board 630 to the called subscriber substation T4, in the Gold Hill toll office by setting up the number 464-1234 on the key set 635 causing the sender 637 to send the individual digits of this number directly into the switch train. The call switch 633 may respond to the first office code digit 4 to select the access selector 651; the access selector 651 may respond to the second office code digit 6 to select the incoming office selector 528; and the incoming office selector 528 may respond to the third office code digit 4 to select the first selector 652. In response to the line number 1234 the call may be further extended via the first selector 652, the second selector 653 and the toll connector 654 to the subscriber line 601 extending to the called subscriber substation T4.

*Sect. 25.—Toll calls from the dial toll board in the Rose Land office to subscriber substations in the Red Gap office and in the Rose Land office*

In the event the operator at the position circuit 831 at the dial toll board 830 in the Rose Land toll office has answered an inward toll call requiring completion either in the Red Gap office or in the Rose Land toll office she merely operates the key set 835 in accordance with the called office code and the called line number. For example, a call may be completed from the operator position circuit 831 at the dial toll board 830 to the called subscriber substation T5 in the Red Gap office by setting up the number 733-1234 on the key set 835 causing the sender 837 to send the individual digits of this number directly into the switch train. The call switch 833 may respond to the first office code digit 7 to select the access selector 853; the access selector 853 may respond to the second office code digit 3 to select the trunk circuit 811 effecting seizure of the trunk circuit 710 over the trunk line 112 and the consequent seizure of the incoming office selector 715; and the incoming office selector 715 may respond to the third office code digit 3 to select the first selector 716. In response to the line number 1234 the call may be further extended via the first selector 716, the second selector 717 and the toll connector 718 to the subscriber line 701 extending to the called subscriber substation T5.

Similarly, a call may be completed from the operator position circuit 831 at the dial toll board 830 to the called subscriber substation T6 in the Rose Land toll office by setting up the number 762-1234 on the key set 835 causing the sender 837 to send the individual digits of this number directly into the switch train. The call switch 833 may respond to the first office code digit 7 to select the access selector 853; the access selector 853 may respond to the second office code digit 6 to select the incoming office selector 855; and the incoming office selector 855 may respond to the third office code digit 2 to select the first selector 856. In response to the line number 1234 the call may be further extended via the first selector 856, the second selector 857 and the toll connector 858 to the subscriber line 801 extending to the called subscriber substation T6.

*Sect. 26.—Miscellaneous trunking*

In the foregoing Sections 6 to 25, inclusive, the principal and direct trunk routes from the various dial toll boards in the different toll offices have been described; however, it will be appreciated that there are many other trunk routes through the various switches that the operators may utilize. For example, as explained in Section 6, it is contemplated that the operator at the position circuit 1003 at the dial toll board 1000 in the Amber Town toll office will first operate the associated national toll dial key before dialing the national number 614-475-1234 of the called subscriber substation T3 in the Green Field office; however, the operator at the position circuit 1003 will soon learn that she may utilize the prefix digit 1 instead of operating the associated national toll dial key. While the operations that proceed from this manipulation of the key set 235 at the operator position circuit 1003 are substantially identical to those described in Section 6, it is contemplated that only the most experienced operator will utilize this alternative as it is desired to preserve the national toll numbering plan previously described.

Sect. 27.—Conclusion

In view of the foregoing, it is apparent that there has been provided an improved toll switching telephone system serving a vast territory, wherein the operator at the toll board in any originating office has access to switching and control equipment so that she may extend a toll call directly to any called subscriber substation in any terminating office, without the assistance of an operator at a toll board in any other office and regardless of the relative positions of the originating and terminating offices in the telephone system, merely by setting up upon her associated key set a national toll number comprising an area code identifying the called area, an office code identifying the called office in the called area, and a line number identifying the called line in the called office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers, each of said offices including switching equipment; apparatus disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism, an office route mechanism, means controlled by said office registers in accordance with the individual office digits registered therein for selectively operating said office route mechanism, means selectively controlled by the operation of said area route mechanism for determining whether said called area is remote from or near said one area, means controlled by said determining means for selecting said area route mechanism in the event of a determination that said called area is remote from said one area and for selecting said office route mechanism in the event of a determination that said called area is near said one area, and means including the selected one of said mechanisms for controlling the operation of said switching equipment to extend a connection from said one office in said one area to the corresponding called line in the corresponding called office in the corresponding called area.

2. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, an area relay selectively controlled by the operation of said area route mechanism depending upon whether said called area is remote from or near said one area, said area relay selecting said area route mechanism in the event said called area is remote from said one area and selecting said office route mechanism in the event said called area is near said one area, a sending device, first marking paths controlled by the selection of said area route mechanism for operating said sending device to send said established one or more area routing digits and then said registered area code digits, second marking paths controlled by the selection of said office route mechanism for operating said sending device to send said established one or more office routing digits, and third marking paths for operating said sending device to send said registered office code digits and then said registered line number digits.

3. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers, each of said offices including switching equipment; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, an area relay selectively controlled by the operation of said area route mechanism depending upon whether said called area is remote from or near said one area, said area relay selecting said area route mechanism in the event said called area is remote from said one area and selecting said office route mechanism in the event said called area is near said one area, a sending device, first marking paths controlled by the selection of said area route mechanism for operating said sending device to send said established one or more area routing digits to said switching equipment, second marking paths controlled by the selection of said office route mechanism for operating said sending device to send said established one or more office routing digits to said switching equipment, a busy relay controlled by a busy operation of said switching equipment in response to an area routing digit for releasing said switching equipment and for reoperating said area route mechanism to establish one or more alternative area routing digits and controlled by a busy operation of said switching equipment in response to an office routing digit for releasing said switching equipment and for reoperating said office route mechanism to establish one or more alternative office routing digits, third marking paths controlled by said reoperation of said area route mechanism for reoperating said sending device to send said established one or more alternative area routing digits to said switching equipment, fourth marking paths controlled by said reoperation of said office route mechanism for reoperating said sending device to send said established one or more alternative office routing digits to said switching equipment, fifth marking paths controlled by the selection of said area route mechanism for operating said sending device to send said registered area code digits over said switching equipment, and sixth marking paths for operating said sending device to send said registered office code digits and then said registered line digits over said switching equipment.

4. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers, each of said offices including switching equipment; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, an area relay selectively controlled by the operation of said area route mechanism depending upon whether said called area is remote from or near said one area, said area relay selecting said area route mechanism in the event said called area is remote from said one area and selecting said office route mechanism in the event said called area is near said one area, a sending device, first marking paths controlled by the selection of said area route mechanism for operating said sending device to send said established one or more area routing digits to said switching equipment, second marking paths controlled by the selection of said office route mechanism for operating said sending device to send said established one or more office routing digits to said switching equipment, a busy relay controlled by a busy operation of said switching equipment in response to an area routing digit for releasing said switching equipment and for reoperating said area route mechanism to establish one or more alternative area routing digits and controlled by a busy operation of said switching equipment in response to an office routing digit for releasing said switching equipment and for reoperating said office route mechanism to establish one or more alternative office routing digits, third marking paths controlled by said reoperation of said area route mechanism for reoperating said sending device to send said established one or more alternative area routing digits to said switching equipment, fourth marking paths controlled by said office route mechanism for reoperating said sending device to send said established one or more alternative office routing digits to said switching equipment, counting relays governed by a predetermined number of controls of said busy relay for preventing further control thereof, a busy circuit governed jointly by a busy operation of said switching equipment and by failure of control of said busy relay for returning a busy signal, fifth marking paths controlled by the selection of said area route mechanism for operating said sending device to send said registered area code digits over said switching equipment, and sixth marking paths for operating said sending device to send said registered office code digits and then said registered line number digits over said switching equipment.

5. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, an area relay selectively controlled by the operation of said area route mechanism depending upon whether said called area is remote from or near said one area, said area relay selecting said area route mechanism in the event said called area is remote from said one area and selecting said office route mechanism in the event said called area is near said one area, a sending device, first marking paths controlled by the selection of said area route mechanism for operating said sending device to send said established one or more area routing digits and then said registered area code digits, second marking paths controlled by the selection of said office route mechanism for operating said sending device to send said established one or more office routing digits, an office relay controlled jointly by the selection of said office route mechanism and by the operation of said office route mechanism, third marking paths selectively controlled by said office relay for selectively operating said sending device to send said registered office code digits, and fourth marking paths for operating said sending device to send said registered line number digits.

6. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, means selectively controlled by the operation of said area route mechanism for determining whether said called area is remote from or near said one area, area conductors extending to said area registers, office conductors extending to said office registers, line conductors extending to said line registers, route conductors, means controlled by said determining means for connecting said route conductors to said area route mechanism in the event of a determination that said called area is remote from said one area and for connecting said route conductors to said office route mechanism and for marking said area conductors against selection in the event of a determination that said called area is near said one area, a sequence switch operative to select said route conductors and then said area conductors if not marked against selection and then said office conductors and then said line conductors, means for operating said sequence switch, a digit sender operative to send digits incident to the selections of said conductors by said sequence switch and respectively corresponding to the digits established in the connected one of said route mechanisms and registered in the respective ones of said registers, and means for operating said digit sender.

7. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, means selectively controlled by the operation of said area route mechanism for determining whether said called area is remote from or near said one area, area conductors extending to said area registers, office conductors extending to said office registers, line conductors extending to said line registers, route conductors, means controlled by said determining means for connecting said route conductors to said area route mechanism in the event of a determination that said called area is remote from said one area and for connecting said route conductors to said office route mechanism and for marking said area conductors against selection in the event of a determination that said called area is near said one area, means controlled jointly by said determining means in the event of a determination that said called area is near said one area and by the operation of said office route mechanism for selectively marking said office conductors against selection, a sequence switch operative to select said route conductors and then said area conductors if not marked against selection and then said office conductors if not marked against selection and then said line conductors, means for operating said sequence switch, a digit sender operative to send digits incident to the selections of said conductors by said sequence switch and respectively corresponding to the digits established in the connected one of said route mechanisms and registered in the respective ones of said registers, and means for operating said digit sender.

8. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, an area route mechanism, means controlled by said area registers in accordance with the individual area digits registered therein for selectively operating said area route mechanism to establish one or more area routing digits, an office route mechanism, means controlled by said office registers in accordance with the individual office digits registered therein for selectively operating said office route mechanism to establish one or more office routing digits, means selectively controlled by the operation of said area route mechanism for determining whether said called area is remote from or near said one area, area conductors extending to said area registers, office conductors extending to said office registers, line conductors extending to said line registers, route conductors, means controlled by said determining means for connecting said route conductors to said area route mechanism in the event of a determination that said called area is remote from said one area and for connecting said route conductors to said office route mechanism and for marking said area conductors against selection in the event of a determination that said called area is near said one area, a sequence switch operative to select said route conductors and then said area conductors if not marked against selection and then said office conductors and then said line conductors, means for operating said sequence switch, a digit sender operative to send digits incident to the selections of said conductors by said sequence switch and respectively corresponding to the digits established in the connected one of said route mechanisms and registered in the respective ones of said registers, means for operating said digit sender, busy means responsive to a busy condition in a selected area route for transmitting a release signal therein and for reoperating said area route mechanism to establish one or more alternative area routing digits and responsive to a busy condition in a selected office route for transmitting a release signal therein and for reoperating said office route mechanism to establish one or more alternative office routing digits, and means controlled by said busy means for resetting and then for reoperating said sequence switch.

9. In a telephone system serving a territory divided into a plurality of areas assigned individual multi-digit area codes, each of said areas including a plurality of offices assigned individual multi-digit office codes, each of said offices including a plurality of lines assigned individual multi-digit line numbers; a register-sender disposed in one of said offices in one of said areas and comprising a plurality of area registers adapted to register the individual digits of a called area code, a plurality of office registers adapted to register the individual digits of a called office code, a plurality of line registers adapted to register the individual digits of a called line number, means for receiving the individual digits of said called area code and said called office code and said called line number and for registering them in the corresponding ones of said registers, means controlled by said area registers in accordance with the registered digits of said area code for determining whether said called area is remote from or near said one area, a sending device, means controlled jointly by said determining means in the event of a determination that said called area is remote from said one area and by said area registers in accordance with the registered digits of said area code for operating said sending device to send one or more area routing digits and then to send said registered area code digits and controlled jointly by said determining means in the event of a determination that said called area is near said one area and by said office registers in accordance with the registered digits of said office code for operating said sending device to send one or more office routing digits, and additional means for operating said sending device to send said registered office code digits and then said registered line number digits.

10. In a telephone system serving a territory divided into a plurality of areas assigned individual area codes, each of said areas including a toll office and one or more regular offices assigned individual office codes, each of said offices including a plurality of lines assigned individual line numbers, each of said toll offices including an operator switchboard and register-sender equipment, each of said offices including automatic switching apparatus, and means controllable from any calling operator switchboard in any calling toll office for extending a call therefrom to the associated equipment and then for transmitting thereto a called area code and a called office code and a called line number; each of said equipments including means for registering a called area code and a called office code and a called line number transmitted thereto, each of said equipments including an area relay selectively controlled by said registered called area code depending upon whether said called area is a remote area or a near area, each of said equipments including first marking paths controlled by said area relay in the event said called area is a remote area for sending one or more area routing digits to certain of said switching apparatus in order to effect operation thereof to extend the call from said last-mentioned equipment to an equipment in a toll office in a tandem area in route to said remote called area and then for sending said registered called area code and said registered called office code and said registered called line number to said last-mentioned equipment, each of said equipments including second marking paths controlled by said area relay in the event said called area is a near area for sending one or more office routing digits and then said registered called line number to other of said switching apparatus in order to effect operation thereof to extend the call from said last-mentioned equipment to the called office in said near called area and thence to the called line in said called office.

11. In a telephone system serving a territory divided into a plurality of areas assigned individual three-digit area codes, each of said areas including a toll office and one or more regular offices assigned individual three-digit office codes, each of said offices including a plurality of lines assigned individual multi-digit line numbers, each of said toll offices including an operator switchboard and register-sender equipment, each of said offices including automatic switching apparatus, and means controllable from any calling operator switchboard in any calling toll office for extending a call therefrom to the associated equipment and then for transmitting thereto a called area code and a called office code and a called line number; each of said equipments including means for registering a called area code and a called office code and a called line number transmitted thereto, each of said equipments including an area relay selectively controlled by said registered called area code dependent upon whether said called area is a remote area or a near area, each of said equipments including first marking paths controlled by said area relay in the event said called area is a remote area for sending one or more area routing digits to certain of said switching apparatus in order to effect operation thereof to extend the call from said last-mentioned equipment to an equipment in a toll office in a tandem area in route to said remote called area and then for sending said registered three-digit called area code and said registered three-digit called office code and said registered multi-digit called line number to said last-mentioned equipment, each of said equipments including second marking paths controlled by said area relay in the event said called area is a near area for sending one or more office routing digits and then said registered multi-digit called line number to other of said switching apparatus in order to effect operation thereof to extend the call from said last-mentioned equipment to the called office in said near called area and thence to the called line in said called office.

12. In a telephone system, an operator switchboard provided with a link, an automatic switch connected to said link, a first register-sender associated with said link, first and second trunks accessible to said switch, a second register-sender associated with said first trunk, means controllable from said operator switchboard for connecting said link to said operator switchboard and for connecting said first register-sender to said link, key means selectively controllable from said operator switchboard for operating said switch automatically to seize said first trunk, further means controllable from said operator switchboard for registering digits in said first register-sender, means included in said first register-sender and responsive to the registration of digits therein for sending digits to said link, means included in said switch and responsive to the first digit sent to said link in the event said switch has not been previously operated for selectively operating said switch to seize either said first trunk or said second trunk, means included in said switch and responsive to operation thereof for switching said switch through so that the first digit sent to said link is forwarded via said switch to said first trunk in the event said switch has been previously operated and the second and following digits sent to said link are forwarded via said switch either to said first trunk or to said second trunk depending upon the previous operation of said switch, means responsive to the seizure of said first trunk by said switch for connecting said second register-sender to said first trunk, means for registering in said second register-sender the digits forwarded to said first trunk, and means included in said second register-sender and responsive to the registration of digits therein for sending digits therefrom.

13. In a telephone system, an operator switchboard provided with a link, a first automatic switch connected to said link, a first register-sender associated with said link, first and second trunks accessible to said first switch, a second automatic switch connected to said first trunk, a second register-sender associated with said first trunk, a third trunk accessible to said second switch, means controllable from said operator switchboard for connecting said link to said operator switchboard and for connecting said first register-sender to said link, key means selectively controllable from said operator switchboard for operating said first switch automatically to seize said first trunk, further means controllable from said operator switchboard for registering digits in said first register-sender, means included in said first register-sender and responsive to the registration of digits therein for sending digits to said link, means included in said first switch and responsive to the first digit sent to said link in the event said first switch has not been previously operated for selectively operating said first switch to seize either said first trunk or said second trunk, means included in said first switch and responsive to operation thereof for switching said first switch through so that the first digit sent to said link is forwarded via said first switch to said first trunk in the event said first switch has been previously operated and the second and following digits sent to said link are forwarded via said first switch either to said first trunk or to said second trunk depending upon the previous operation of said first switch, means responsive to the seizure of said first trunk by said first switch for connecting said second register-sender to said first trunk, means for registering in said second register-sender the digits forwarded to said first trunk, means included in said second register-sender and responsive to the registration of digits therein for sending digits to said second switch, means included in said second switch and responsive to the first digit sent thereto for operating said second switch to seize said third trunk, and means included in said second switch and responsive to operation thereof for switching said second switch through so that the second and following digits sent to said second switch are forwarded to said third trunk.

JOHN E. OSTLINE.

REFERENCES CITED

The following references are of record in the file of this patent:

UNITED STATES PATENTS

| Number | Name | Date |
|---|---|---|
| 1,638,331 | Gardner | Aug. 9, 1927 |
| 1,732,185 | Stehlik | Oct. 15, 1929 |
| 1,862,549 | Raymond | June 14, 1932 |
| 2,283,395 | Strickler | May 19, 1942 |
| 2,339,709 | Ostline | Jan. 18, 1944 |
| 2,369,071 | Ostline | Feb. 6, 1945 |
| 2,369,868 | Taylor | Feb. 20, 1945 |
| 2,385,228 | Ostline | Sept. 18, 1945 |
| 2,409,063 | Ostline | Oct. 8, 1946 |
| 2,468,300 | Maloney | Apr. 26, 1949 |